US008627632B2

(12) United States Patent
Werner et al.

(10) Patent No.: US 8,627,632 B2
(45) Date of Patent: Jan. 14, 2014

(54) NODE, APPARATUS, SYSTEM AND METHOD REGARDING A FRAME SUPPORT FOR SOLAR MIRRORS

(75) Inventors: Craig Roy Werner, Lake Forest, IL (US); John Funai, Lake in the Hills, IL (US); Nicholas Palladino, Chicago, IL (US)

(73) Assignee: Werner Extrusion Solutions LLC, Libertyville, IL (US)

( * ) Notice: Subject to any disclaimer, the term of this patent is extended or adjusted under 35 U.S.C. 154(b) by 0 days.

(21) Appl. No.: 13/135,137

(22) Filed: Jun. 27, 2011

(65) Prior Publication Data

US 2011/0286121 A1 Nov. 24, 2011

Related U.S. Application Data

(63) Continuation-in-part of application No. 12/927,812, filed on Nov. 24, 2010, which is a continuation-in-part of application No. 12/798,757, filed on Apr. 10, 2010, which is a continuation-in-part of application No. 12/587,043, filed on Oct. 1, 2009, which is a continuation-in-part of application No. 12/583,787, filed on Aug. 26, 2009.

(60) Provisional application No. 61/190,573, filed on Aug. 29, 2008.

(51) Int. Cl.
*E04H 12/00* (2006.01)

(52) U.S. Cl.
USPC ........... 52/648.1; 52/633; 52/653.1; 52/653.2

(58) Field of Classification Search
USPC .......................... 52/633, 648.1, 653.1, 653.2
See application file for complete search history.

(56) References Cited

U.S. PATENT DOCUMENTS

| | | | | |
|---|---|---|---|---|
| 3,185,164 A | * | 5/1965 | Pinero | 135/145 |
| 3,563,580 A | * | 2/1971 | Black | 403/172 |
| 3,685,465 A | * | 8/1972 | Haumer | 108/60 |
| 3,688,461 A | * | 9/1972 | Rensch et al. | 52/653.1 |
| 3,744,206 A | * | 7/1973 | Nelson et al. | 52/650.2 |
| 3,999,351 A | * | 12/1976 | Rensch | 52/648.1 |
| 4,122,646 A | * | 10/1978 | Sapp | 52/651.05 |
| 4,211,044 A | * | 7/1980 | Gugliotta et al. | 52/200 |
| 4,247,218 A | * | 1/1981 | Jeannin | 403/217 |
| 4,312,326 A | * | 1/1982 | Johnson, Jr. | 126/606 |
| 4,449,843 A | * | 5/1984 | Wendel | 403/173 |
| 4,460,288 A | * | 7/1984 | Schaff | 403/27 |
| 4,483,118 A | * | 11/1984 | Betschart | 52/655.1 |
| 4,569,165 A | * | 2/1986 | Baker et al. | 52/81.3 |

(Continued)

*Primary Examiner* — Basil Katcheves
*Assistant Examiner* — Joshua Ihezie
(74) *Attorney, Agent, or Firm* — Ansel Schwartz

(57) ABSTRACT

A node for a solar frame including an elongate portion having a channel extending through it in which a structural element is disposed or a solid elongate portion on to which a structural element is disposed. The node comprises a fin extending radially outward from the elongate portion where at least 5% of the volume of the fin is replaced by at least a single void extending essentially in parallel with the channel or the extrusion direction of the solid elongate portion. An apparatus for transmitting torque in a solar frame having structural elements and a support. A system for solar mirrors. A node for a solar frame. A method for connecting a structural element with a strut having a strut end piece of a solar mirror support frame. A method for producing a node for solar mirror frame.

5 Claims, 97 Drawing Sheets

(56) References Cited

U.S. PATENT DOCUMENTS

| | | | |
|---|---|---|---|
| 4,577,449 A * | 3/1986 | Celli | 403/191 |
| 4,673,308 A * | 6/1987 | Reilly | 403/172 |
| 4,765,114 A * | 8/1988 | Wesselski | 52/646 |
| 4,835,932 A * | 6/1989 | Leete et al. | 52/653.2 |
| 4,838,003 A * | 6/1989 | Zeigler | 52/646 |
| 4,904,108 A * | 2/1990 | Wendel | 403/173 |
| 5,059,056 A * | 10/1991 | Banthia et al. | 403/170 |
| 5,224,320 A * | 7/1993 | Mai | 52/648.1 |
| 5,289,665 A * | 3/1994 | Higgins | 52/655.1 |
| 5,435,110 A * | 7/1995 | Stol et al. | 52/655.1 |
| 6,065,267 A * | 5/2000 | Fisher | 52/692 |
| D428,325 S * | 7/2000 | van Dreumel et al. | D8/354 |
| 6,205,739 B1 * | 3/2001 | Newlin | 52/655.1 |
| D476,880 S * | 7/2003 | Segall | D8/382 |
| 6,675,546 B2 * | 1/2004 | Coles | 52/655.1 |
| 6,892,502 B1 * | 5/2005 | Hubbell et al. | 52/633 |
| 7,007,431 B2 * | 3/2006 | Schubert | 52/263 |
| D550,484 S * | 9/2007 | Bonatti et al. | D6/509 |
| 7,310,920 B2 * | 12/2007 | Hovey, Jr. | 52/655.1 |
| 7,530,201 B2 * | 5/2009 | Reynolds et al. | 52/81.3 |
| 7,578,109 B2 * | 8/2009 | Reynolds et al. | 52/648.1 |
| 7,587,862 B2 * | 9/2009 | Reynolds et al. | 52/81.3 |
| 7,802,404 B2 * | 9/2010 | Wolfram | 52/81.3 |
| 7,823,347 B1 * | 11/2010 | Blinn | 52/244 |
| 7,823,583 B2 * | 11/2010 | Allen et al. | 126/696 |
| 8,071,930 B2 * | 12/2011 | Wylie et al. | 250/203.4 |
| 2004/0226249 A1 * | 11/2004 | Wang | 52/633 |
| 2005/0072103 A1 * | 4/2005 | Hopwood | 52/633 |
| 2005/0144884 A1 * | 7/2005 | Moriya | 52/633 |
| 2006/0053726 A1 * | 3/2006 | Reynolds et al. | 52/633 |
| 2007/0011983 A1 * | 1/2007 | Reynolds et al. | 52/633 |
| 2007/0261355 A1 * | 11/2007 | Carlisle et al. | 52/633 |
| 2008/0072516 A1 * | 3/2008 | Reynolds et al. | 52/694 |
| 2008/0204352 A1 * | 8/2008 | Reynolds et al. | 343/880 |
| 2009/0113816 A1 * | 5/2009 | Kling | 52/81.3 |
| 2010/0005752 A1 * | 1/2010 | Hawkins et al. | 52/655.1 |
| 2012/0217209 A1 * | 8/2012 | Marcotte et al. | 211/41.1 |

* cited by examiner

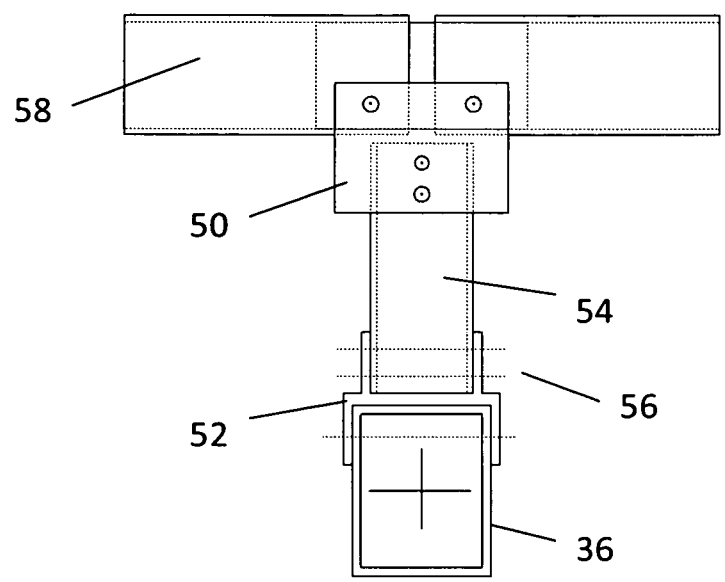
FIGURE 15C
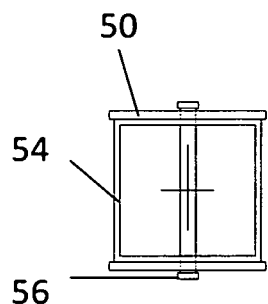 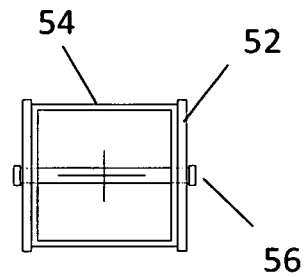
FIGURE 15D  FIGURE 15E

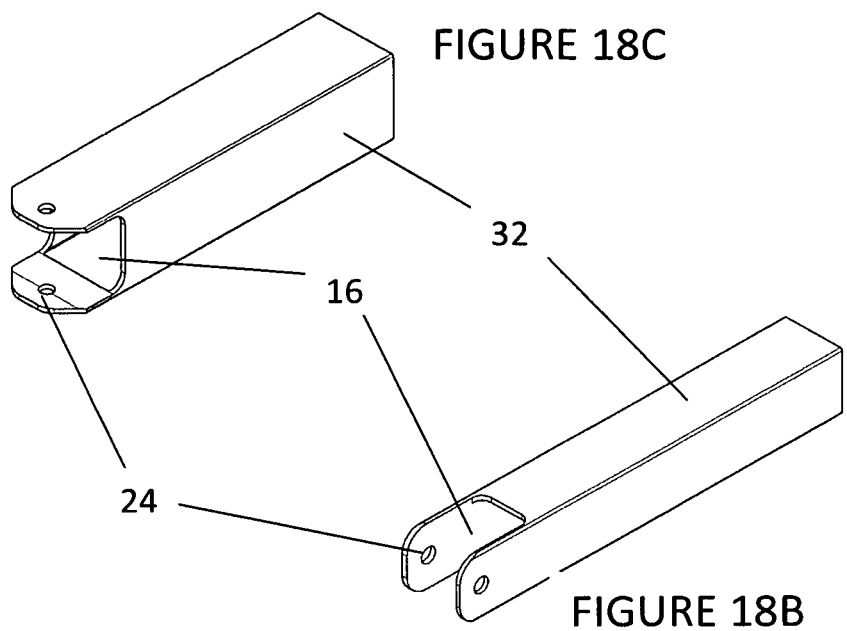
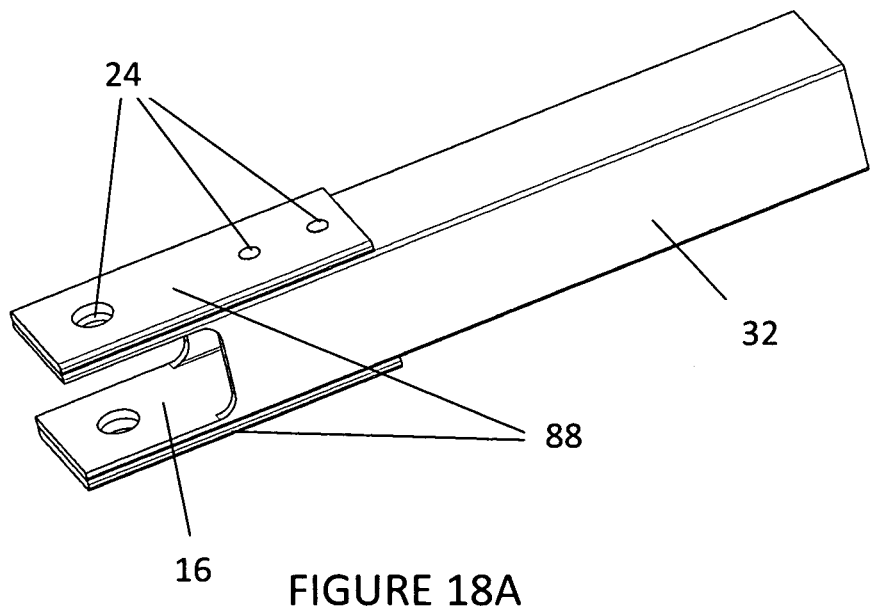

162          48

48          162

US 8,627,632 B2

NODE, APPARATUS, SYSTEM AND METHOD REGARDING A FRAME SUPPORT FOR SOLAR MIRRORS

CROSS-REFERENCE TO RELATED APPLICATIONS

This application is a continuation-in-part of U.S. patent application Ser. No. 12/927,812 filed Nov. 24, 2010 and is a continuation-in-part of U.S. patent application Ser. No. 12/798,757 filed Apr. 10, 2010, and is a continuation-in-part of U.S. patent application Ser. No. 12/587,043 filed Sep. 1, 2009, all of which are continuations-in-part of, and which this application is a continuation-in-part of, U.S. patent application Ser. No. 12/583,787 filed Aug. 26, 2009, which claims the benefit from U.S. provisional application Ser. No. 61/190,573 filed Aug. 29, 2008.

FIELD OF THE INVENTION

The present invention pertains to a frame support for solar mirrors. (As used herein, references to the "present invention" or "invention" relate to exemplary embodiments and not necessarily to every embodiment encompassed by the appended claims.) More specifically, the present invention pertains to various components of a frame support for solar mirrors.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The inventors have developed several geometries to provide support of parabolic mirrors—for the sake of explanation, these are called "Series Three" and "Series Five" (with the Series Three 60 having three main triangles as viewed from the end and Series Five 62 having five main triangles as viewed from the end.) See FIGS. 16A and 16B.

Reducing frame weight will generally lead to more cost effective frames. Increasing frame rigidity (reducing deflections) will improve slope error and lead to a frame which converts a higher % of the solar energy hitting the mirrors into usable heat content/improved efficiency of the entire solar field which improves the return on investment for the solar field.

The prior WES patent applications and figures are similar to FIGS. 16A and 16B (showing Series 3 and Series 5). The Series 5 design shown in FIG. 16A is an alternate "geometry". Since that time, further development has focused on more of a traditional space frame design where all of the struts come in to a common "unified hub" 64 (in FIG. 65, one can see how every other "hub" uses different struts). With the WES Strut End Piece and Sleeve designs, the member (struts)/forces can be brought together into very small physical spaces. Bringing all of the forces into a unified hub 64 reduces essentially any bending moments, improving the efficiency of the space frame in terms of load carrying capacity and deflection. When the WES Series 5 62 was redesigned to use a unified hub 64 configuration, there were improvements in both deflection and individual member loads, as the bending moments were relatively low due to short strut lengths and short connections between the sleeves along the chord.

FIG. 17 depicts named components of the prior patent application Series 5 multifinned sleeve and strut end piece design—useful to refer to re: nomenclature of the rest of this patent application. Note that this figure also shows the multiple parallel fins 70 of the sleeve 68, which receives a main support member 66, and/or strut end piece (redesigned as non-parallel "guided insertion" in subsequent designs). Depending on load characteristics and fasteners, the number of fins on the sleeve 68 or strut end piece can be modified; for example, below there is discussed the single fin sleeve, with one or more fins on the mating strut end piece. In the earlier WES patent applications and frame design, single finned strut end pieces were shown inserted into a dual fin sleeve arrangement.

The parabolic mirror framework supports the weight of itself and the supported mirrors and the wind and associated torque forces from the wind, which can be substantially higher than the simple weight of the assembled structure. These structures are generally 8, 12 (or other) meters long, supported at each end (or otherwise, as disclosed in the WES Rolling rib patent application) in a manner which allows rotation of the entire frame so that the parabolic mirrors follow the sun and focus the solar radiation optimally. The truss geometry and components are designed for each specific application (e.g. 8, 12 or other span lengths, wind conditions at installation location, drive mechanism and whether it acts on the solar frames individually or drives one frame rotation which in turn drives others (for 2, 3, 4, 5 or more in series, increasing/multiplying the total torque on the driven frame by the number of frames that each drive actuates)).

The forces acting on the frame are transmitted through the truss struts to the truss sleeves (nodes) which form the vertices of the triangles made up by the struts. The load capability and efficiency of the truss geometry and the capabilities of the components (struts, strut end pieces (where used), sleeves, fasteners, etc.) define how efficiently the truss performs and how optically accurate the collection of solar radiation is (leading to greater energy efficiencies).

FIG. 27A shows an angled strut end piece connecting to a "sleeve" (shown as a tubular shape, but can be a different cross section). The strut end piece transfers the tensile or compressive loads from the strut which slips over and is fastened to the strut end piece which then fastens to the sleeve (node), where various struts and/or strut end pieces concentrate their loads.

FIG. 27B shows multiple struts and strut end pieces converging their forces onto the sleeve 68 (through which passes the chord, chord couplers, segmented chords, chord connector(s), etc. defining the 8, 12 (or other) length of the solar frame). The system of struts 32, strut end pieces 30 (where used), sleeves 68 and chords are designed such that at each vertices of the frame the forces converge on a common point 76 (which may or may not be where there is actual physical material from the frame materials). This convergence to a common point 76 prevents odd bending moments at the sleeve connection.

BRIEF SUMMARY OF THE INVENTION

The present invention pertains to a node for a solar frame. The node comprises an elongate portion which may have a channel extending through it in which a structural element is attached to or the node may comprise a solid elongate portion onto which structural elements are attached. The node comprises a fin extending radially outward from the elongate portion where at least 5% of the volume of the fin is replaced by at least a single void extending essentially in parallel with the channel.

The present invention pertains to an apparatus for transmitting torque in a solar frame having structural elements and a support. The apparatus comprises a torque plate having a first side and a second side. The apparatus comprises a knob attached to the first side of the plate for engaging the support. The apparatus comprises a plurality of tubes attached to the second side of the plate for receiving structural elements of the frame.

The present invention pertains to an apparatus for transmitting torque in a solar frame having structural elements and a support. The apparatus comprises a torque plate having a first side and a second side. The apparatus comprises a knob which goes through and attaches to both the first and second side of the torque plate for engaging the support. The apparatus comprises a first tube which goes through and attaches to both the first and second side of the torque plate for receiving structural elements of the frame. The apparatus comprises a second tube having a first side and a second side which goes through and attaches to both the first and second side of the torque plate. The apparatus comprises a plurality of additional tubes which go through and attach to both the first and second side of the torque plate.

The present invention pertains to a system for solar mirrors. The system comprises a support. The system comprises a first frame engaged with the support on which solar mirrors are disposed. The system comprises a second frame engaged with the support on which solar mirrors are disposed. The system comprises rotational means disposed on either side of each frame for rotating the respective frame. The system comprises a first force applying means for applying a force to the first frame to move the first frame. The system comprises a second force applying means for applying a force to the second frame to move the second frame.

The present invention pertains to a node for a solar frame. The node comprises a solid elongate portion having fastener holes to which a structural element is attached with fasteners to the elongate portion. The node comprises a fin extending outward from the elongate portion where at least 5% of the volume of the fin is replaced by at least a single void 204.

The present invention pertains to a node for a solar frame. The node comprises an elongate portion having a channel extending through it in which a structural element is disposed or the node may comprise a solid elongate portion onto which structural elements are attached. The node comprises a fin extending radially outward from the elongate portion where at least 5% of the volume of the fin is replaced by at least a single void extending essentially in the extrusion direction.

The present invention pertains to a method for connecting a structural element with a strut having a strut end piece of a solar mirror support frame. The method comprises the steps of placing a structural element in a channel of an elongate portion of a node or onto a solid elongate portion of the node. There is the step of attaching the strut end piece to a fin of the node extending radially outward from the elongate portion where at least 5% of the volume of the fin is replaced by at least a single void extending essentially in parallel with the channel or in the extrusion direction.

The hollow fin design disclosed enhances the frame system's rigidity and lowers the stresses that the node element is subject to (allowing reduced part weight), while at the same time reducing the circumscribing circle size required; the tradeoff for this is slightly increased extrusion difficulty, which can cause slightly slower extrusion velocities and slightly higher $/lb costs for the profile.

BRIEF DESCRIPTION OF THE SEVERAL VIEWS OF THE DRAWING

In the accompanying drawings, the preferred embodiment of the invention and preferred methods of practicing the invention are illustrated in which:

FIG. 15C is an outside mirror rail and upright connection multiple piece mirror rail connection—Side view.

FIG. 15D is a mirror rail upright upper bracket.

FIG. 15E is a mirror rail upright lower bracket.

FIG. 18A shows a strut—with support plates.

FIG. 18B shows a small strut—notched.

FIG. 18c shows a large strut—notched.

FIG. 87 shows a portion of a torque plate with a knob.

DETAILED DESCRIPTION OF THE INVENTION

Figure 1:
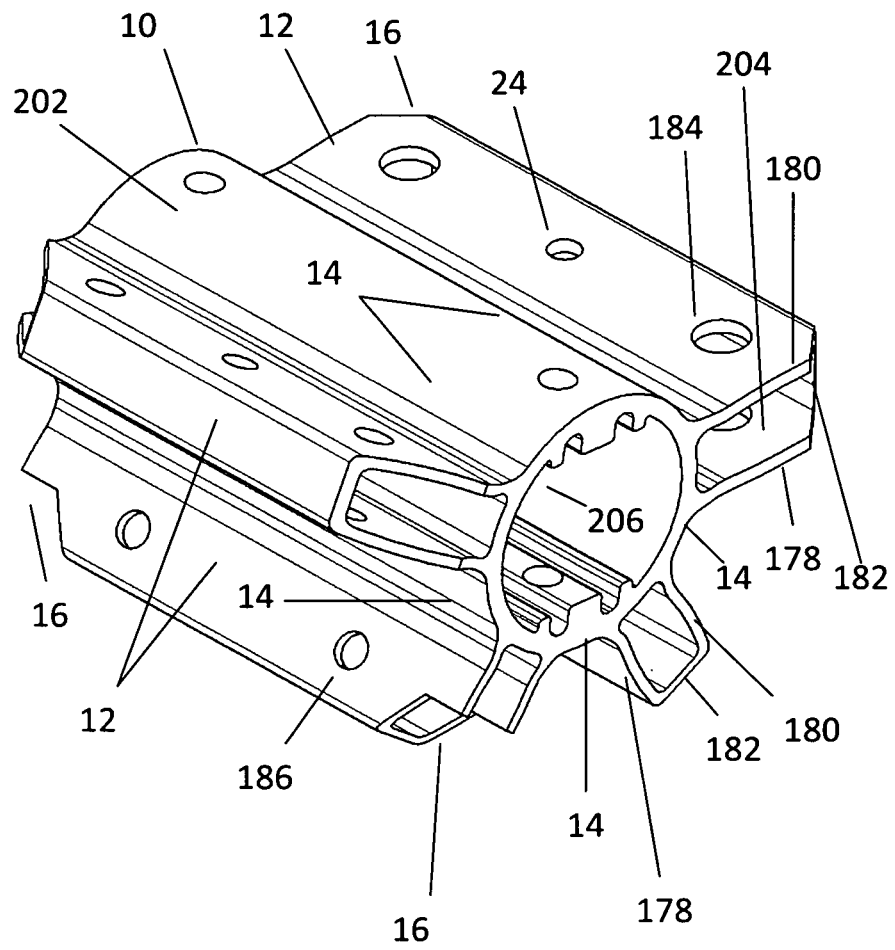
FIG. 1 is a hollow single fin node.

Referring now to the drawings wherein like reference numerals refer to similar or identical parts throughout the several views, and more specifically to FIGS. 1, 7, 10 and 22 thereof, there is shown a node 10 for a solar frame 44. The node 10 comprises an elongate portion 202 to which a structural element 28 is attached. The node 10 comprises a fin 12 extending radially outward from the elongate portion 202 where at least 5% of the volume of the fin 12 is replaced by at least a single void 204. The void 204 may extend essentially in parallel with the elongate portion. The elongate portion and the fin having a circle diameter less than 12 inches. The fin supports at least 200 lbs. of load. It should be noted that depending on the circle diameter and the thickness of the fin, the fin is able to support loads of for enstance at least 400, 800, 1600, 2500, 4000, 6000, 8000, 10000, or 12000 lbs.

The fin 12 may have a first leg 178 that extends outward from the elongate portion 202, and a second leg 180 that extends outward from the elongate portion 202 and adjacent to the first leg 178 with the void 204 disposed between the first and second legs 178, 180. The fin 12 may have a third leg 182 that is connected to the first and second legs 178, 180 and the first leg 178 is in spaced relation with the second leg 180. The first, second and third legs 178, 180, 182 may form essentially a rectangular cross-section. The first leg 178 may have a hole 184 and the second leg 180 may have a hole 186 which aligns with the hole 184 of the first leg 178 and through which the fastener 72 extends to fasten the strut end piece 30 to the fin 12. The fin 12 may have a notch at its ends to provide clearance for and to receive the strut end piece 30. The elongate portion 202 may be solid. The elongate portion 202 may be cubed shaped. The elongate portion 202 may have a channel 206 in which the structural member is disposed and the void 204 is in the extrusion direction.

The hollow profile shown does not represent any special technical difficulties. On an appropriately sized press (a 10" 3300 US Ton extrusion press, for example), it can be tooled as a housing, porthole, taperseal or other type of hollow die with or without replaceable inserts. An extruder skilled in the art would be able have appropriate tooling and extrusion process parameters designed to successfully extrude this profile.

Alternatively, the hollow fin design could be adapted to powder metallurgical forming, machining, die casting, investment casting, forging, connection of multiple pieces by welding or other means adapted to other means to produce a sleeve system with similar characteristics. In any of these, the use of the hollow fins will reduce the unsupported spans, leading to reduced deflections and lighter weight parts, improving performance and reducing costs of the part.

The present invention pertains to a method for connecting a structural element with a strut 32 having a strut end piece 30 of a solar mirror support frame 44. The method comprises the steps of attaching the structural element to an elongate portion 202 of a node 10. There is the step of attaching the strut end piece 30 to a fin 12 of the node 10 extending radially outward from the elongate portion 202 where at least 5% of the volume of the fin 12 is replaced by at least a single void 204 extending essentially in parallel with a long axis or in the extrusion direction. The elongate portion and the fin having a circle diameter less than 12 inches.

The fin 12 may have a first leg 178 that extends outward from the elongate portion 202, and a second leg 180 that extends outward from the elongate portion 202 and adjacent to the first leg 178 with the void 204 disposed between the first and second legs 178, 180, and wherein the attaching step may include the step of inserting a fastener 72 through a hole 188 of a first strut end piece fin 192 of the strut end piece 30 (see FIG. 8), a hole 184 of the first leg 178, a hole 186 of the second leg 180 and a hole 190 of a first strut end piece fin 194 of the strut end piece 30 to fasten the strut end piece 30 to the fin 12, the hole 188 of the first strut end piece fin 192 and the first leg 178 and the second leg 180 and the first strut end piece fin 194 in alignment.

The attaching step may include the step of placing the structural element in a channel of the elongate portion 202. The attaching step may include the step of attaching the structural element to the elongate portion 202 which is solid.

The present invention pertains to a node 68 for a solar frame, as shown in FIGS. 75-85. The node 86 comprises a solid elongate portion 132 having fastener holes 24 to which a structural element is attached with fasteners to the elongate portion 132. The node 68 comprises a fin 12 extending outward from the elongate portion 132 where at least 5% of the volume of the fin is replaced by at least a single void 204 extending essentially in parallel with the elongate portion 132.

There may be at least four fins 12, each of which has a void 204 of at least 5%, disposed about the elongate portion 132, and the elongate portion 132 and the fins 12 have a circle diameter of less than 12 inches. The circle diameter may be less than 8 inches. There may be at least three fins 12, each of which has a void 204 of at least 5% and a leg disposed on each side of the void 132, and at least one of the fins 12 has both of its legs attached to a leg of another fin 12. There may be at least two fins 12, each of which has a void 132 of at least 5% and a leg disposed on each side of the void 132, and at least one of the fins 12 has at least one leg attached to a leg of another fin 12.

Figure 49:
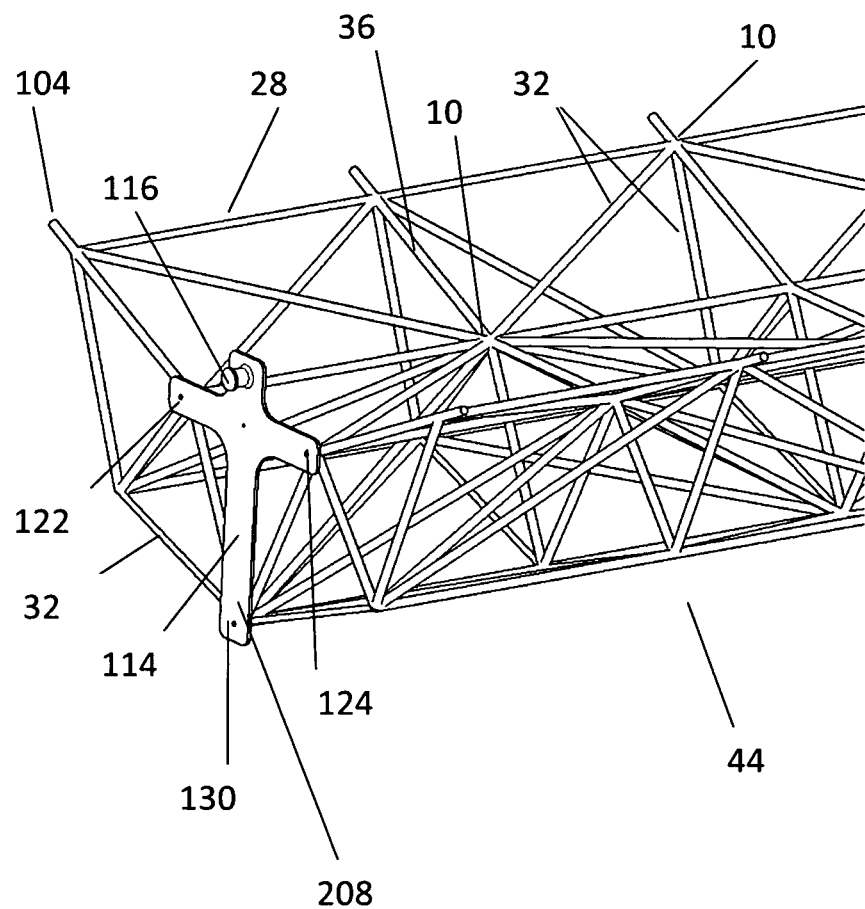
FIG. 49 shows a torque plate for solid node attached to series 5 frame—Outside ISO view.
Figure 50:
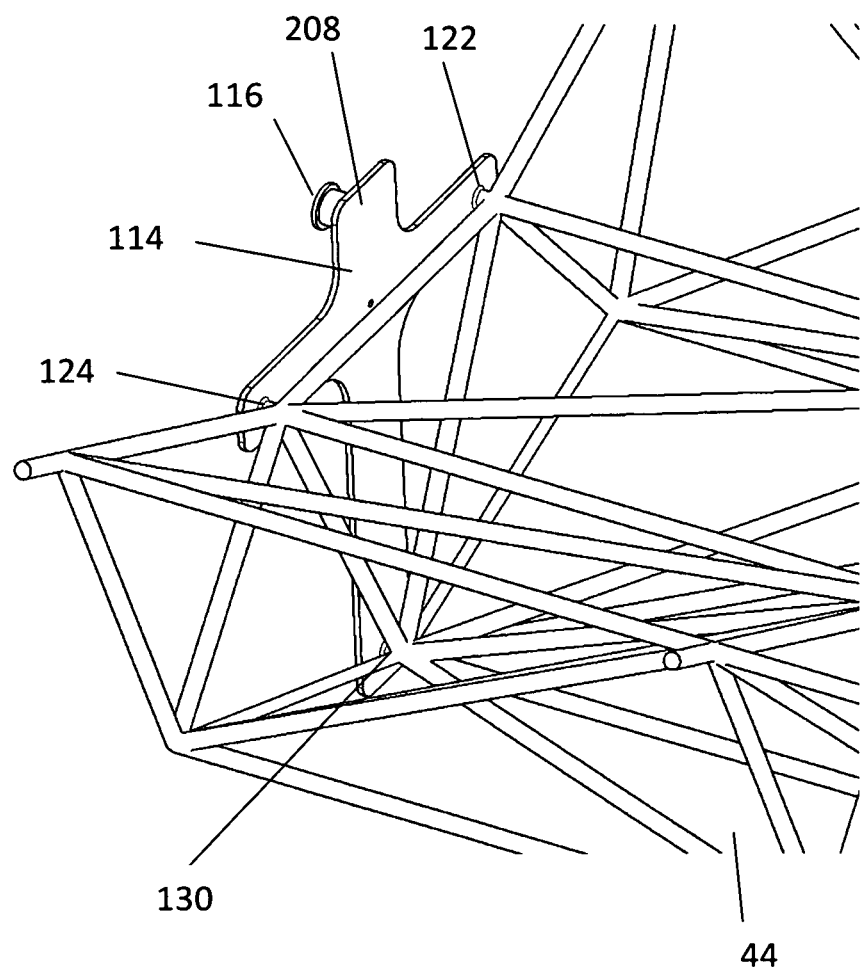
FIG. 50 shows a torque plate for solid node attached to series 5 frame—Inside ISO view.
Figure 51:
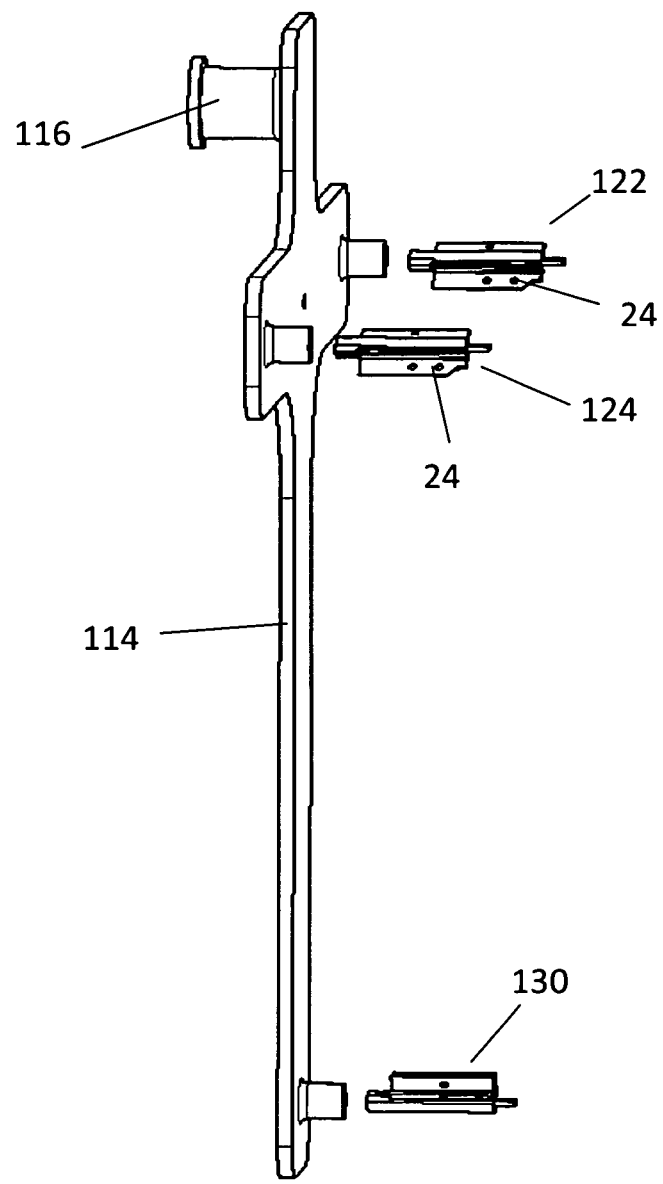
FIG. 51 shows a torque plate for solid node—Side view.
Figure 59:
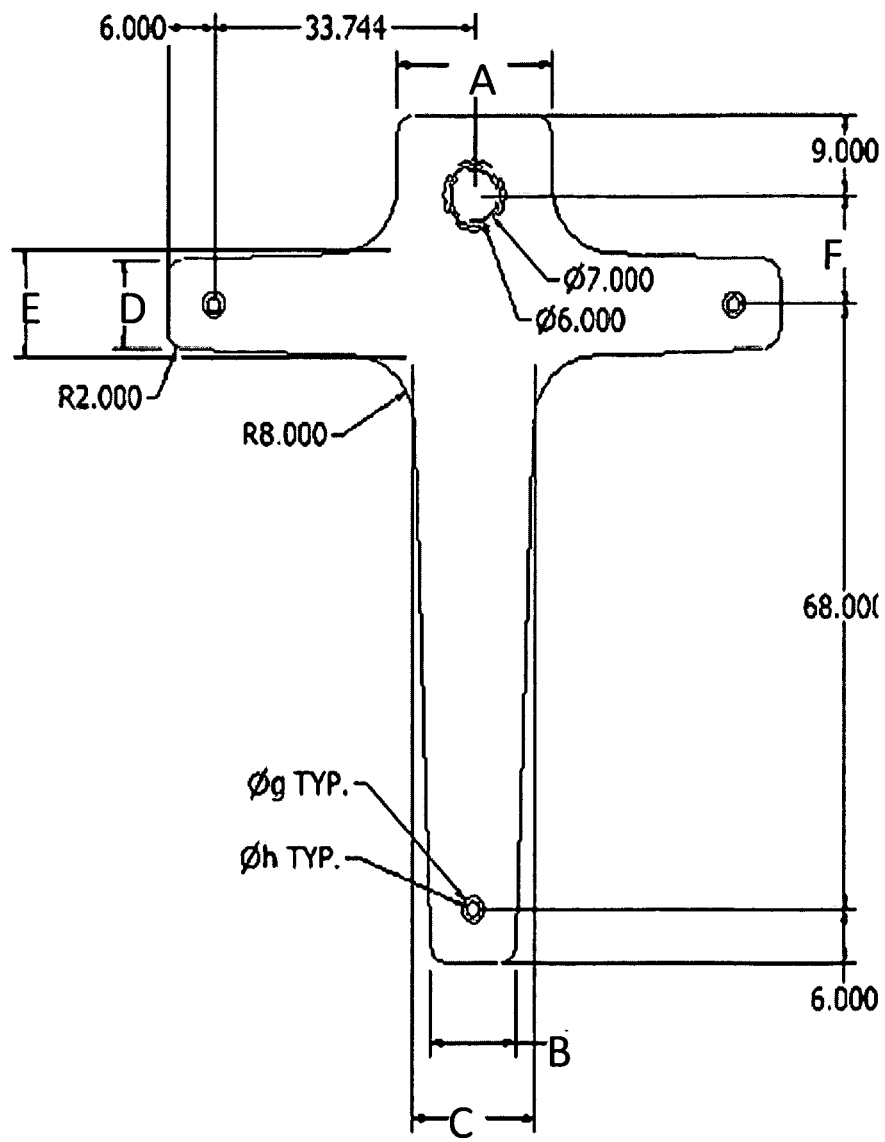
FIG. 59A shows a torque plate for solid node print—Front view.
FIG. 59B shows a torque plate for solid node print—Side view.
Figure 59:
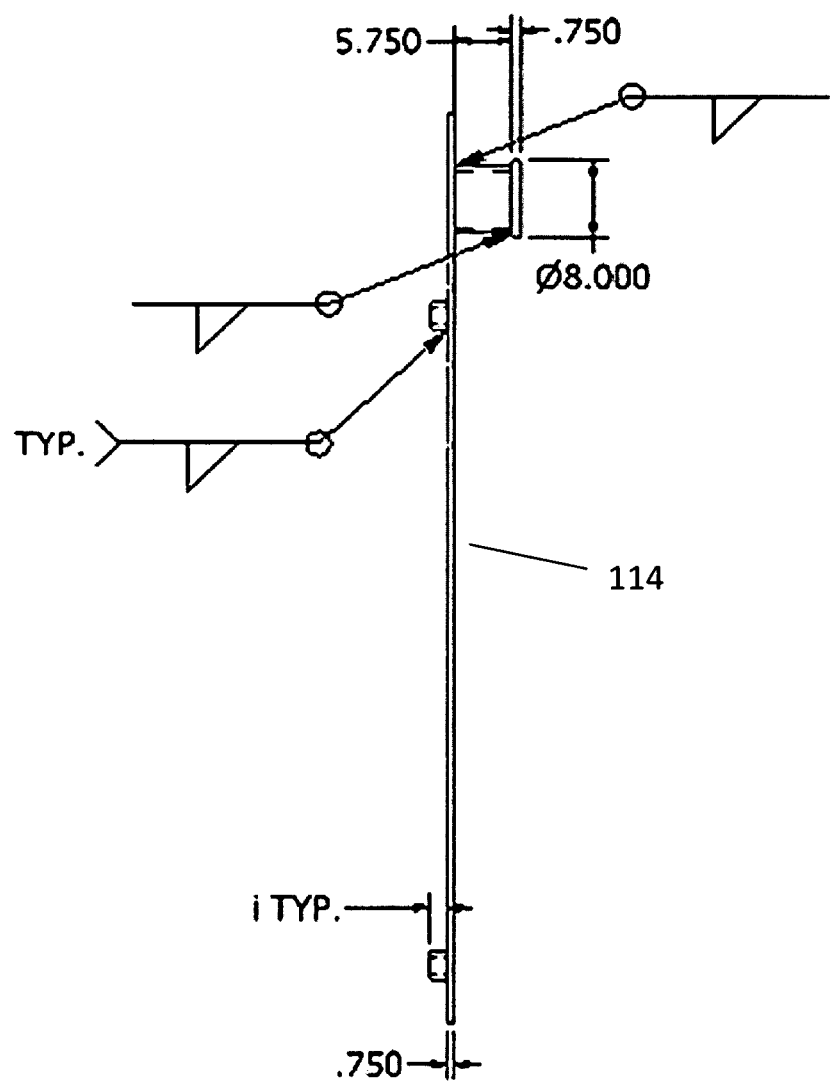
Figure 60:
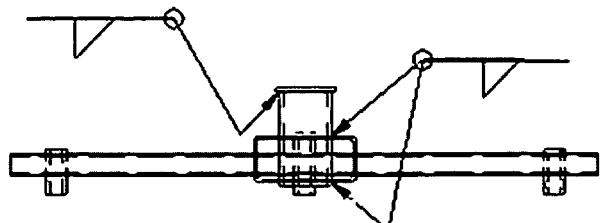
FIG. 60A shows a hollow tube torque plate for solid node print—Front view.
FIG. 60B shows a hollow tube torque plate for solid node print—Overhead view.
Figure 60:
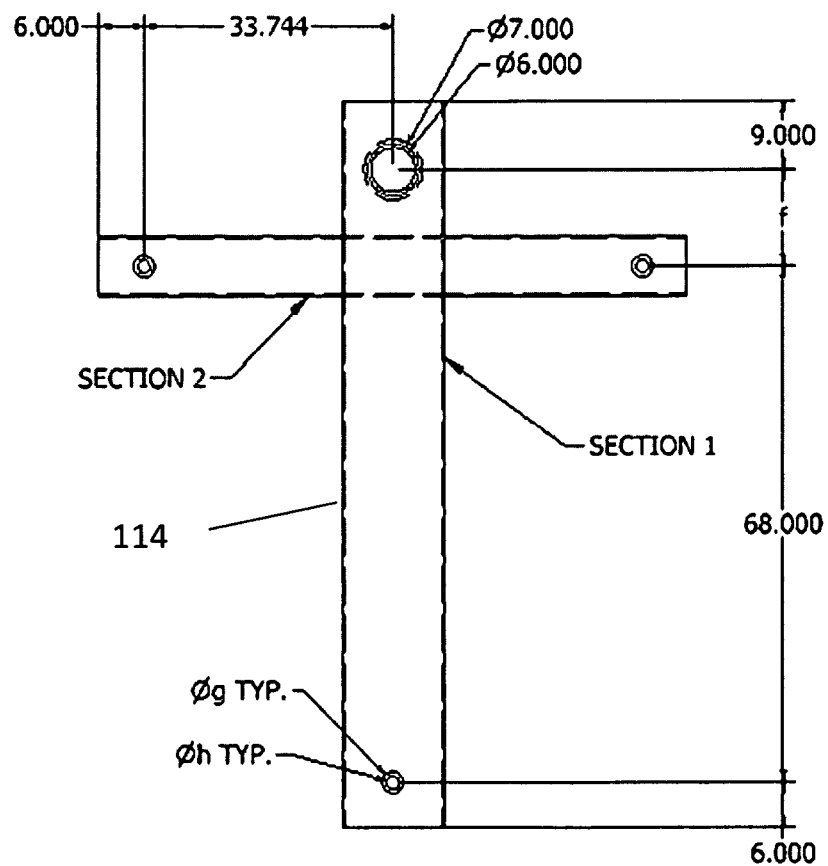
Figure 61:
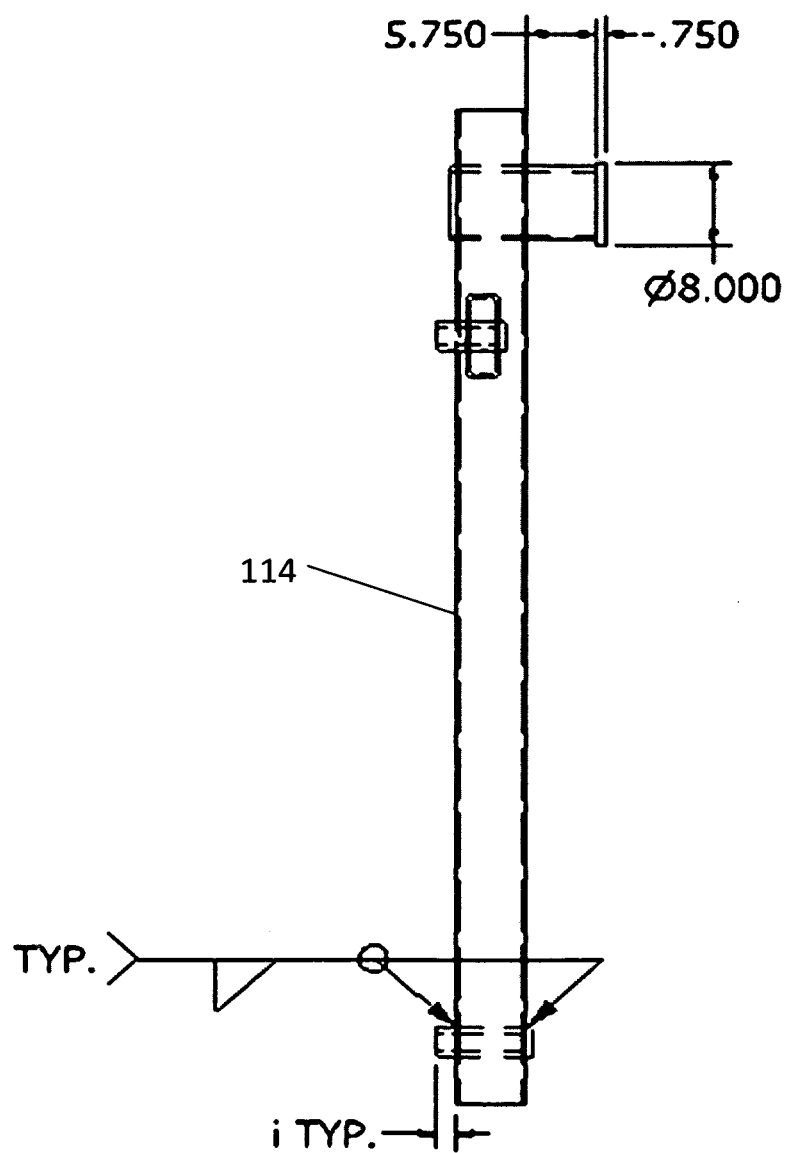
FIG. 61 shows a hollow tube torque plate for solid node print—Side view.
Figure 62:
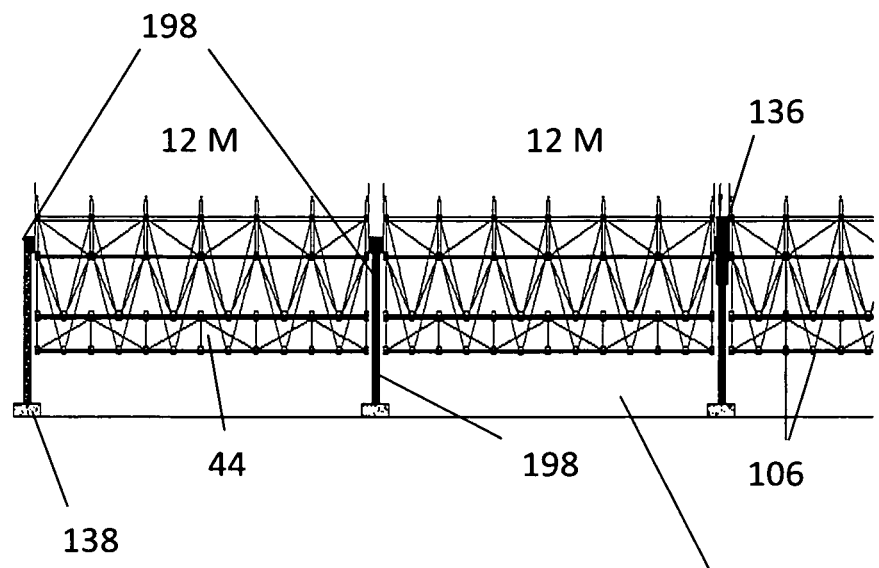
FIG. 62A shows rolling rib location concepts—STD system.
FIG. 62B shows rolling rib location concepts—Center RR with torque tube & additional foundations.
Figure 62:
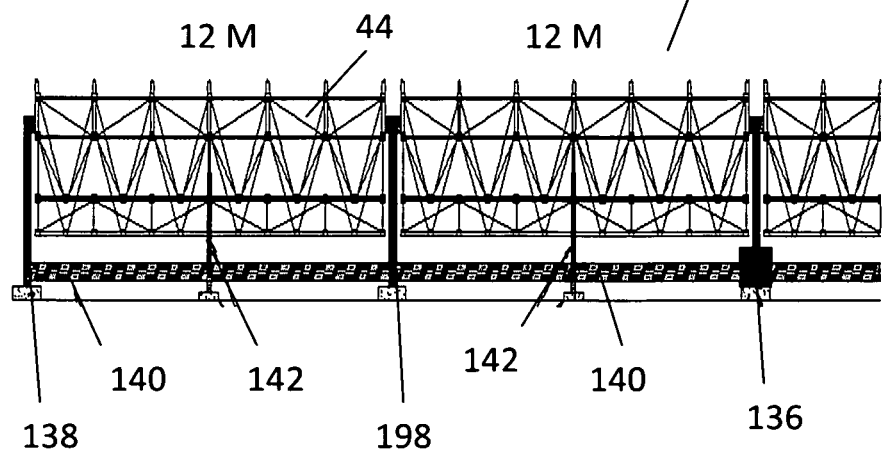
Figure 63:
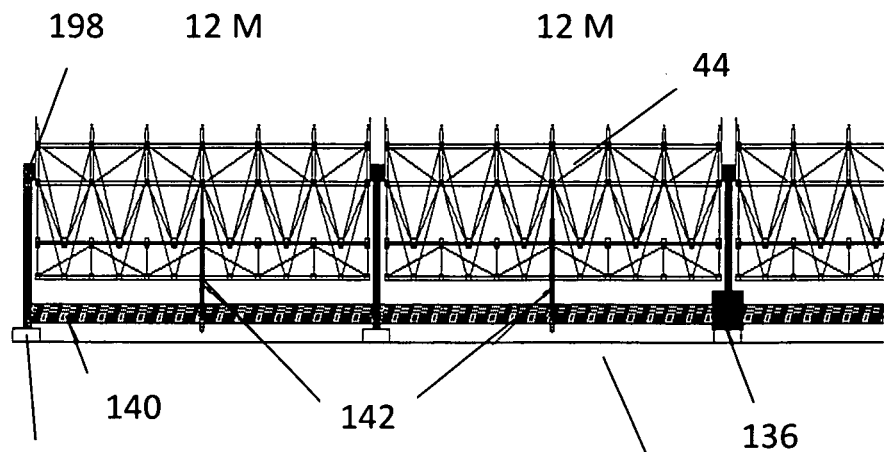
FIG. 63A shows rolling rib location concepts—Center RR with torque tube & no additional foundations.
FIG. 63B shows rolling rib location concepts—End RR with drives where two frames attach and no additional foundations.
Figure 63:
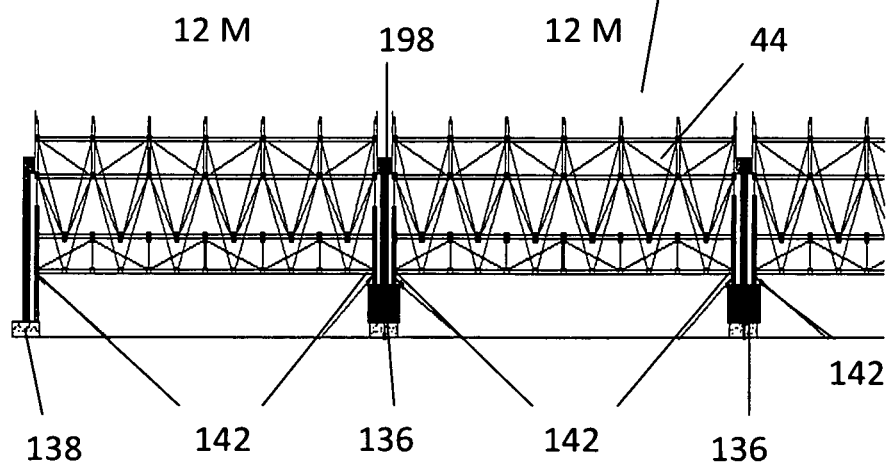
Figure 64:
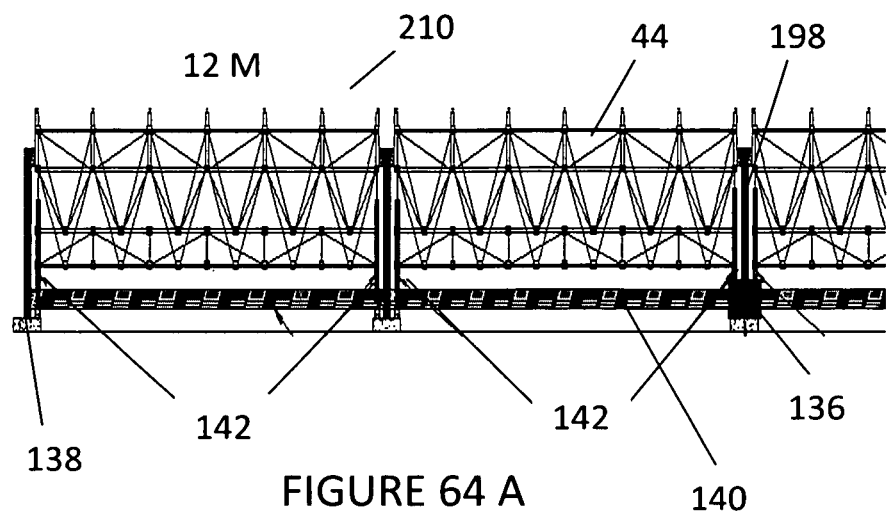
FIG. 64A shows rolling rib location concepts—End (both ends) RR with torque tube & no additional foundations.
FIG. 64B shows rolling rib location concepts—End (one end) RR with drives at every other two frame connection—half as many drives as in figure, no additional foundations.
FIG. 64C shows rolling rib location concepts—End (one end) RR with torque tube.
Figure 64:
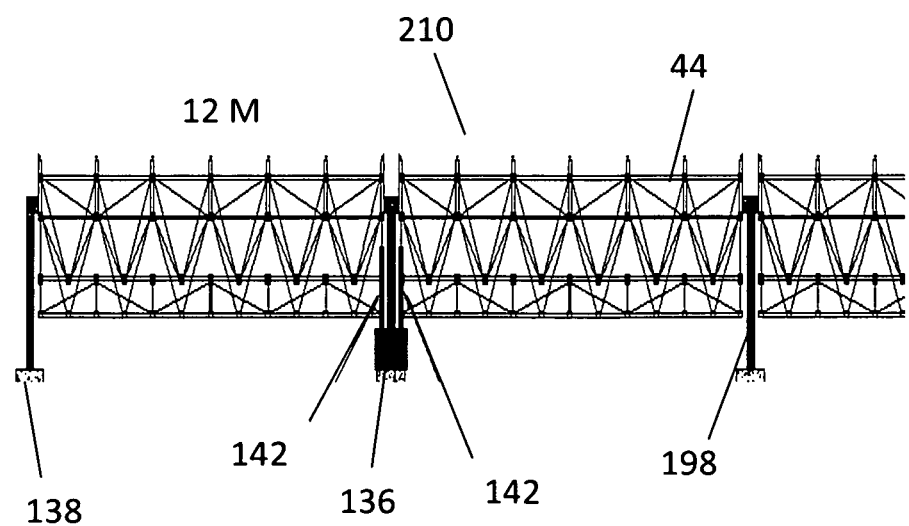
Figure 64:
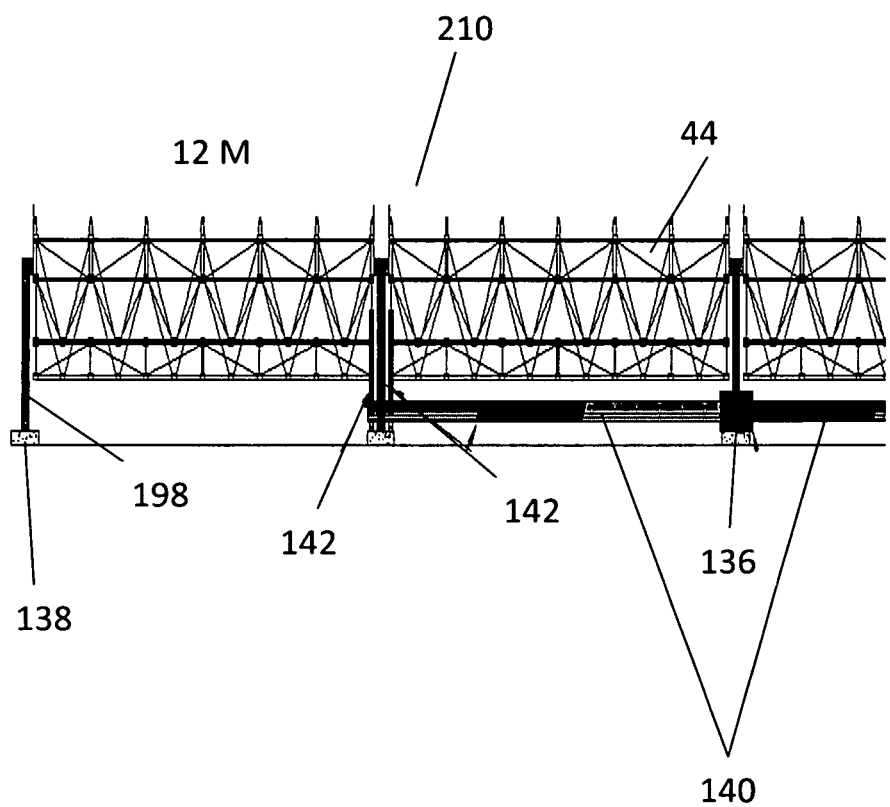
Figure 65:
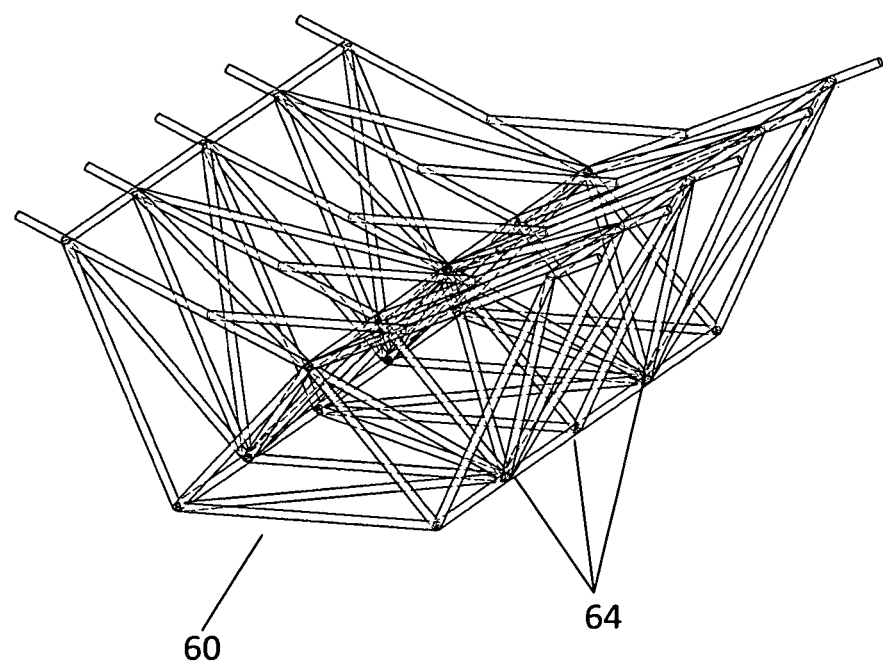
FIG. 65 shows a Series 3 frame ISO view.

The torque plate can be manufactured from single or multiple pieces of steel or other appropriate material. Each of these single or multiple pieces could be a flat plate or a non-flat plate (tubular shape, C-channel, L-shape or other, for example); FIGS. 59A and 59B show a single piece torque plate cut from plate steel while FIGS. 60A and 60B show a multiple piece torque plate manufactured from tubular steel (in the embodiment shown, the "arms" of the cross are a tube which inserts through and is fastened to the "body" of the cross). The torque plate has a "knob" on one side which fits onto the top of a support (pylon for example). The other side of the torque plate has one or more tubes attached to it into or onto which structural elements (nodes, for example) of the solar frame attach. Depending on the size, geometry and loading requirements of the design, the knob, the tubes or both the knobs and tubes may be attached to one side of the torque plate (welded, for example, although other means are possible) (the knob on one side and the tubes likely on the other, unless the structural parts of the solar frame (nodes for example) pass through the torque plate and engage with the tubes on the same side of the torque plate as the knobs). If the geometry/loading, etc. require, the torque plate can have an opening (or openings) cut or bored into it, into which the knob, tube or tubes is placed, either with clearance or interference fit. The knob, tube or tubes can then, as appropriate, be attached to either the side of the torque plate that the solar frame is on, the opposite side or both sides, as structural analysis dictates. The present invention pertains to an apparatus 208 for transmitting torque in a solar frame 44 having structural elements and a support, as shown in FIGS. 49-51. The apparatus 208 comprises a torque plate 114 having a first side and a second side. The apparatus comprises a knob 116 attached to the first side of the plate 114 for engaging the support. The apparatus comprises a plurality of tubes 134 attached to the second side of the plate 114 for receiving structural elements of the frame 44.

The present invention pertains to an apparatus 208 for transmitting torque in a solar frame 44 having structural elements and a support, as shown in FIGS. 49-61 and 62A-64C and 86 and 87. The apparatus comprises a torque plate 114 having a first side and a second side. The apparatus comprises a knob 116 which goes through and attaches to both the first and second side of the torque plate 114 for engaging the support. The apparatus 208 comprises a first tube 134 which goes through and attaches to both the first and second side of the torque plate 114 for receiving structural elements of the frame 44. The apparatus comprises a second tube which goes through and attaches to both the first and second side of the torque plate 114. The apparatus 208 comprises a plurality of additional tubes which go through and attach to both the first and second side of the torque plate.

The present invention pertains to a system 210 for solar mirrors, as shown in FIGS. 62A, 62B, 63A, 63B, 64A, 64B and 64C. The system 210 comprises a support, such as a pylon 198. The system 210 comprises a first frame engaged with the support on which solar mirrors are disposed. The system 210 comprises a second frame engaged with the support on which solar mirrors are disposed. The system 210 comprises rotational means disposed on either side of each frame for rotating the respective frame. The system 210 comprises a first force applying means, such as a drive unit 136, for applying a force to the first frame to move the first frame. The system 210 comprises a second force applying means for applying a force to the second frame to move the second frame.

The present invention pertains to a node 10 for a solar frame 44, as shown in FIGS. 1, 7, 10 and 22. The node 10 comprises an elongate portion 202 having a channel 206 extending through it in which a structural element is disposed or a solid elongate portion onto which a structural element is disposed. The node 10 comprises a fin 12 extending radially outward from the elongate portion 202 where at least 5% of the volume of the fin 12 is replaced by at least a single void extending essentially in the extrusion direction.

The present invention pertains to a node 68 for a solar frame 44, as shown in FIGS. 75-85. The node 86 comprises a solid elongate portion 132 having fastener holes 24 to which a structural element is attached with fasteners to the elongate portion 132. The node 68 comprises a fin 12 extending outward from the elongate portion 132 where at least 5% of the volume of the fin is replaced by at least a single void 204 extending essentially in parallel with the elongate portion 132.

There may be at least four fins 12, each of which has a void 204 of at least 5%, disposed about the elongate portion 132, and the elongate portion 132 and the fins 12 have a circle diameter of less than 12 inches. The circle diameter may be less than 8 inches. There may be at least three fins 12, each of which has a void 204 of at least 5% and a leg disposed on each side of the void 132, and at least one of the fins 12 has both of its legs attached to a leg of another fin 12. There may be at least two fins 12, each of which has a void 132 of at least 5% and a leg disposed on each side of the void 132, and at least one of the fins 12 has at least one leg attached to a leg of another fin 12.

The node can be manufactured from various materials and from various means (extrusion, casting, die casting, etc.), but a likely means of producing the node would be through aluminum extrusion; the remainder of this paragraph will describe a typical manufacturing sequence for the extrusion process—depending on the specific facility and equipment, there could be changes to the process. Depending on the circle size and the weight per ft. of the extrusion, and the availability of extrusion presses available (tonnage, billet diameter, etc.), an appropriate press and billet diameter will be chosen. For the hollow node/hollow fin and the solid node/hollow fin (hybrid) nodes shown in various figures in the patent application, for example, a press of 10 or 12" diameter would be appropriate for the hollow node/hollow fin sized for the large design criteria of that part, while a press of between 7 and 10" could be utilized for the hybrid node. The selection of billet diameter and press must be capable of producing the part; various selections may be possible, and chosing among them often is a matter of cost and equipment availability. A hollow extrusion die (porthole, taperseal or housing die) is designed and purchased. Depending on the alloy and facility capabilities, an appropriately sized billet is heated and delivered to the press and placed into the container. Each extrusion facility has operating practices which dictate temperatures, speeds, quench rates, stretching rates, aging practices, etc. The extrusion press compresses the billet against the die and when appropriate tonnage is reached, the extrusion of the metal through the die proceeds. Often the part is cooled from an elevated temperature and then stretched (straightened). The profile is then cut to appropriate length at the finish saw and stacked into an aging rack for subsequent artificial aging (heat treating). After aging the part is likely cut to a shorter length and then fabricated to produce the fastener holes, any notches or fin removal required.

In the operation of the invention, the present invention builds upon patent application Ser. Nos. 12/583,787; 12/587,043; 12/798,757 and 12/927,813, all of which are incorporated by reference herein. In these prior applications, there was included:

Mirror Support Structures using tubes 28 loaded axially
Modified I-beams as mounting means for Mirror Support Structures
Configuration of Main Supports/Longitudinal Members and Connectors
Strut 32 Designs
Strut end piece 30 concept and design
Means of fastening Strut end piece 30 to Connectors—via—pins 56, rivets, bolts or other fasteners, flat-to-flat
Fabrication and Assembly methodology
Automatic mirror cleaning/water collection/reclamation system
Single Fin Sleeve
Guided Insertion Strut end piece
Swaged Strut End Connection
Angled "Knuckle" Hinge Connector and Additional Alternative Strut and Strut end piece Designs The present invention covers the following aspects of the concentrated solar power frame 44 design:

Hollow single fin node 10

Hollow single fin node 10 design utilizing chord 28 and chord end piece 26—vs—through chord 28 (including more detail on node designed to best accommodate the hollow single fins 12)

Torque plate 114 solid node 106 design

Rolling rib 142 location concepts

Other design elements:
  Beam 36 and Beam end piece 34 Connector design
  Angled Beam 36 w/Beam end piece 34 on one end/bracket 158 on the top, eliminating extra piece beyond Nodes A & B
  Mirror Support Rail and Bracketry designs
  Mirror rail to mirror bracket 162 designs
  Mirror rail to Beam connection 164, 166 designs
  Collector tube upright 152 connection designs
  Pin 56 and clip designs The current invention builds on prior designs of single fin sleeves and guided insertion strut end including modifications to the design of the single fin/strut end connection through the use of hollow fins 12. The strut 32 assemblies must carry tensile and compressive loads which vary widely as the frame 44 rotates to follow the path of the sun and as environmental conditions (e.g. wind) change; the space frame 44 and its components are designed to carry the maximum working and storage position loads (the frame 44 can be "stowed" to withstand high winds, but isn't collecting solar energy during this time). The prior single fin and strut assembly (including the guided insertion design) carry these loads and transfer them through the strut 32, to the strut end piece 30 (if used) and then into the node 68 (hereafter called "sleeve 68") via the sleeve fins 90.

The present invention also contains details of how the segmented chords 28, solid nodes 106, torque plates 114, collector tube uprights 152 and various other solar frame 44 components are designed.

Hollow Single Fin Node 10

The hollow single fin 12 design shown in FIG. 1 enables these loads to be "split" between each leg of the hollow fin 12, transferring the force from the strut 32 to each leg. Designs with the hollow sleeve single fin have more evenly distributed loads around the periphery of the node sleeve 68 and thus has shorter unsupported spans 14 of the sleeve 68 material between the fins 12, resulting in lower deflections and stresses. For solid elongate nodes, the hollow sleeve single fin provide a more linear transfer of the axial forces from the structural elements attached to them as well as increased resistance to side-loading where the fin is used in this manner (for a beam or beam end piece connection, for example). Circle sizes 94 of the hollow single fin 12 sleeves 68 are also reduced due to the geometry of where the legs meet the sleeve body, which aids extrudability and the size of the press that the profile can be run on (the fin 12 length is determined by the fasteners 72 and requisite hole-to-edge distances for both the fin 12 and for the mating strut end piece fins; because hollow fins 12 "radiate" out from the node sleeve 68 on either side of what would be a central single solid fin 90, they attach to the sleeve 68 as the profile "pulls back" from the tangent point of the single solid fin 90, leading to a smaller extruded circle size 94). If the design calls for a strut end piece 30, design details will show that for the same weight of part, the deflections and stresses are lower. The only downside to the design is a slight increase in extrusion difficulty, which could manifest itself in slightly slower extrusion velocities.

Figure 9:
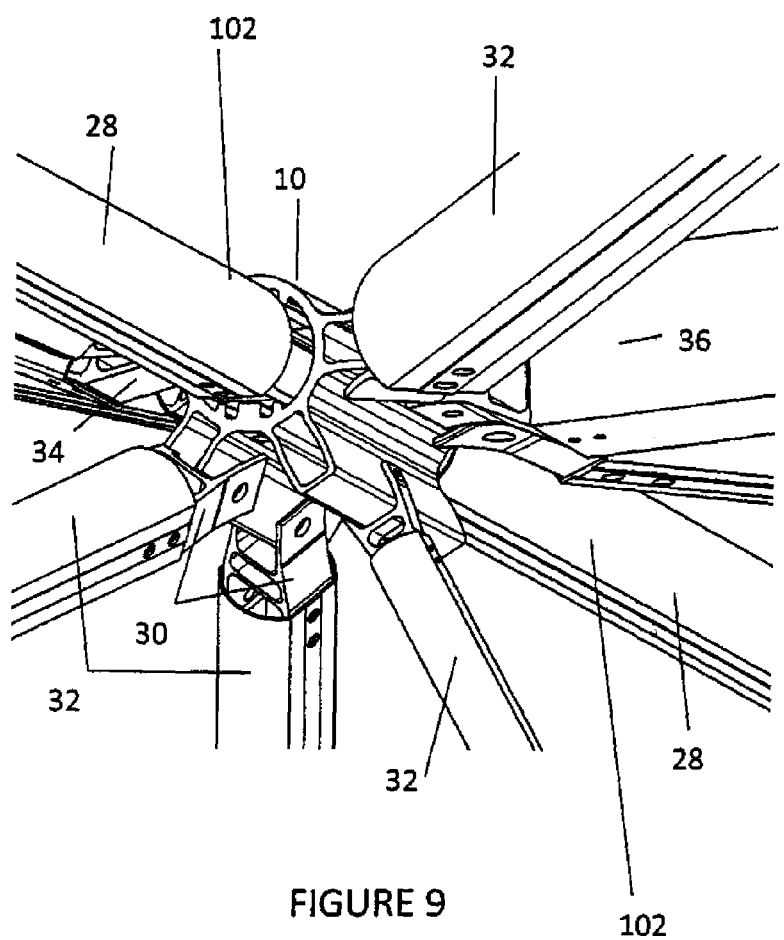
FIG. 9 is a hollow single fin node complete with all SEP, CEP, BEP & struts, chords, & beams.—Bottom ISO view.

The frame 44 design utilizing segmented chords 28 has been described in prior patent applications. This invention provides additional design concepts re: the chord end piece 26 to node design, showing a good embodiment of a hollow (or solid) node elongate portion utilizing hollow single fins 12 onto which the struts 32 attach, often utilizing strut end pieces 30, as shown in FIG. 9.

Figure 10:
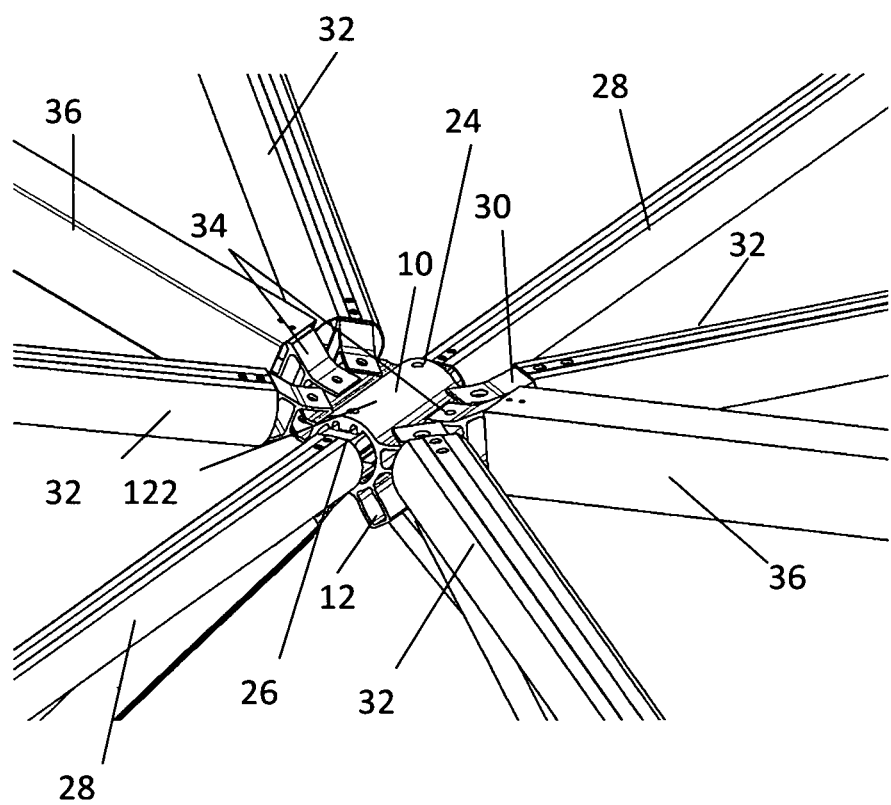
FIG. 10 is a hollow single fin node complete with all SEP, CEP, BEP & struts, chords, & beams—Top ISO view (close up).

FIG. 10 shows Node C 122 as fabricated (cut to length, notched for strut end piece 30 interface and fastener holes 24 shown), with the chord end pieces 26, beam end pieces 34 and strut end pieces 30 shown with their associated chords 28, beams 36 and struts 32 also shown.

Figure 13:
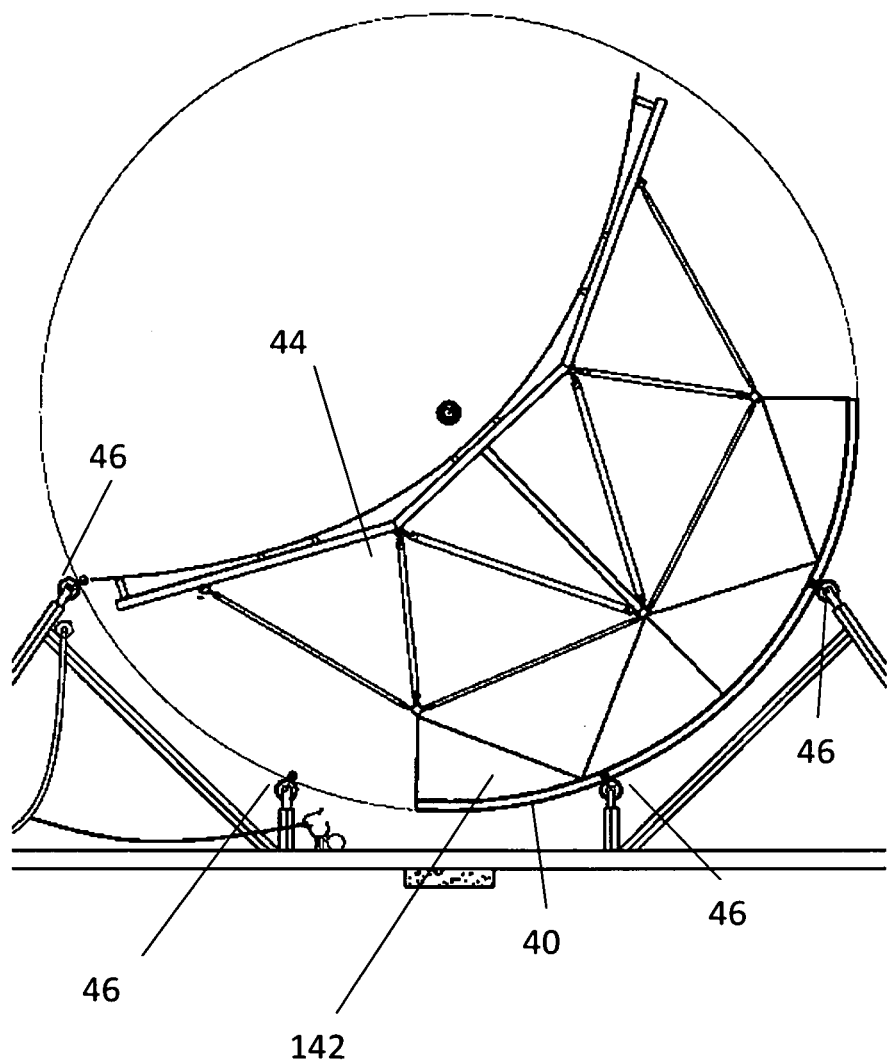
FIG. 13 is a rolling rib location concept—End view.

The rolling rib 142 concept was disclosed in prior patent application work. The present invention builds on this, showing possible additional mounting locations for the rolling rib 142, as shown in FIGS. 13, 14 and 63B. The use of a torque tube 140 providing motive force to the frame 44 via a rolling rib 142 eliminates the "frame-on-frame" induced torque, which adds greatly to the RMS slope error (optical misalignment) of the frame 44. Frame 44 analyses has shown that much of the slope error RMS is due to deformation from the effect of additional frames applying torque to the frame(s) between them and the drive; the rolling rib 142 eliminates this.

Mounting the rolling rib 142 in the center of the frame 44 may require additional foundations 138 to support the torque tube 140 and potential roller housings 38 as shown in U.S. patent application Ser. No. 12/583,787. By incorporating the rolling rib 142 into one or both ends of the frame 44, the torque tube 140 supports and roller housings 38 can be incorporated in the pylon 198 design.

Other Design Elements:
Beam 36 and Beam end piece 34 Connector design
Angled Beam 36 w/Beam end piece 34 on one end and bracket on the top, eliminating the extra piece beyond Nodes A and B
Mirror Support Rail and Bracketry designs
Mirror rail to mirror bracket 162 designs
Mirror rail to Beam connection designs
Collector tube upright 152 connection designs As the design work for the solar frames 44 progressed, additional design features of some of the parts were developed; these use easy to extrude profiles designed for ease of fabrication and assembly; designed to meet the exact loading needs of the parts. Some of these concepts were disclosed in earlier patent application work—this invention provides additional detail.

Hollow Single Fin Node 10

FIGS. 18A, 18B and 18C show both direct strut 32 to sleeve fin 12 connections, reinforced strut 32 with plates 88 at sleeve fin 12 connections and separate strut 32 to strut end piece 30 to sleeve fin 12 connections.

Figure 19:
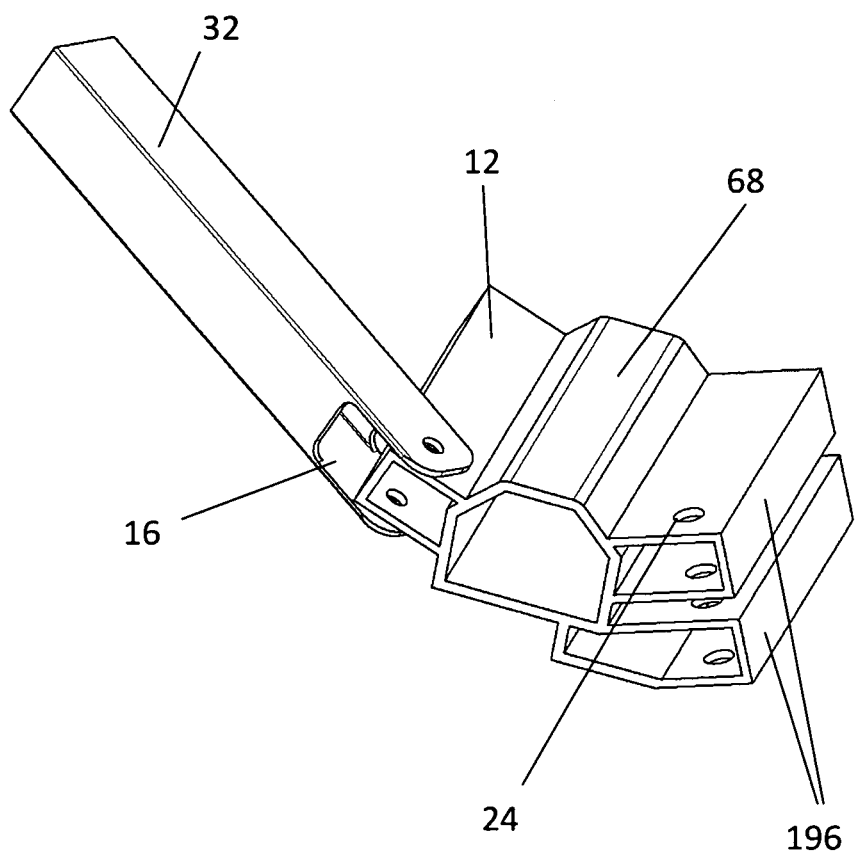
FIG. 19 shows a hollow fin node with notched strut attached to single hollow.

FIG. 19 shows a strut 32 attached to hollow single fin 12 of sleeve 68 also having a hollow double fin 196.

Figures 20, 21:
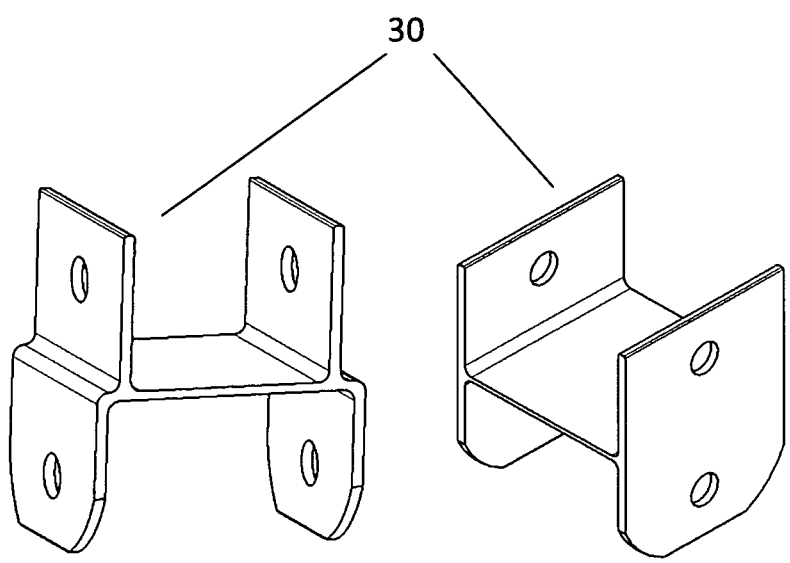
FIG. 20 shows an "H" strut end piece for hollow fin node (single hollow).
FIG. 21 shows an "H" strut end piece for hollow fin node (double hollow).

FIGS. 20 and 21 show early renditions of strut end pieces 30.

Figure 22:
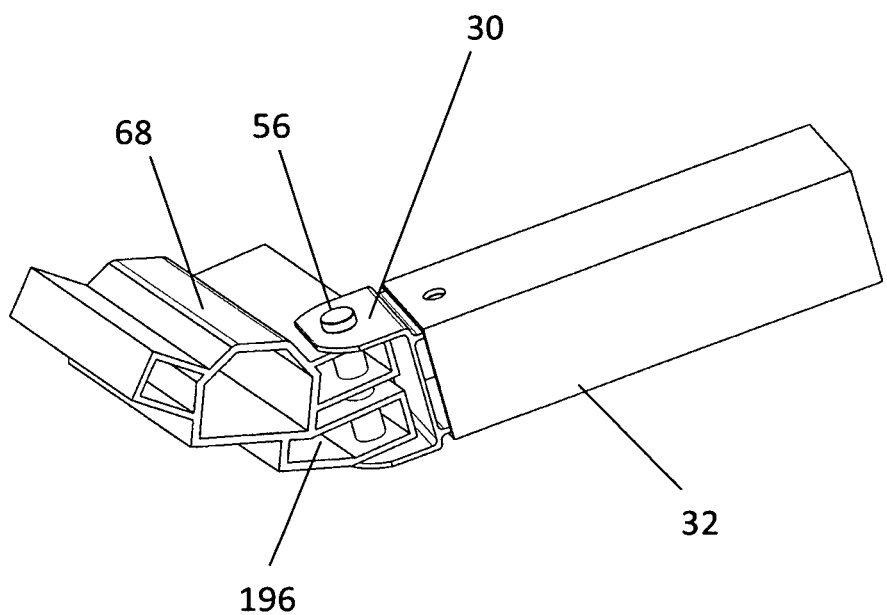
FIG. 22 shows a hollow fin node (single & double hollow) with strut and SEP attached to double hollow.

FIG. 22 shows a strut 32 attached with a pin 56 to hollow double fins 196 of sleeve 68 with strut end piece 30 showing how a narrower strut 32 can attach to a wider connection point if needed.

Figure 23:
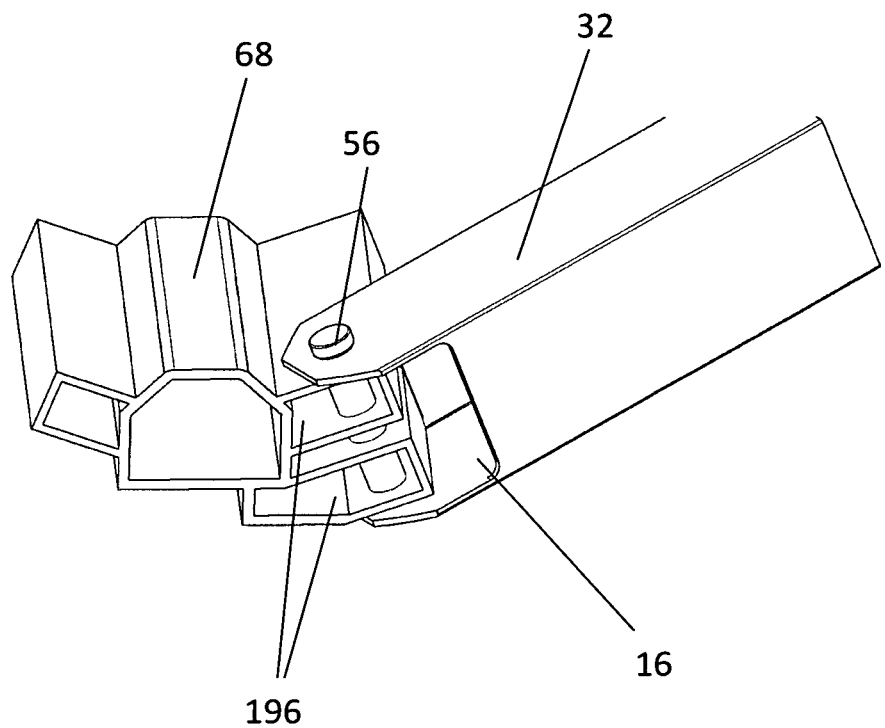
FIG. 23 shows a hollow fin node with notched strut attached to double hollow.

FIG. 23 shows a strut 32 attached to hollow double fins 196 of sleeve 68.

The present invention further advances the design of the single fins of the sleeve 68 and the mating strut end piece fins.

Figure 24:
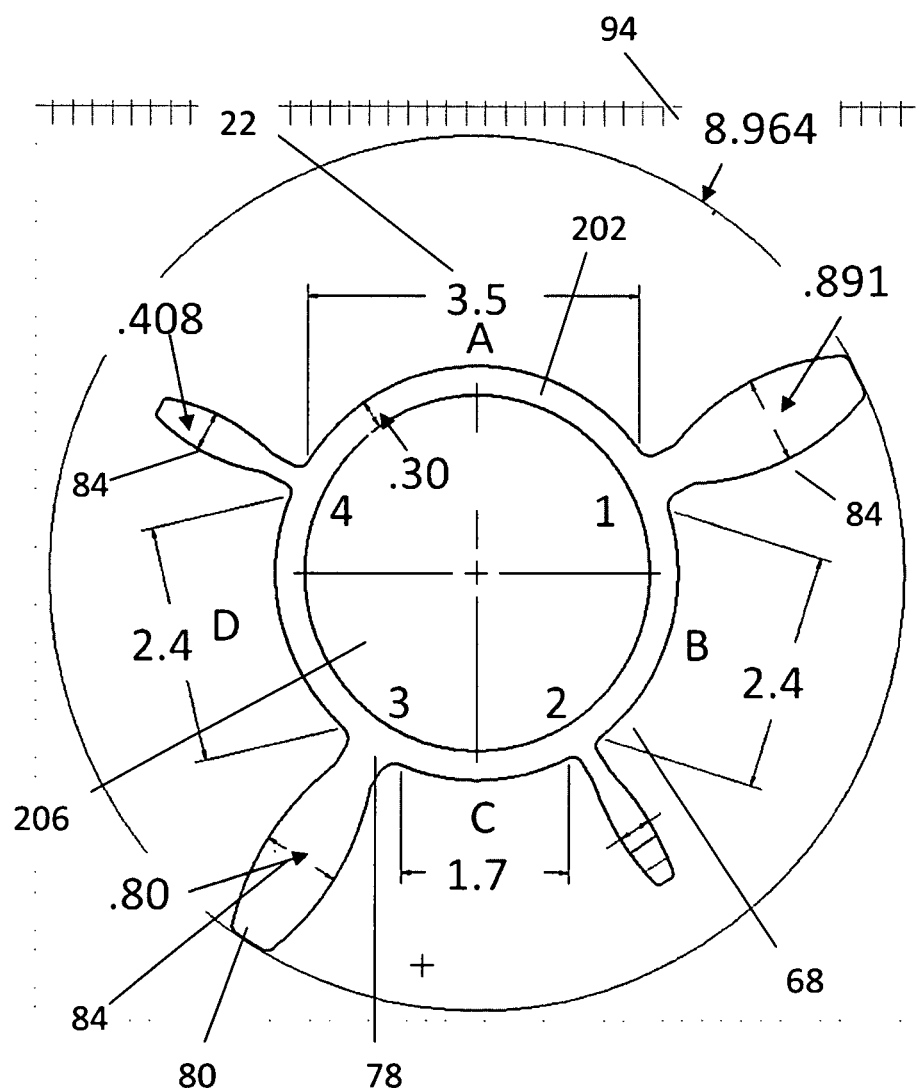
FIG. 24 shows a solid single fin node.

The present invention focuses on improvements to the design of the sleeve 68 single fins 12 and mating strut end pieces 30. The design shown in FIG. 24 and the figures which follow uses four solid fins 90, tapered where they meet the elongate portion 202 and at the tips 80, thicker in the middle; depending on the frame 44 geometry and sleeve 68 location, fewer or greater numbers of fins 90 may be utilized. The maximum thickness 84 (center bulge) of each fin 90 is designed to accommodate the tensile and compressive forces carried through the fastener 72—the interface between the pin 56 and the sleeve 68 fin 90 location determines the point of bearing stress and defines the cross section required at this point; generally, the thickness is defined by this maximum permissible bearing stresses at the fastener 72 interface, although stress at net section or block shear calculations could be the limiting factor. The fin(s) are thinner at the fin base 78 where they meet the elongate portion 202 to save material (cost and this shape/circle size 94 will tax the capabilities of an extrusion operation capable of utilizing 10" diameter billets—there are many such presses but fewer of a larger size, which would limit production onto fewer (and correspondingly more expensive facilities). The same philosophy (reduce total weight) would exist whether attempting to produce parts on extrusion presses larger or smaller than 10" diameter The fin(s) taper at the tips 80 both to limit weight of the sleeve 68 and to make the assembly of the strut 32 assemblies onto the fin easier (the strut 32 assemblies (Strut 32+2 end pieces) can be large, heavy and bulky and some may require two hands to manipulate—the tapered fin end and "guided insertion strut end piece" (inventions in the prior patent application) help to accomplish this. The minimum "tip" thickness is defined by the block shear calculation done if the strut end piece 30 is in tension (how much fin 90 material is needed to ensure that the "fastener" doesn't tear out a "block" of it). A, B, C and D are unsupported spans 22 between the solid fins 90 in FIG. 24. The forces relative to the fins 90 converge at common point 76.

The iterations done as part of the invention confirmation which follows use the minimum required bearing stress calculated thickness spread across a single fin and through a hollow single fin 12 with total wall thicknesses equal to this minimum.

The hollow fin(s) 12 of the sleeve 68 allow the tensile and compressive forces of the strut 32, transferred directly to the sleeve 68 or through strut end pieces 30 to be more "linear" with less focusing down of the "width" of the forces from the full cross section of the strut 32 to the sleeve fin. The forces also act on the sleeve 68 in a different fashion, with the hollow creating ½ of the force acting in two locations. Note that the hollow fin 12 can have parallel sides (a simple box type) or can have non-parallel sides (in fact each wall can be of constant or varying cross section as best meets the design criteria for the particular part), mimicking the sleeve fins shown previously; these act in concert with the guided insertion strut end pieces 30 or even with simple slotted struts 32 in a manner to make assembly of the frame 44 simpler, as the curve presents a "guide" to help slip the sometimes large, bulky, heavy struts 32 and strut 32 assemblies onto the sleeve fin(s) for fastening.

TABLE 1

| DESCRIPTION (WALL THICKNESS) | MAX. FIN WIDTH | POSITIONS OF UNSUPPORTED SPAN BETWEEN FINS | | | | CIRCLE SIZE | LBS PER FT | MAX DEF (IN) | MAX. EQUIV STRESS (KSI) | MAX. EQUIV STRESS (KSI) |
|---|---|---|---|---|---|---|---|---|---|---|
| | | A | B | C | D | | | | | |
| SSF .300 | 0.89 | 3.5 | 2.4 | 1.8 | 2.4 | 8.9 | 9.1 | 0.012 | 44,336 | 21,150 |
| SSF .225 TO .375 | 0.89 | 3.6 | 2.5 | 1.8 | 2.5 | 9.1 | 9.6 | 0.010 | 42,102 | 21,000 |
| HF - NARROW .300 | 1.66 | 2.9 | 1.6 | 0.9 | 1.6 | 8.8 | 9.9 | 0.007 | 34,301 | 14,000 |
| HF- MED. .300 | 1.91 | 2.7 | 1.4 | 0.6 | 1.4 | 8.8 | 9.9 | 0.006 | 29,402 | 14,500 |
| HF WIDE .300 | 2.05 | 2.6 | 1.2 | 0.5 | 1.2 | 8.7 | 9.7 | 0.006 | 30,238 | 19,850 |
| HF WIDE .865 PIN .300 | 2.16 | 2.4 | 1 | 0.2 | 1 | 9.5 | 10 | 0.005 | 27,166 | 10,700 |
| SSF - SEP | 1.09 | NA | NA | NA | NA | 8.4 | 8.7 | 0.005 | 21,746 | 14,750 |
| H F WIDE - SEP | 2.15 | NA | NA | NA | NA | 8.5 | 8.3 | 0.005 | 28,436 | 18,400 |
| H F WIDE SEP | 2.15 | NA | NA | NA | NA | 8.5 | 8.7 | 0.004 | 18,209 | 14,000 |

SSF = SINGLE SOLID
SEP = STRUT END
HF = HOLLOW FIN
(NUMBERS HAVE BEEN ROUNDED UP)

Table 1 shows the various profile designs and resulting lbs/ft weight, circle size 94, deformation and stress levels (assuming a 12,000 lb. maximum tensile or compressive force, used for the example calculations). Note that the "single solid fin 0.225 to 0.375" wall results in believed acceptable levels of deformation (0.0097") under full load and stress (21,000 psi—which is just below the maximum permissible taking acceptable safety factors into account). As the fin 90 is hollowed and the hollow portion becomes wider, the forces are spread more evenly along the interior "periphery" of the sleeve profile, and the unsupported spans 22 are reduced, leading to improved maximum deformation and stresses (the "best case", for this particular design would appear to be the "medium width" hollow fin 98).

The strut end pieces 30 associated with the single solid fin 90 and the wide width hollow fin 100 are similar, although slightly better for the "wide hollow fin 100", holding the weight per ft. of the part constant.

Figure 25:
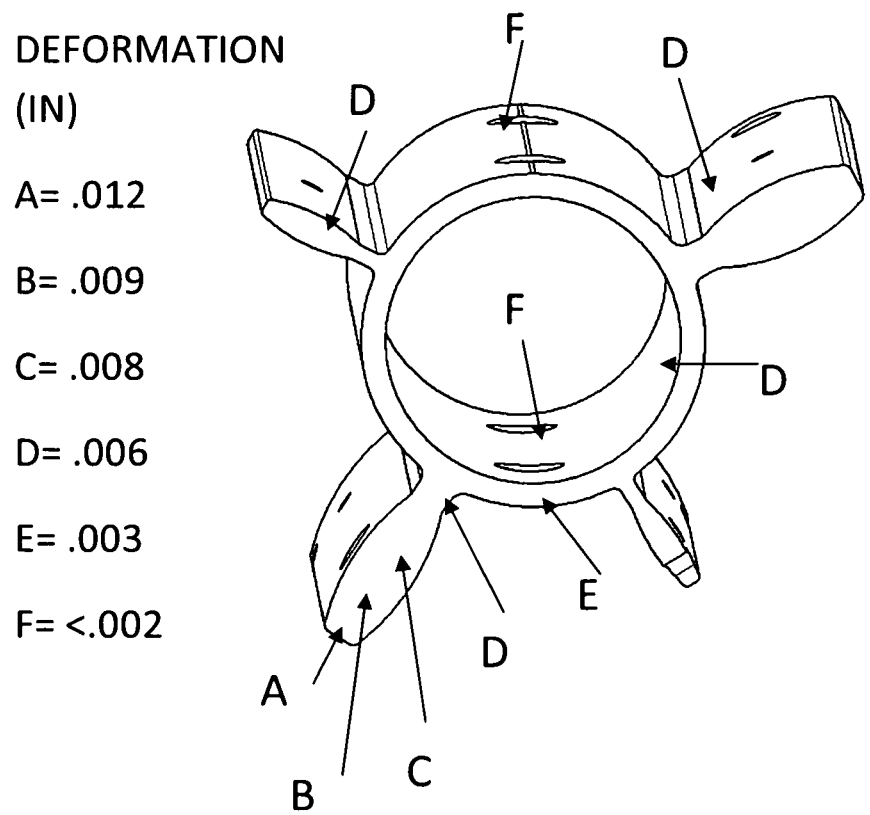
FIG. 25 shows a solid single fin node FEA—Deformation.
Figure 26:
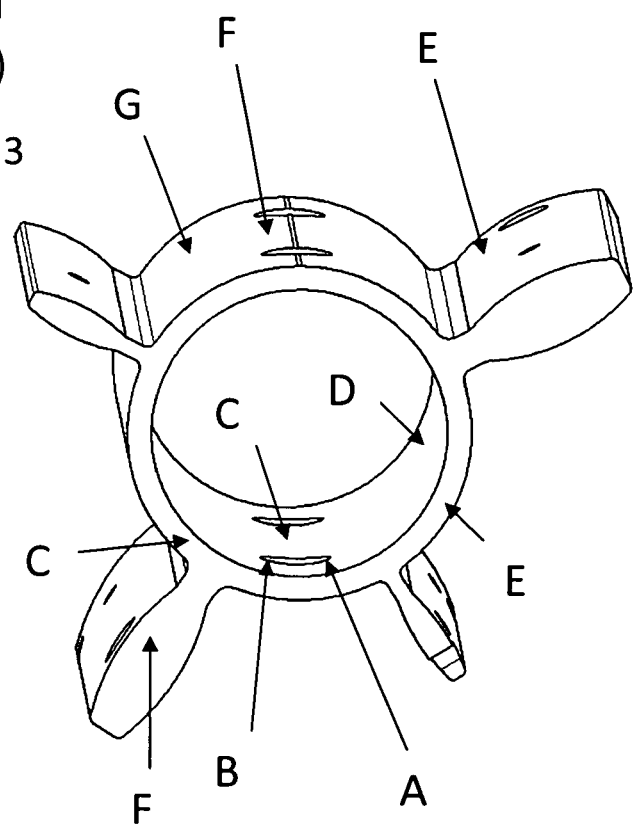
FIG. 26 shows a solid single fin node FEA—Equivalent Stress.

FIGS. 25 and 26 show the design, deformation and stresses for a single fin sleeve designed to encompass a tubular chord 28 or for use with chord couplers or chord end pieces (profile designs other than a simple circular shape would show similar effects). The 0.300" wall thickness of the portion which would surround the central chord 28 was held constant in all designs to better understand how varying the hollow fin width affects the results (except for the next one, which was specifically modified in attempts to reduce the total weight of the sleeve profile to keep it readily extrudable on a 10" diameter extrusion press (12,000 lb. max tensile or compressive force)).

Figure 28:
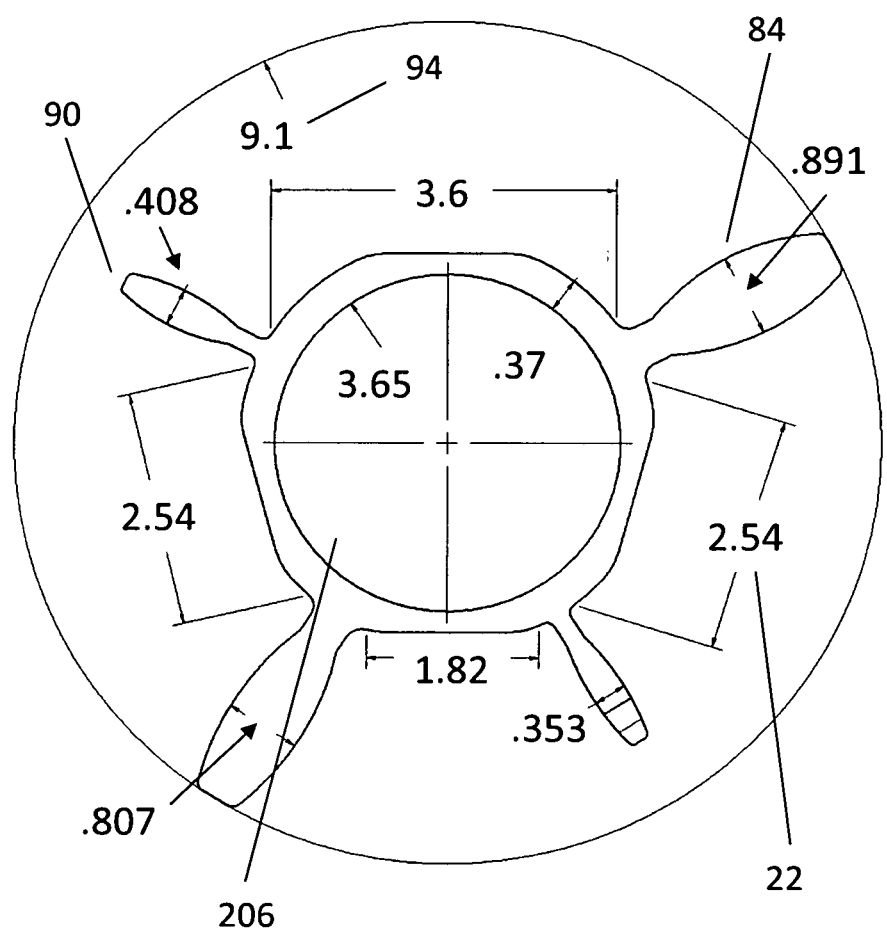
FIG. 28 shows a solid single fin node with flats on main diameter.
Figure 29:
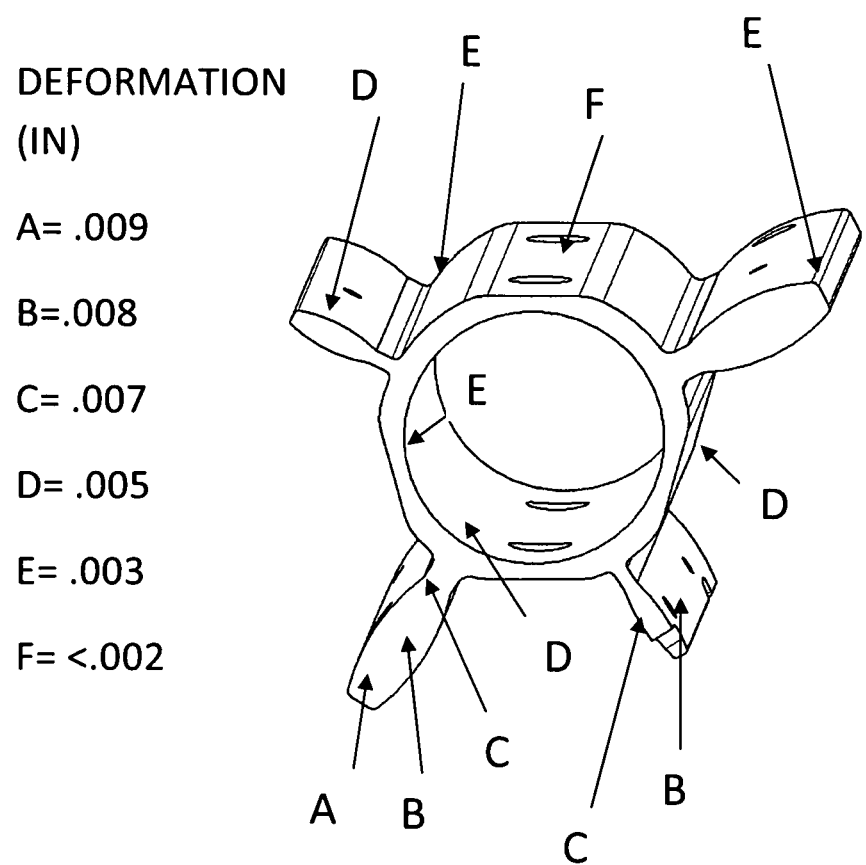
FIG. 29 shows a solid single fin node with flats on main diameter FEA—Deformation.
Figure 30:
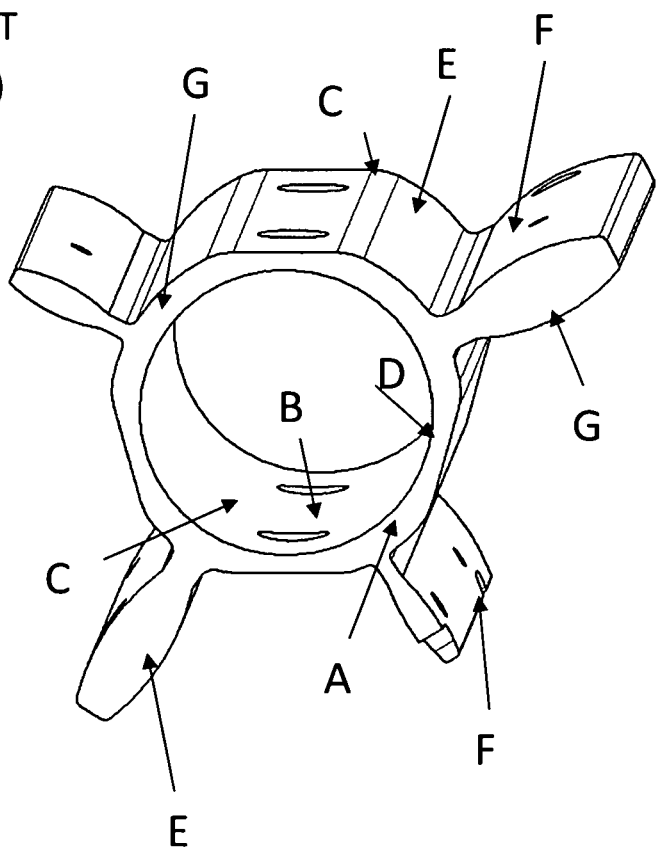
FIG. 30 shows a solid single fin node with flats on main diameter FEA—Equivalent Stress.

FIGS. 28, 29 and 30 show the design, deformation and stresses for a single fin sleeve designed to encompass a tubular chord 28 or for use with chord couplers or chord end pieces. The wall thickness of the portion which would surround the central chord 28 was specifically modified in attempts to reduce the total weight of the sleeve 68 profile to keep it readily extrudable on a 10" diameter extrusion press (12,000 lb. max tensile or compressive force loading on the highest loaded structural element attached to the sleeve).

Figure 31:
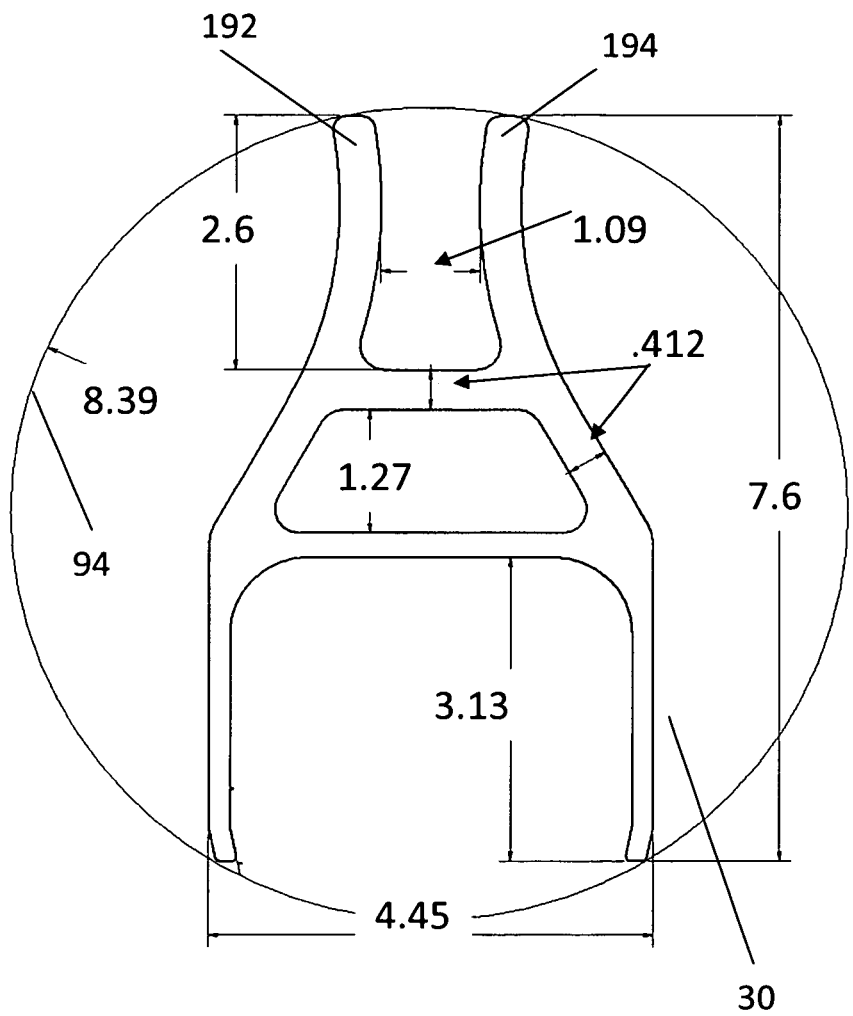
FIG. 31 shows a solid single fin SEP (strut end piece).
Figure 32:
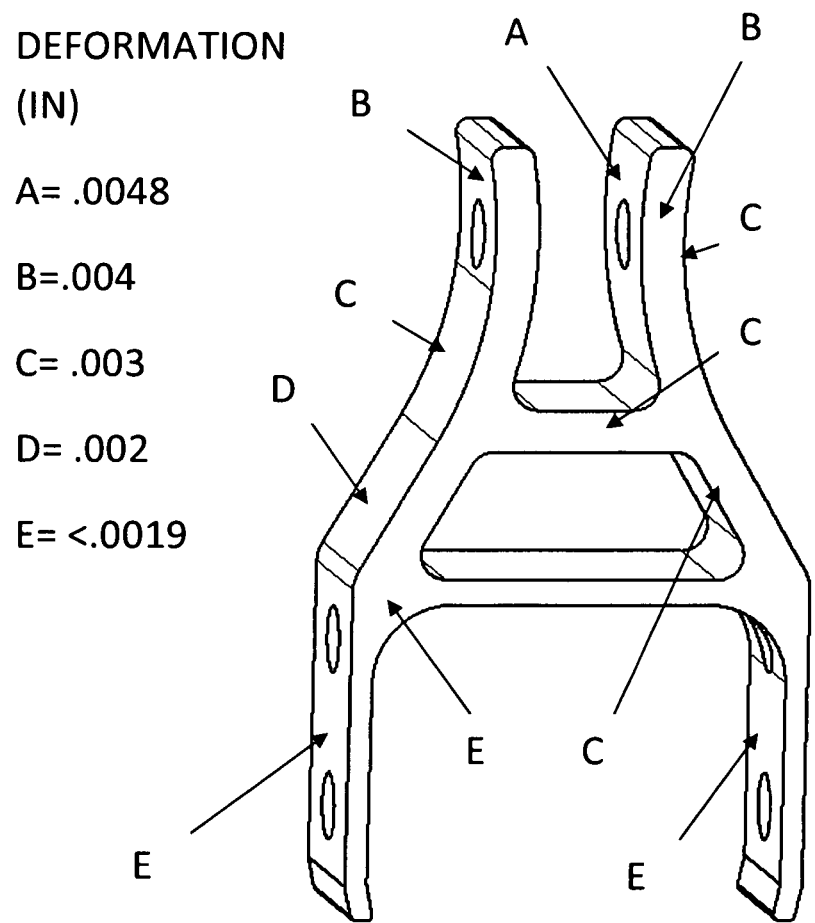
FIG. 32 shows a solid single fin SEP (strut end piece) FEA—Deformation.
Figure 33:
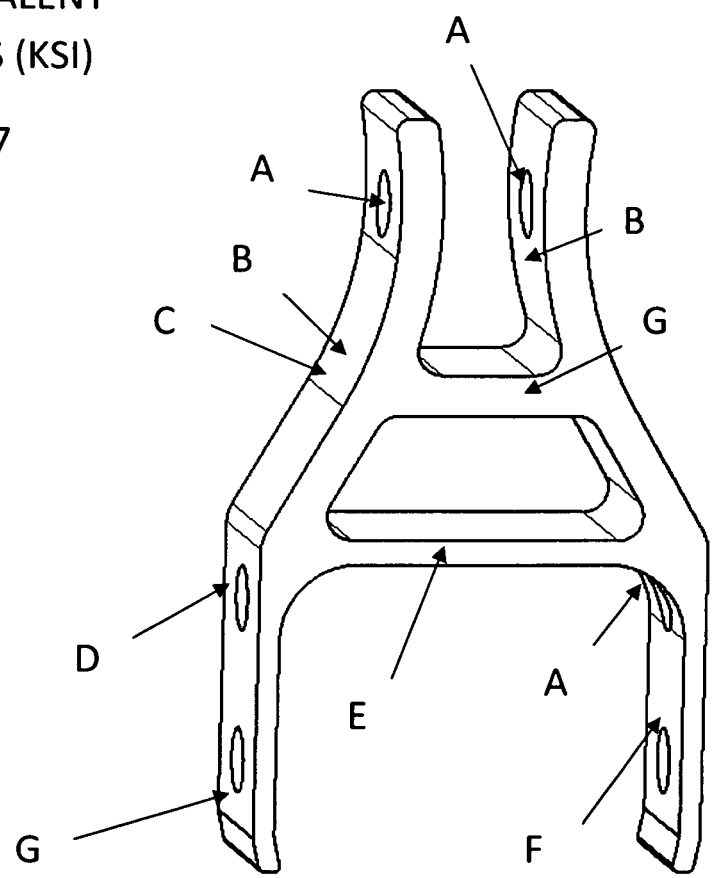
FIG. 33 shows a solid single fin SEP (strut end piece) FEA—Equivalent Stress.

FIGS. 31, 32 and 33 show the cross sectional design, deformation and stresses of a strut end piece 30 designed to work with the single fin sleeve design (12,000 lb. max tensile or compressive force).

Figure 34:
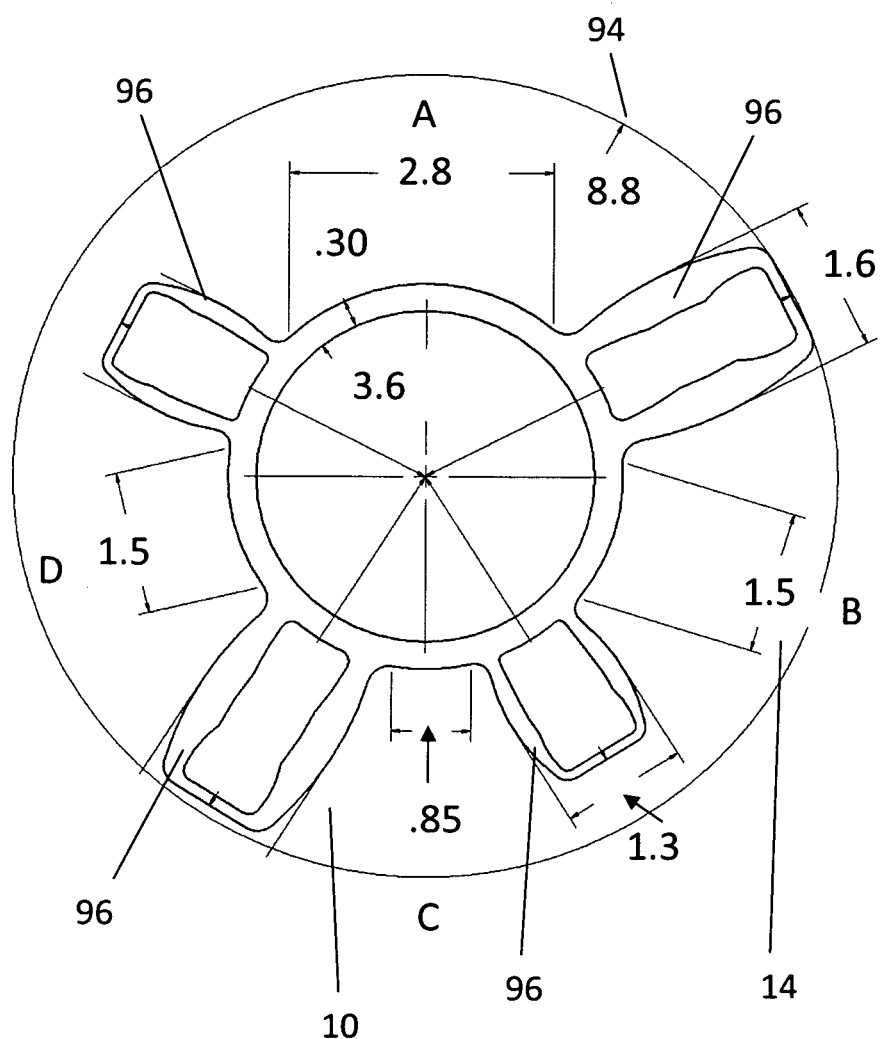
FIG. 34 shows a hollow single fin node "narrow".
Figure 35:
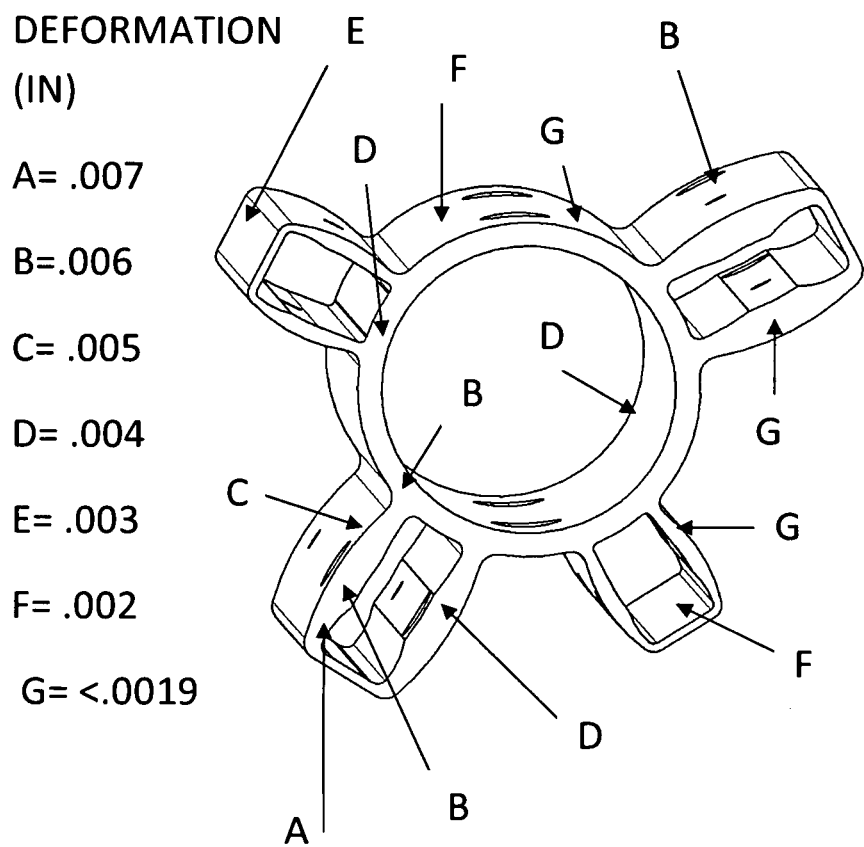
FIG. 35 shows a hollow single fin node "narrow"—FEA—Deformation.
Figure 36:
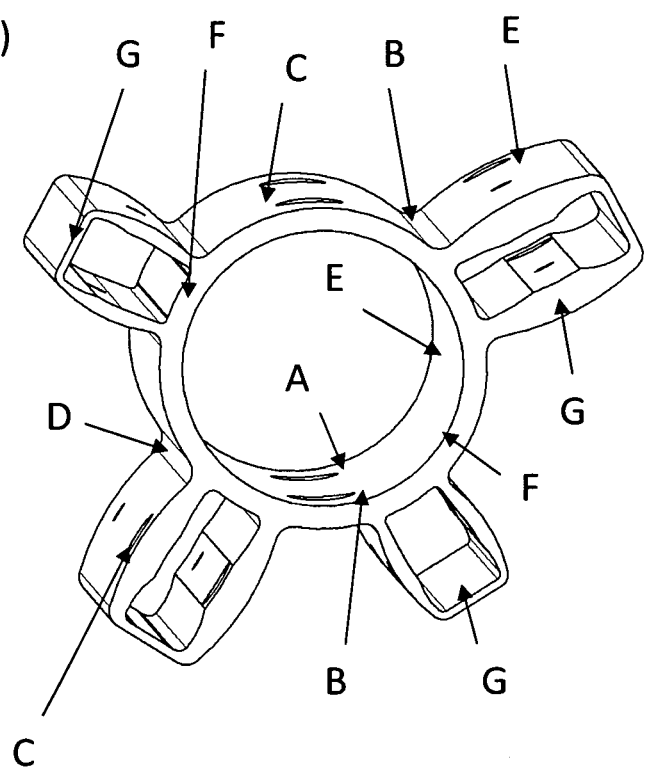
FIG. 36 shows a hollow single fin node "narrow"—FEA—Equivalent Stress.
Figure 37:
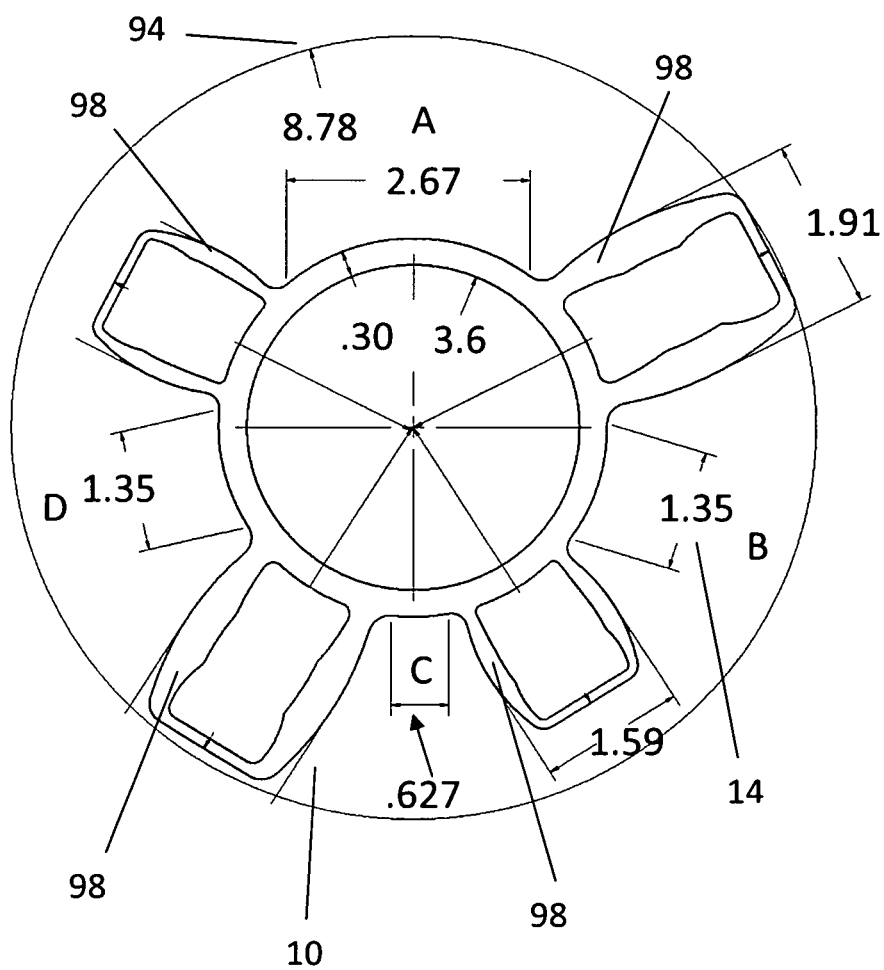
FIG. 37 shows a hollow single fin node "medium".
Figure 38:
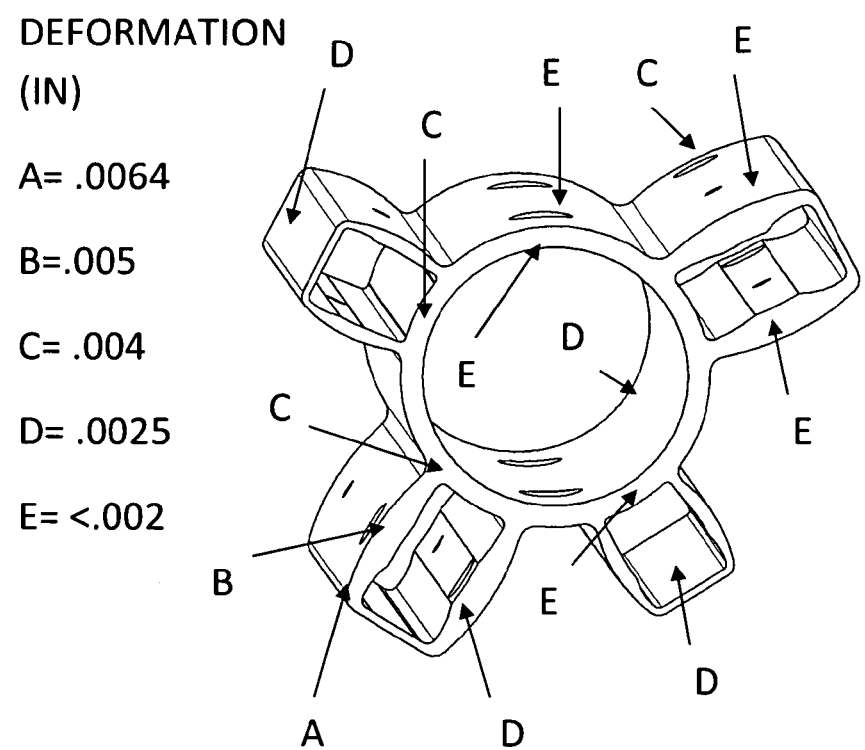
FIG. 38 shows a hollow single fin node "medium" FEA—Deformation.
Figure 39:
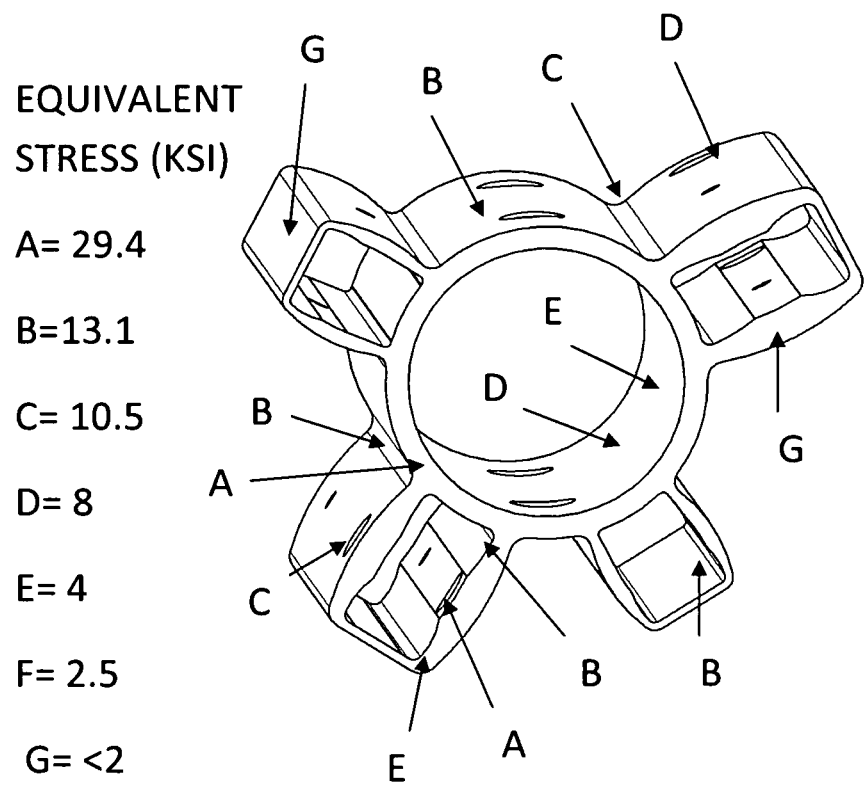
FIG. 39 shows a hollow single fin node "medium" FEA—Equivalent Stress.
Figure 40:
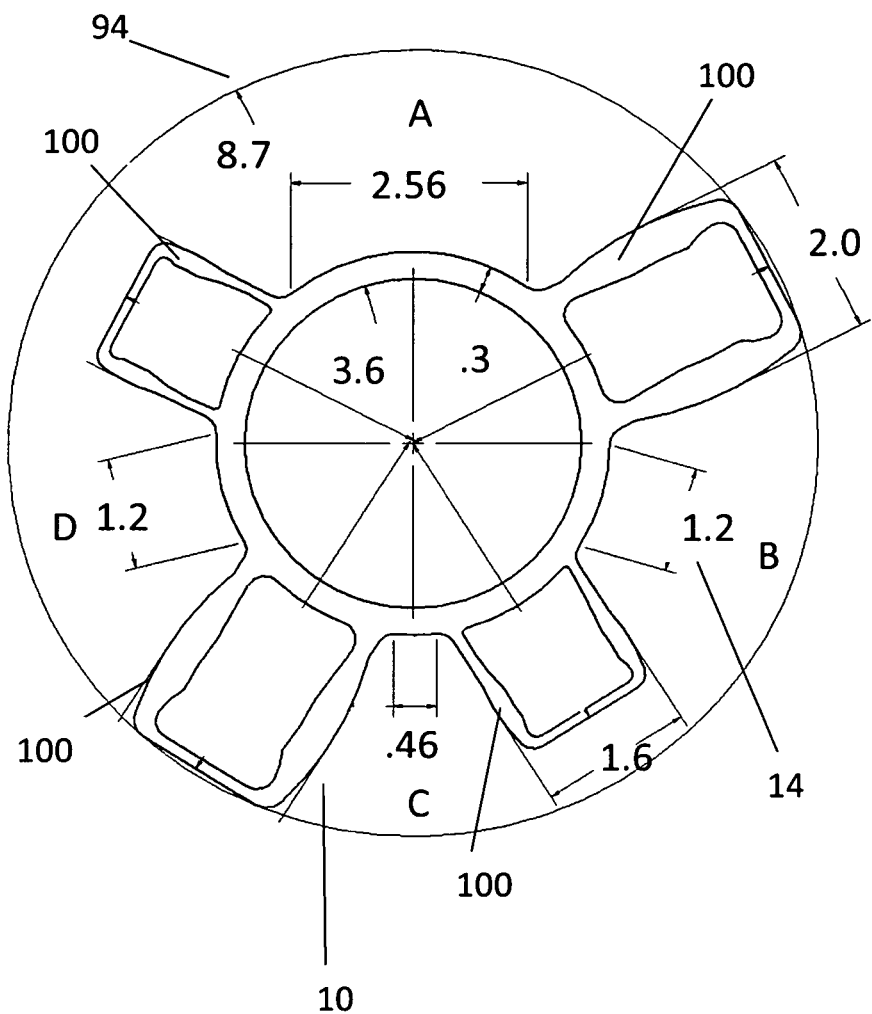
FIG. 40 shows a hollow single fin node "wide".

FIGS. 34, 35, 36, 37, 38, 39, 40, 41 and 42 show the design, deformation and stresses for a single fin sleeve designed to encompass a tubular chord 28 or for use with chord couplers or chord end pieces, with the fins being hollow; the first three are for a "narrow" hollow fin 96, the next three for a "medium" hollow fin 98 and the remaining three for a "wide" hollow fin 100 design. Note that as the hollow portion widens, the unsupported portion 14 of the profile surrounding the central chord 28 narrows. The 0.300" wall thickness of the portion which would surround the central chord 28 or mate with the chord couplers or chord end pieces was held constant in all designs (except for the next one, which was specifically modified in attempts to reduce the total weight of the sleeve profile to keep it readily extrudable on a 10" diameter extrusion press (12,000 lb. max tensile or compressive force); the 0.300" wall was held constant to better understand the effects of varying the hollow fin width. A, B, C and D in FIGS. 34, 37 and 40 are unsupported spans 14 between the hollow fins. The nodes shown in these figures are hollow nodes, which geometrically create more space for the legs of the hollow fins to attach; solid nodes can be used, depending on the geometric design.

Figure 41:
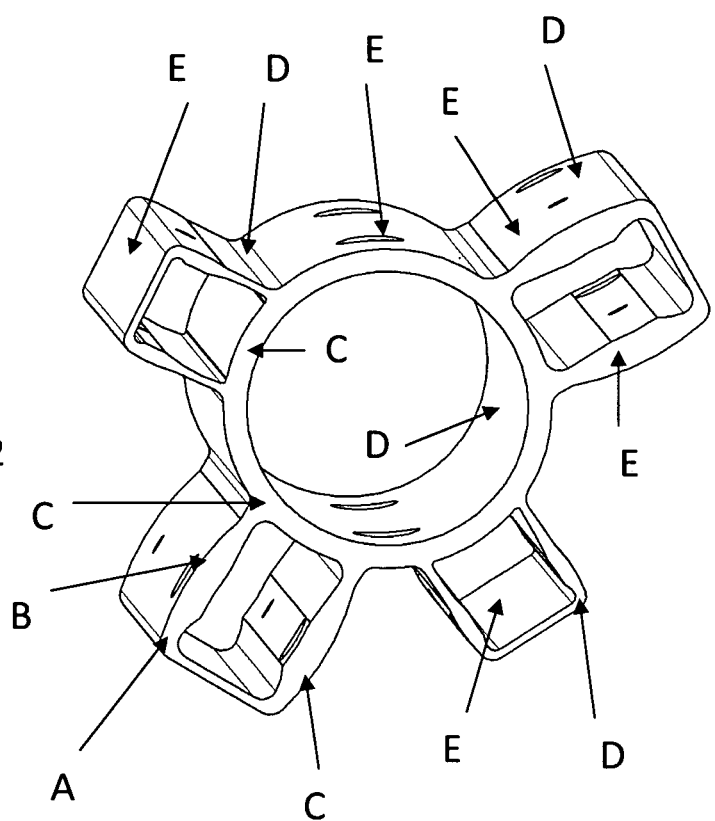
FIG. 41 shows a hollow single fin node "wide" FEA—Deformation.
Figure 42:
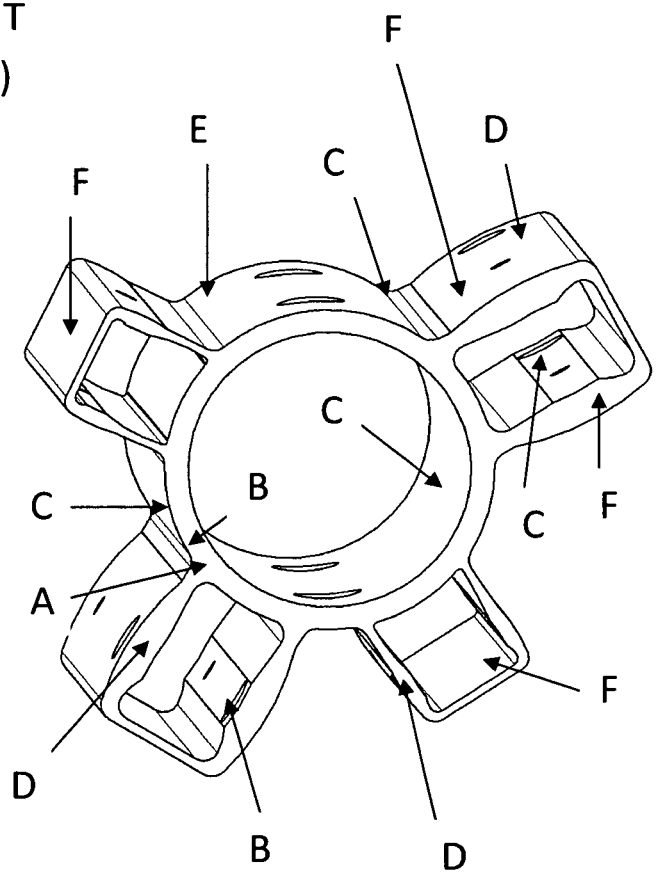
FIG. 42 shows a hollow single fin node "wide" FEA—Equivalent Stress.

FIGS. 40, 41 and 42 show the design, deformation and stresses for a single fin sleeve designed to encompass a tubular chord 28 or for use with chord couplers or chord end pieces, with the fins 90 being hollow; this particular design mimics the "wide" hollow design, but shows the result of using a larger fastener 72 diameter. The 0.300" wall thickness of the portion which would surround the central chord 28 was held constant in all designs to better understand the effects from varying the hollow single fin width (12,000 lb. max tensile or compressive force).

Figure 43:
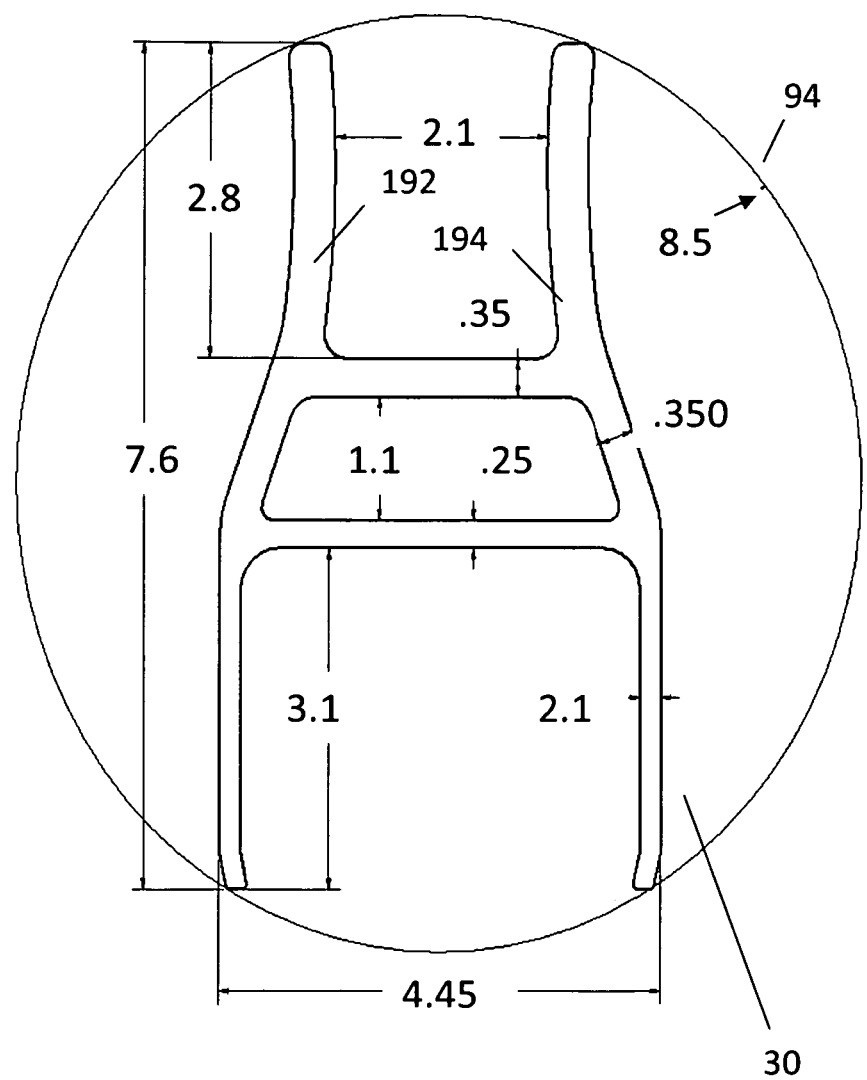
FIG. 43 shows a hollow single fin SEP (strut end piece) "wide".
Figure 44:
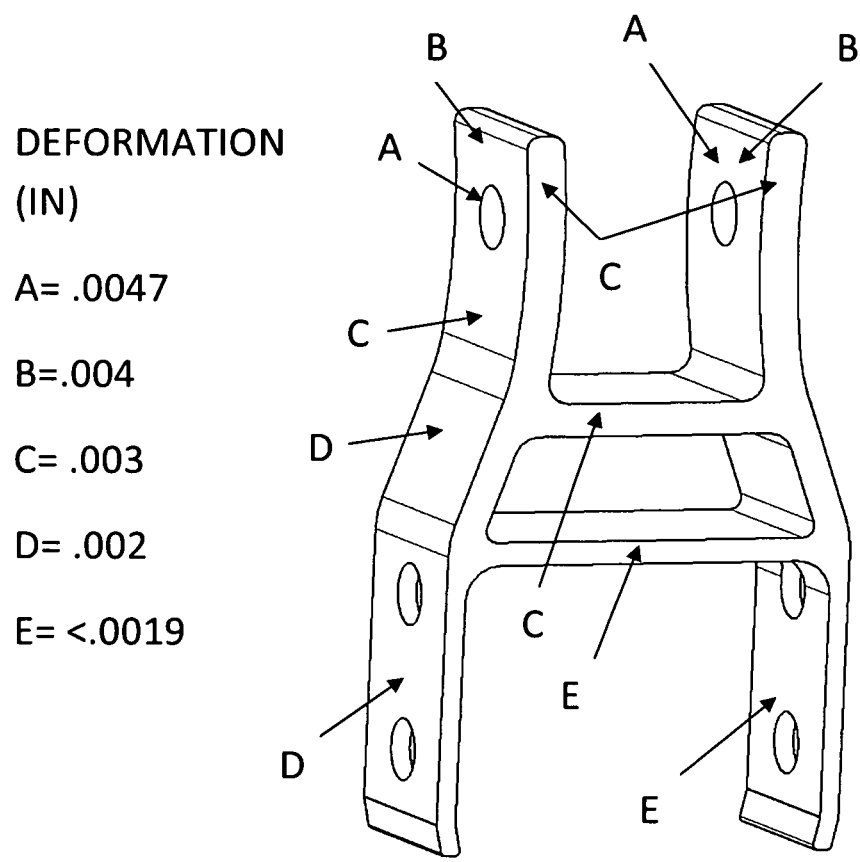
FIG. 44 shows a hollow single fin SEP "wide" FEA—Deformation.
Figure 45:
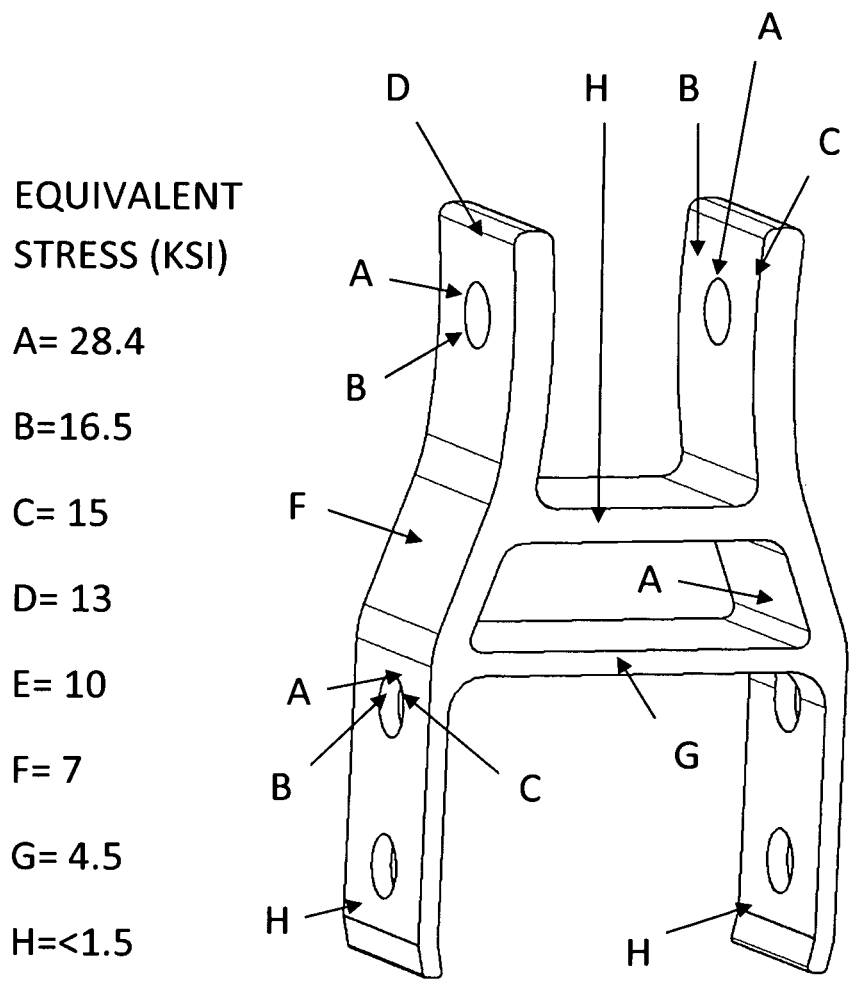
FIG. 45 shows a hollow single fin SEP "wide" FEA—Equivalent Stress.

FIGS. 43, 44 and 45 show the cross sectional design, deformation and stresses of a strut end piece 30 designed to work with the single fin sleeve design with a wide hollow (12,000 lb. max tensile or compressive force). The profile was designed to acceptable levels of deformation and stress, resulting in a part lighter than the single fin (solid) strut end piece 30 than it replaces. Designs for narrow or medium hollow single fins 12 would yield similar design concepts.

Figure 46:
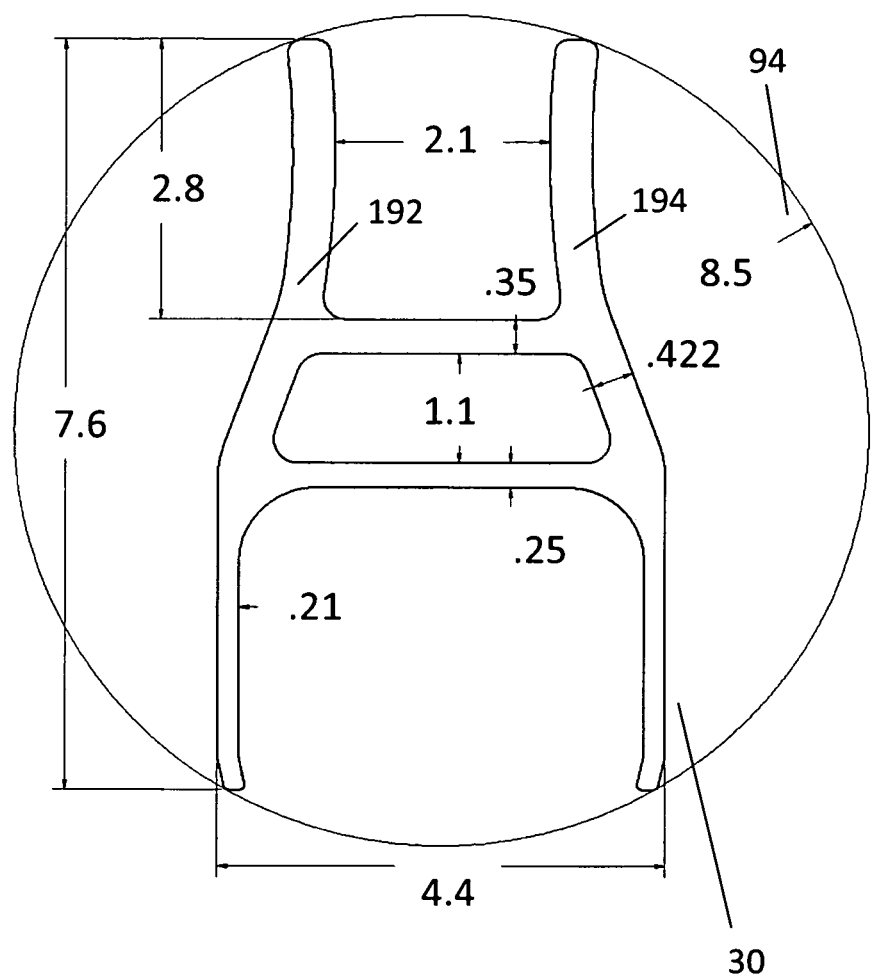
FIG. 46 shows a hollow single fin SEP "wide"—Thicker walls.
Figure 47:
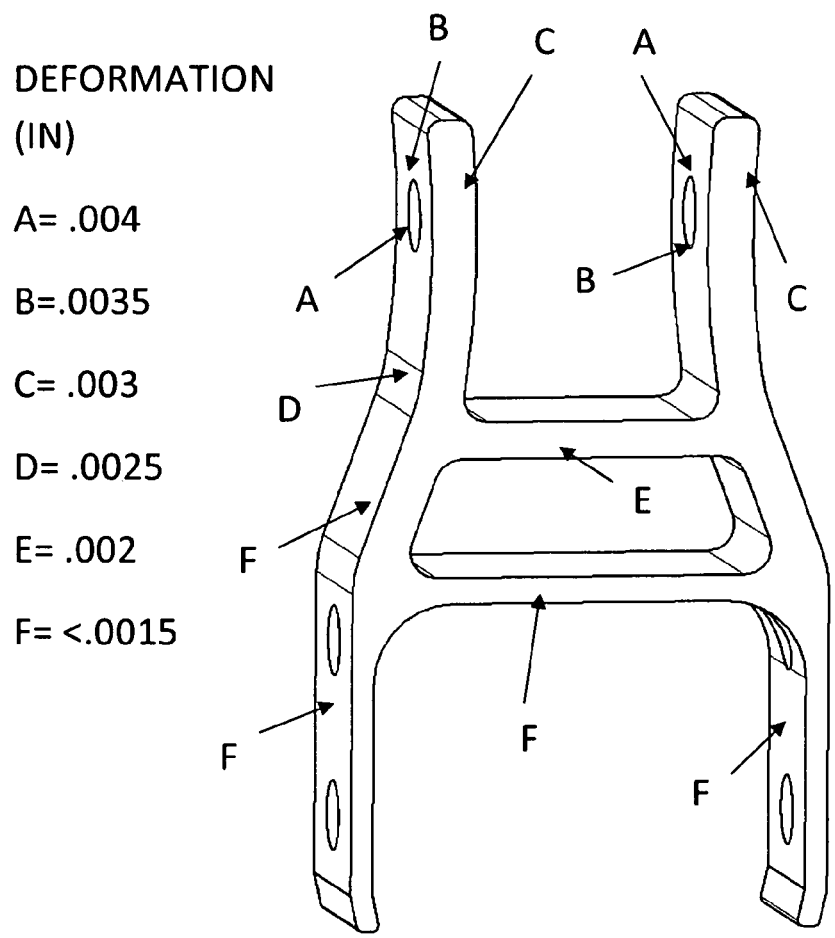
FIG. 47 shows a hollow single fin SEP "wide"—Thicker walls—FEA—Deformation.
Figure 48:
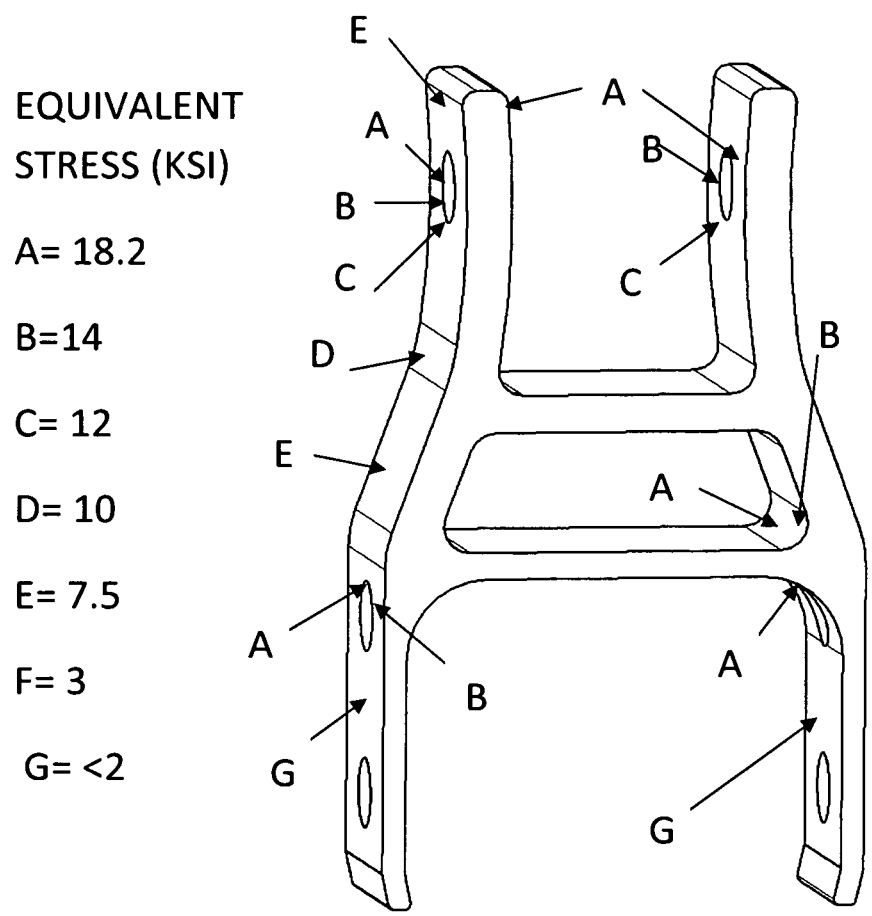
FIG. 48 shows a hollow single fin SEP "wide"—Thicker walls—FEA—Equivalent Stress.

FIGS. 46, 47 and 48 show the cross sectional design, deformation and stresses of a strut end piece 30 designed to work with the single fin sleeve design with a wide hollow (12,000 lb. max tensile or compressive force). The profile was designed to weigh the same as the single fin (solid) strut end piece 30 that it replaces, and thus results in slightly lower levels of deformation and stresses.

Figure 11:
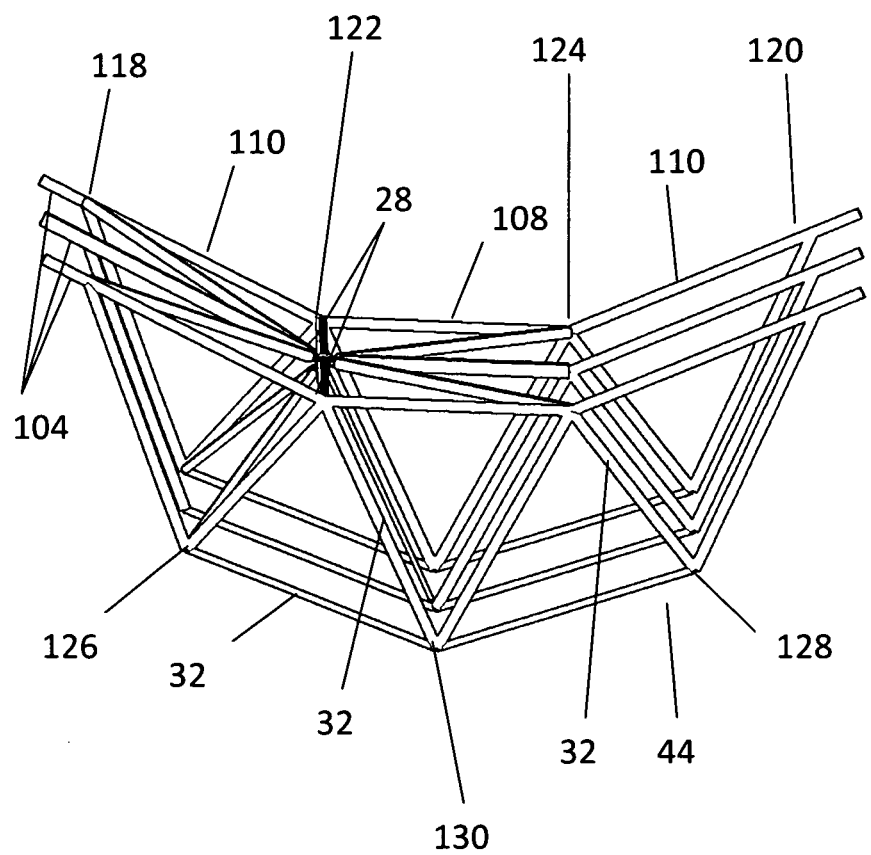
FIG. 11 is a hollow single fin node in series 5 frame—Front ISO view.

FIG. 11 is a partial view of one geometry of a space frame 44 design for CSP parabolic mirror systems showing 3 (of 7 for this design) slices 104, utilizing 7 nodes (Node A 118, Node B 120, Node C 122, Node D 124, Node E 126, Node F 128 and Node G 130 are shown for each "slice" 104 in this graphic, with 2 diagonal beam 110 and one horizontal beam 108 per slice 104, with two (of 6) chords 28 connecting each of the 7 "slices" with the adjacent. For clarity, there are 6 "segmented chords" between the 7 slices at each of the 7 nodes=42 "segmented chords"—only two are shown in this graphic (the ones which could have been shown at nodes A, D, E and G were omitted to make the "slices" 104 more visible). The slices are connected with segmented chords 28 connecting each node with the node of the same letter of the next slice 104. A multitude of struts 32 connecting the various nodes are also shown.

Figure 12:
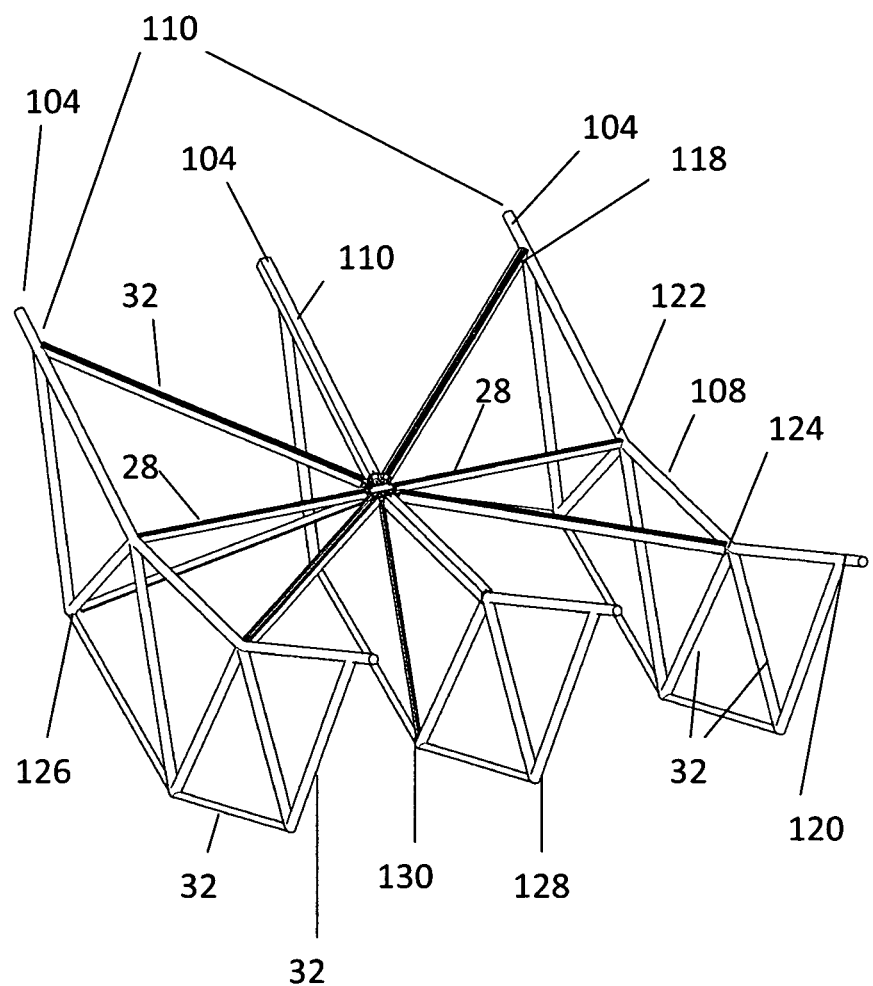
FIG. 12 is a hollow single fin node in series 5 frame—Side ISO view.

FIG. 12 is a partial view of one geometry of a space frame 44 design for CSP parabolic mirror systems showing 3 (of 7 for this design) slices 104, utilizing 7 nodes (Node A 118, Node B 120, Node C 122, Node D 124, Node E 126, Node F 128 and Node G 130 are shown for each "slice" 104 in this graphic, with 2 diagonal and one horizontal beams 108 per slice 104, with two (of 6) chords 28 connecting each of the 7 "slices" with the adjacent slice 104. For clarity, there are 6 "segmented chords" between the 7 slices at each of the 7 nodes=42 "segmented chords"—only two are shown in this graphic (the ones which could have been shown at nodes A, D, E and G were omitted to make the "slices" more visible). A multitude of struts 32 connecting the various nodes are also shown.

Figure 2:
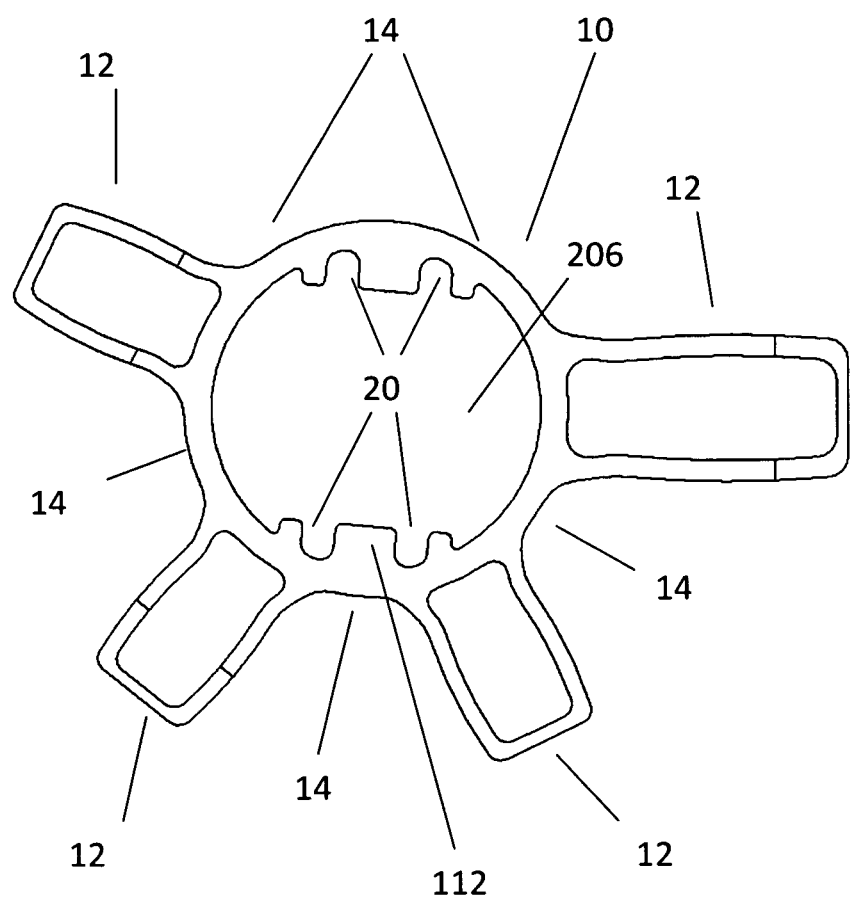
FIG. 2 is a hollow single fin node—Front view.

FIG. 2 is an end view of the node 10 at position C, showing the channel 206 to accept the chord end piece 26 or chord coupler and the four (in this case) hollow single fins 12 onto which the struts 32, via strut end pieces 30 in many cases, and beams 36, using beam end pieces 34 in many cases, fasten. Note how the unsupported span 14 between the hollow fins 12 is much less than if they were solid fins 90. This reduces the deflections and stresses from deformation (less deflection in the circular'ish (as shown) "body" of the profile). Material is removed at 20 to reduce the weight of the node 10, and material is thickened at 112 for bearing stress requirements of node 10 to chord end piece fastener connection.

Figure 3:
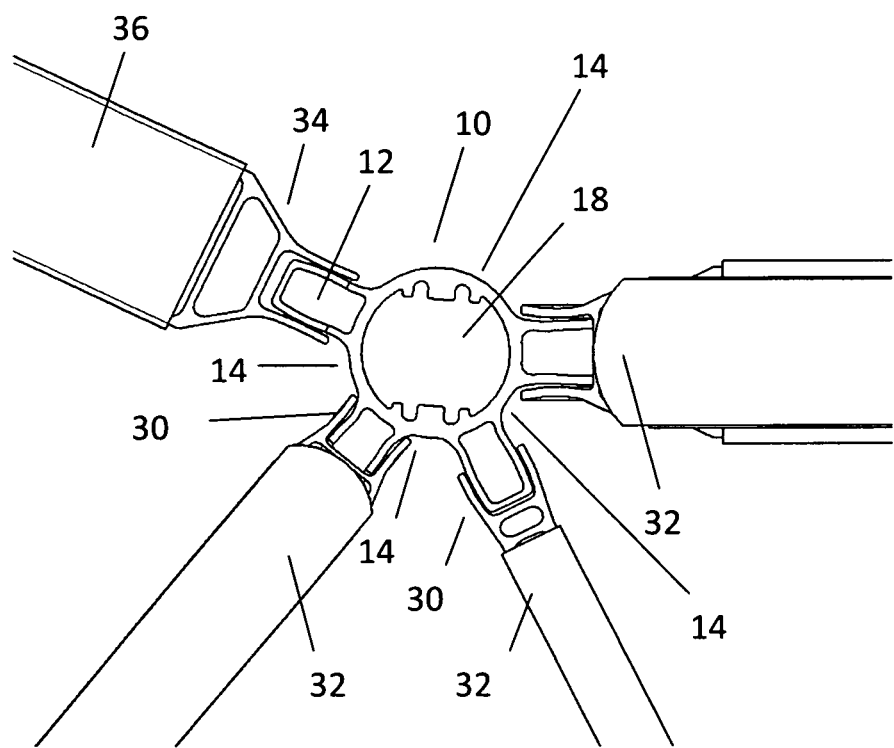
FIG. 3 is a hollow single fin node complete with all SEP, BEP & struts & beams—Front view.

FIG. 3 (end view) shows Node C 122 as fabricated (cut to length, notched for strut end piece 30 interface and fastener holes 24 shown), with the beam end pieces 34 and strut end pieces 30 shown with their beams 36 and struts 32 also shown.

Figure 4:
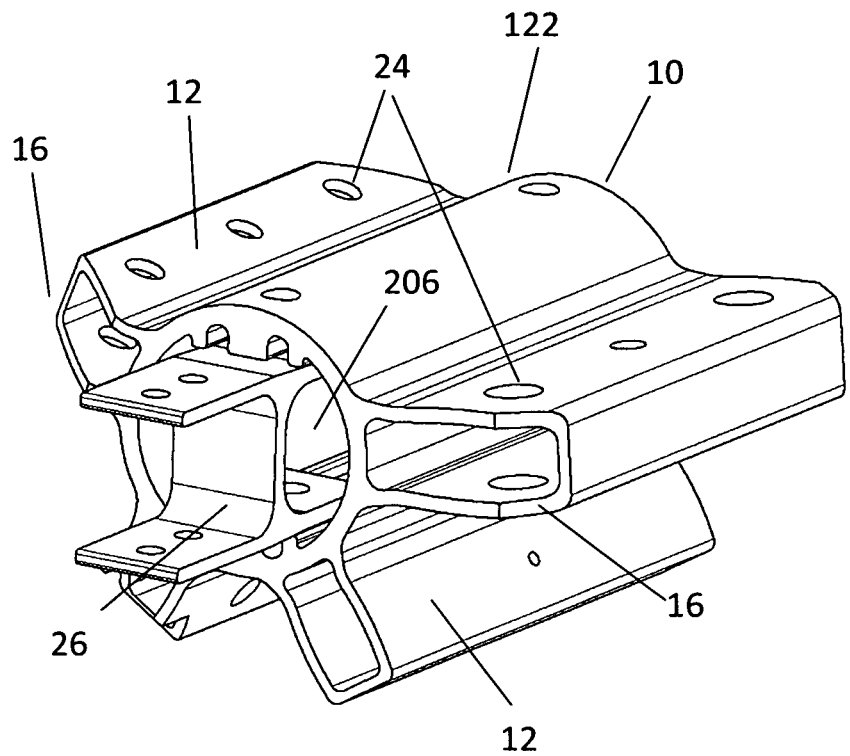
FIG. 4 is a hollow single fin node with CEP (chord end piece)—ISO view.

FIG. 4 shows Node C 122 as fabricated (cut to length, notched for strut end piece 30 interface and fastener holes 24 shown). A chord end piece 26 is shown inserted into the channel 206 of the node 10.

Figure 5:
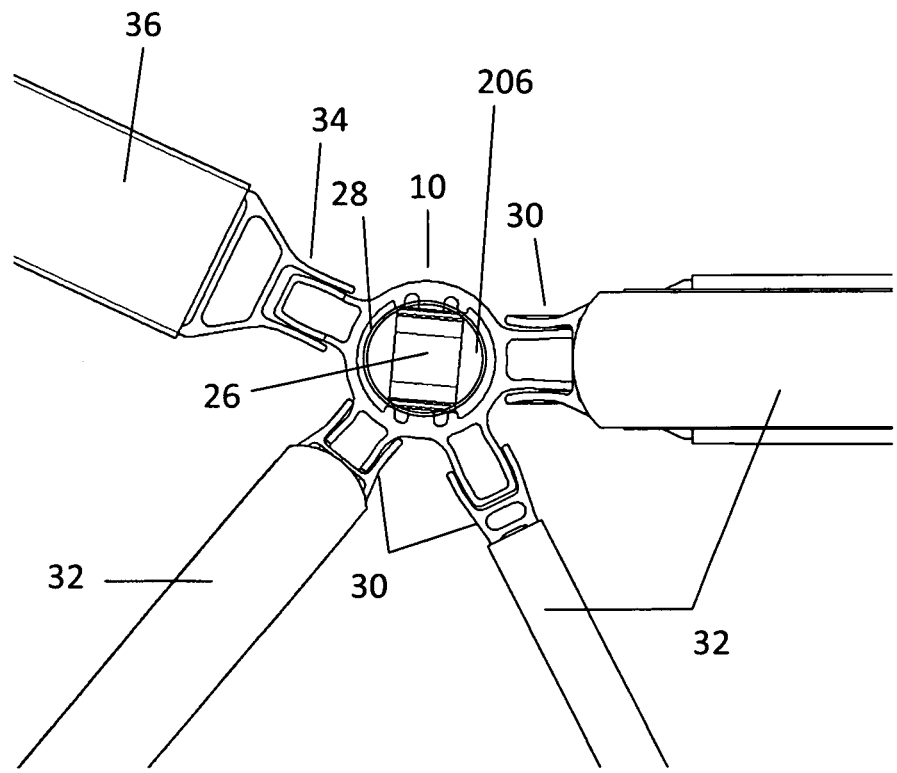
FIG. 5 is a hollow single fin node complete with all SEP, CEP, BEP & struts & beams—Front view.

FIG. 5 (end view) shows Node C 122 as fabricated (cut to length, notched for strut end piece 30 interface and fastener holes 24 shown), with the chord end piece 26, beam end pieces 34 and strut end pieces 30 shown with their associated chord 28, beams 36 and struts 32 also shown.

Figure 6:
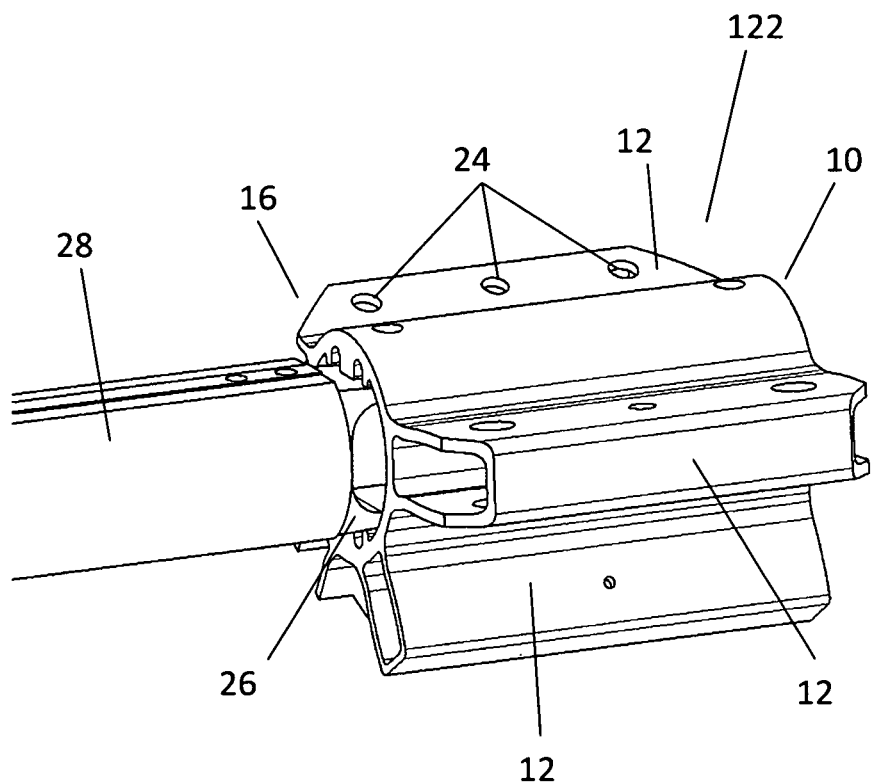
FIG. 6 is a hollow single fin node with CEP (chord end piece) and chord—ISO view.

FIG. 6 shows Node C 122 as fabricated (cut to length, notched for strut end piece 30 interface and fastener holes 24 shown). A chord end piece 26 is shown inserted into the channel 206 of the node 10 with a chord 28 on the chord end piece 26.

Figure 7:
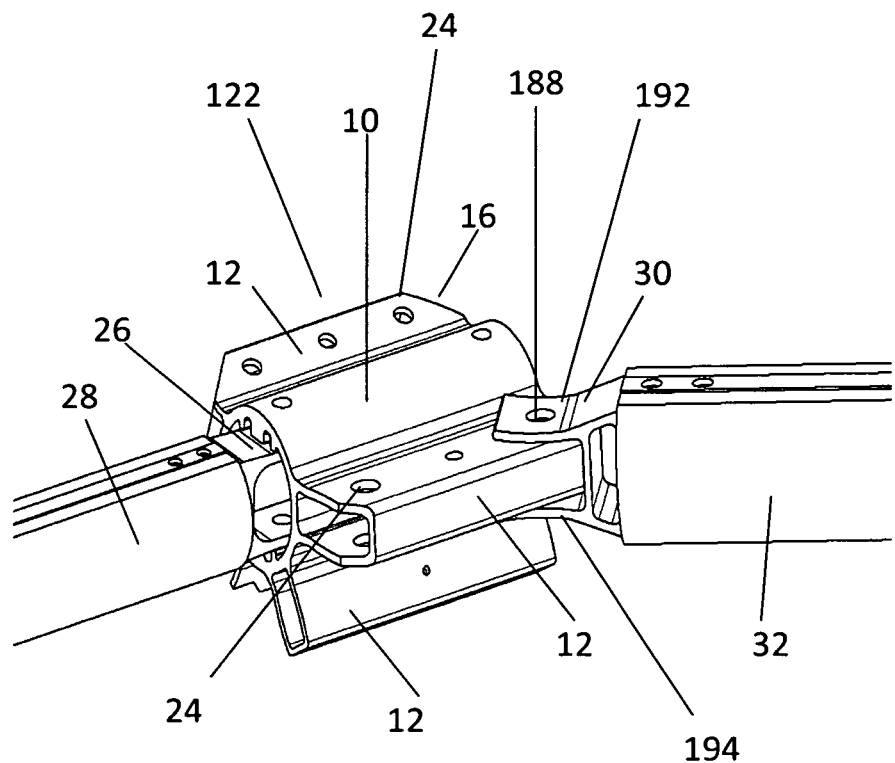
FIG. 7 is a hollow single fin node with SEP & CEP with strut and chord.

FIG. 7 shows Node C 122 as fabricated (cut to length, notched for strut end piece 30 interface and fastener holes 24 shown). A chord end piece 26 is shown inserted into the channel 206 of the node 10 with a chord 28 on the chord end piece 26 and a chord end piece 26 with chord 28 shown on the hollow single fin 12. Note that the tensile and compressive forces from the space frame 44 transfer through the strut 32 and chords 28 to the strut end pieces 30 and chord end pieces 26 and then to the node fins 12 or node center. These force transfers are designed to create a substantially single point where the forces converge. The hollow fin concept allows the strut 32 forces to transfer to the individual legs of the hollow fin 12, reducing the unsupported span 14 between fins 12, reducing the deflections and stress on the part.

Figure 8:
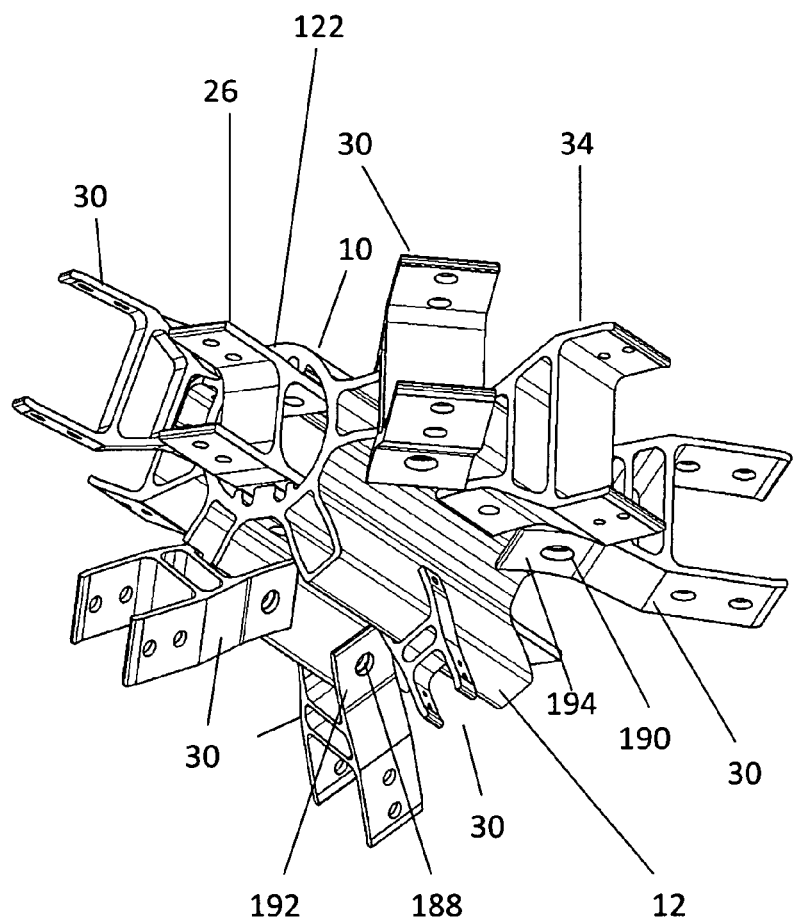
FIG. 8 is a hollow single fin node complete with all SEP, CEP & BEP (beam end piece).—Bottom ISO view.

FIG. 8 shows Node C 122 as fabricated (cut to length, notched for strut end piece 30 interface and fastener holes 24), with the chord end pieces 26, beam end pieces 34 and strut end pieces 30 shown (chords 28, beams 36, and struts 32 are not shown).

FIG. 10 shows Node C 122 as fabricated (cut to length, notched for strut end piece 30 interface and fastener holes 24), with the chord end pieces 26, beam end pieces 34 and strut end pieces 30 shown with their associated chords 28, beams 36 and struts 32 also shown. It also shows how all force vectors will converge at a common point within the node 10.

FIG. 49 shows a system 208 comprising the solar frame 44 (nodes 10, chords 28, beams, 36 struts 32) attached to one concept of a torque plate 114. The frame 44 is supported at each end and able to rotate about the center of mass, approximated by the "knob" shown on the outside of the torque plate 114. The torque plate 114 is designed to attach to specific nodes of the frame 44 (the outside of Nodes C 122, Node D 124 and Node G 130 on slices 1 and 7 in the example used). Generally the individual solar frames are grouped so that a central drive mechanism turns one frame on either side of the drive via the adjacent torque plates 114, which are hung by the "knobs" from structural pylons equipped with bearings. The torque plate 114 applies the rotational torque to the frame (resisting wind and gravity forces), which rotates the frame 44. At the other end of the frame 44, the torque plate 114 is attached to the torque plate 114 of the adjacent frame 44 via the "knobs", and thus turns that frame 44 and any other frames such attached along the line at the same time as the first frame. The torque plates 114 must resist hundreds of thousands of in-lbs of torque to accomplish this (additive as a $2^{nd}$, $3^{rd}$, $4^{th}$, $5^{th}$, $6^{th}$ or more frames are attached in a line on either side of the common central drive (which thus drives 2, 4, 6, 8, 10, 12 or more frames)). FIGS. 50, 51, 52, 53A, 53B, 54, 55 and 56 show the details of the nodes 10 and attachment means to the torque plate 114. The Torque plate 114 is a fabricated part, likely steel plate or fabricated metallic structural elements. The connection shown is one of many that could be used. The concept here is to use an extruded solid node with a circular extrusion to fit within tubular attachments of the torque plate 114, fastened together, at Nodes C, D and G. Other orientations, Node selections (depending on frame geometry), etc. are certainly possible—this rendition is for explanatory purposes.

Figure 52:
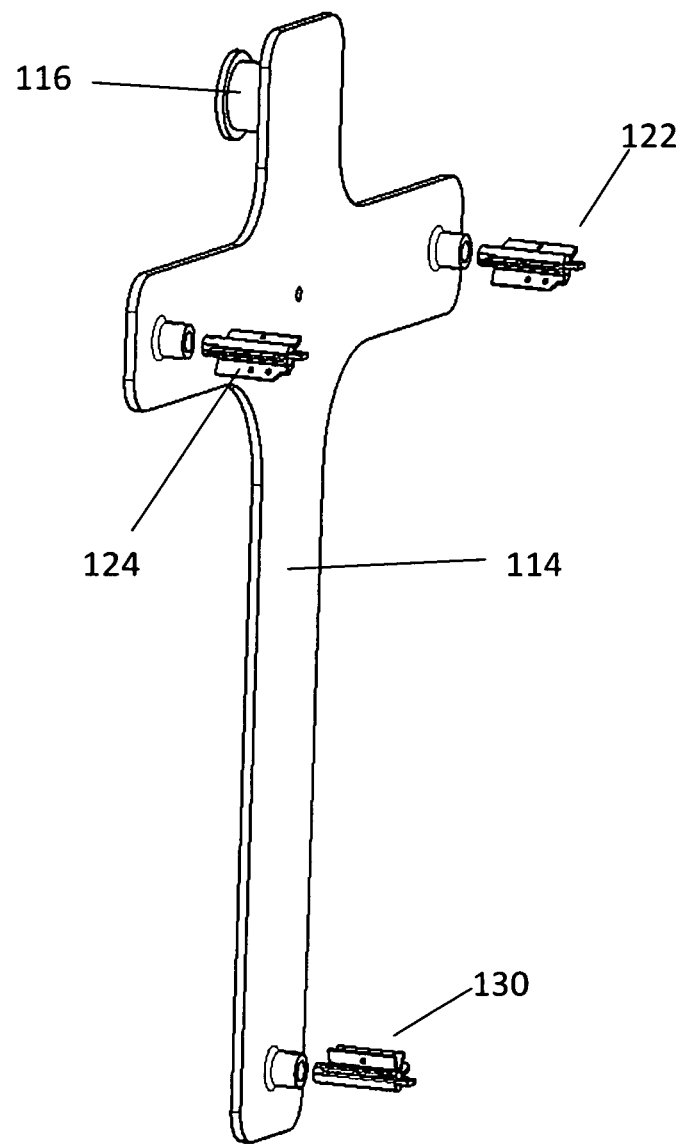
FIG. 52 shows a torque plate for solid node—Side ISO view.
Figure 53:
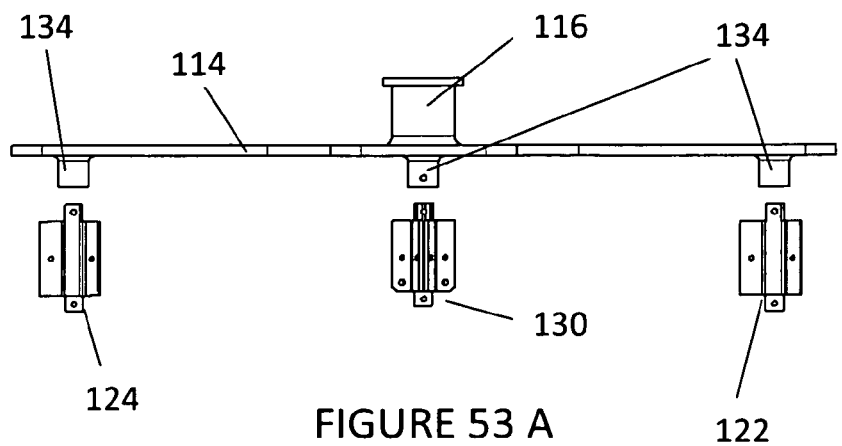
FIG. 53A shows a torque plate for solid node, before attaching node—Top view.
FIG. 53B shows a torque plate for solid node, after attaching node—Top view.
Figure 53:
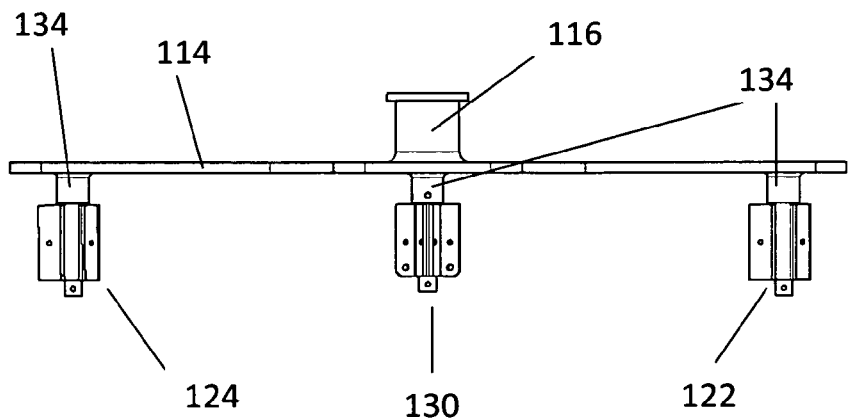
Figure 54:
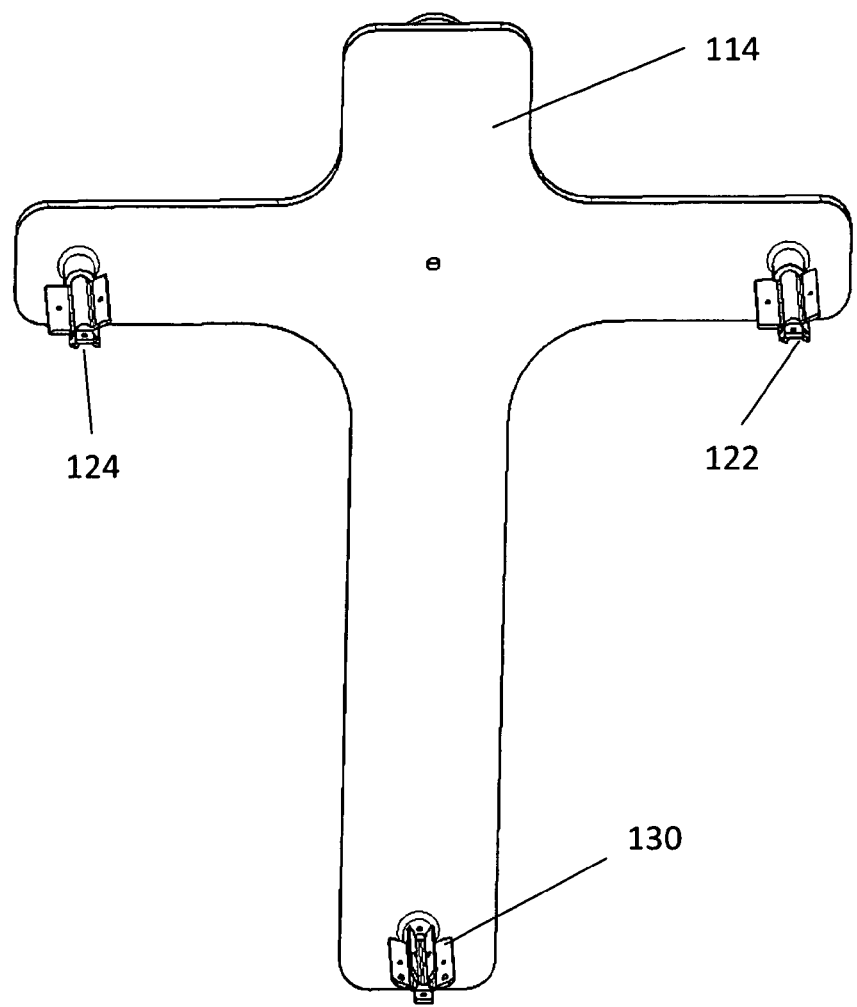
FIG. 54 shows a torque plate for solid node—Back side.
Figure 55:
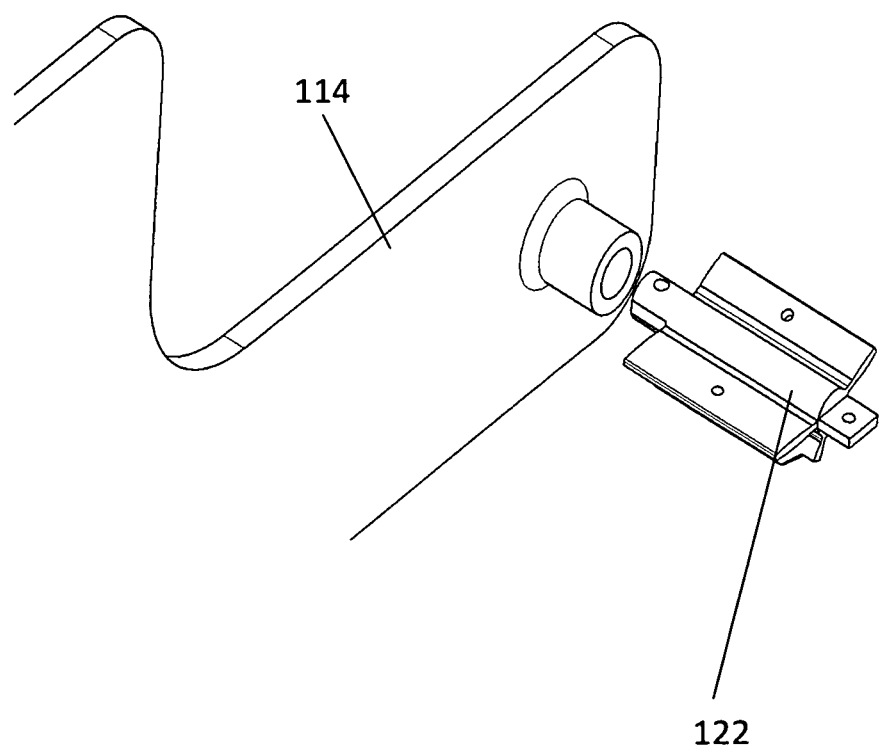
FIG. 55 shows a torque plate for solid node, staged—Top OS detailed view.
Figure 56:
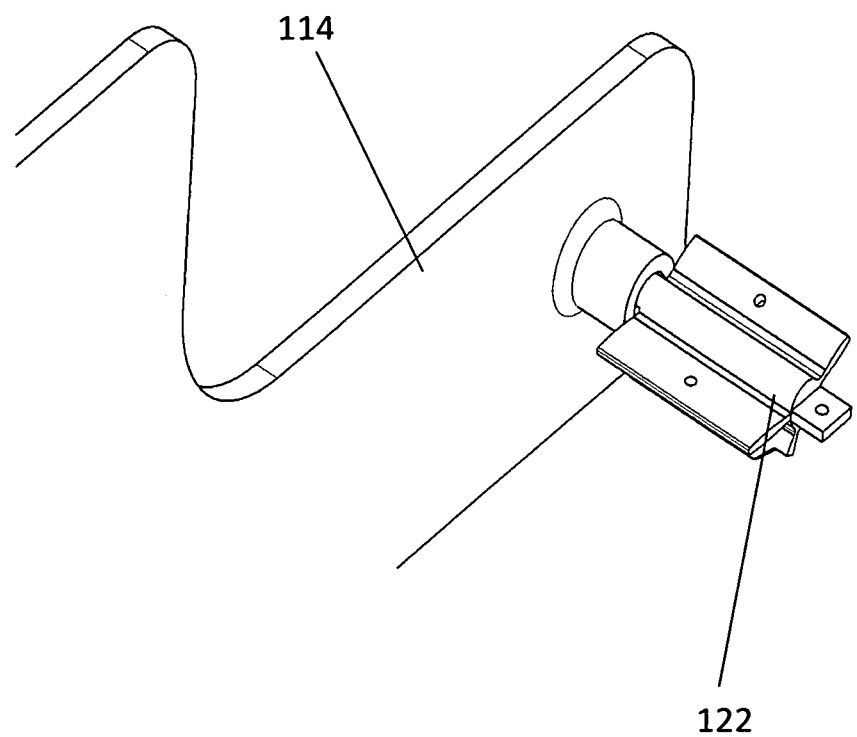
FIG. 56 shows a torque plate for solid node, connected—Top OS detailed view.

FIGS. 51 and 52 show close-ups of the node 10 and torque plate 114 attachment.

FIG. 53A shows nodes C, D and G before insertion into torque plate 114 attachment tubes 134; FIG. 53B shows afterwards, before fastening.

Figure 57:
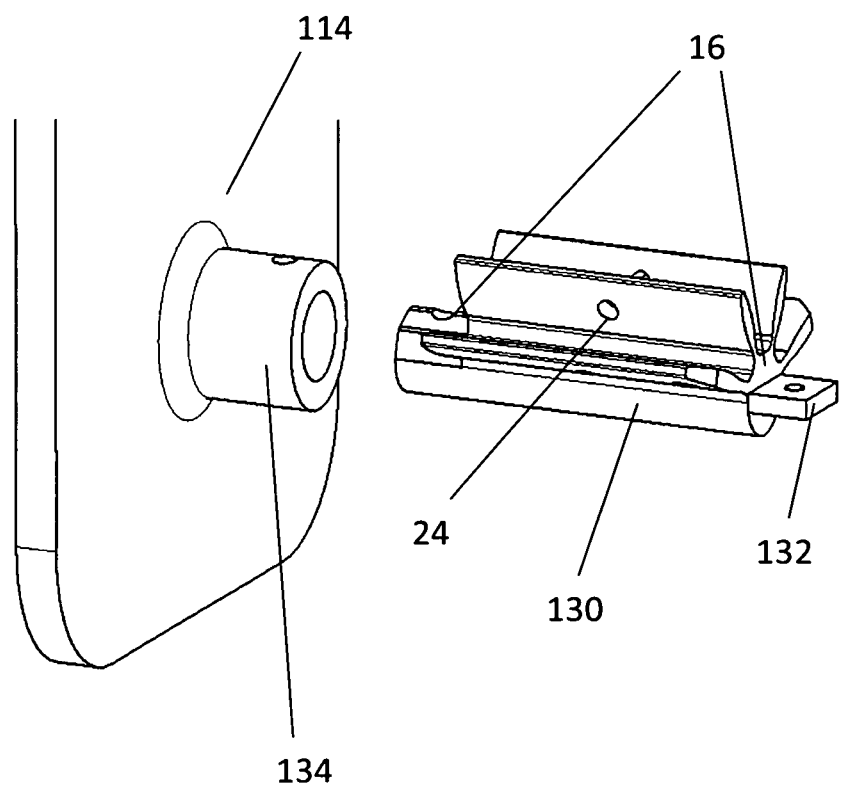
FIG. 57 shows a torque plate for solid node, staged—Bottom center detailed view.
Figure 58:
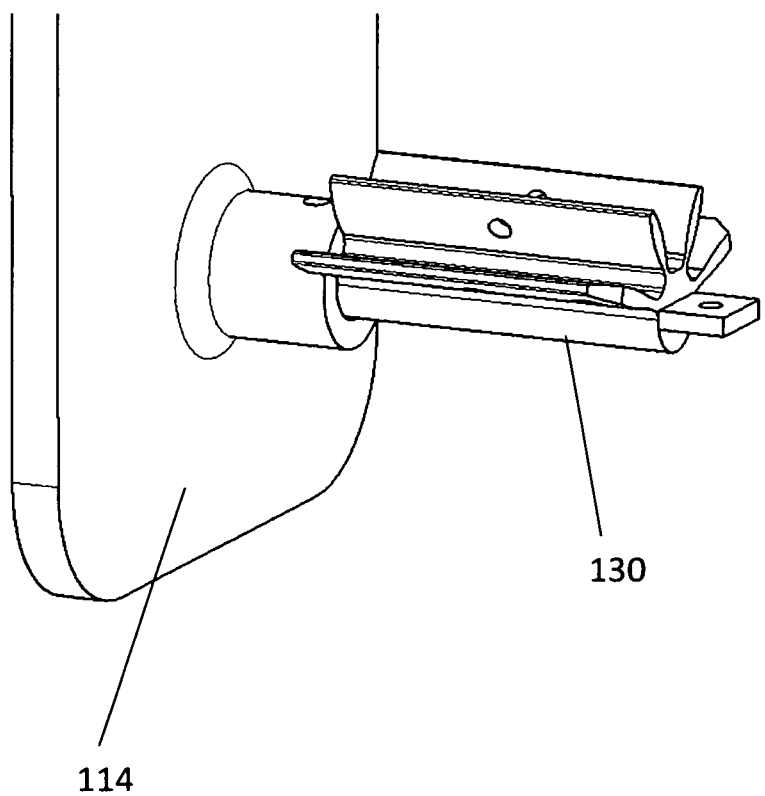
FIG. 58 shows a torque plate for solid node, connected—Bottom center detailed view.

FIGS. 57 and 58 show where Node G 130 inserts into the attachment tube 134, which is part of the fabricated torque plate 114 (attachment tube 134 could be welded on to torque plate 114, inserted into a bored hole in the torque plate 114 then welded, etc.).

FIGS. 57 and 58 also show a good view of the fabricated solid node extrusion, showing how the extruded shape with the solid central portion 132 at the left has the "fins" machined off of both ends, with the right side of the node G 130 further machined into a flat or "guided insertion" plate (if this feature is desired (not shown)), onto which the chord end piece 26 will be fastened. Appropriate fastener holes 24 are fabricated into the ends of the node 10, and into the fins.

FIGS. 59A and 59B show steel torque plate 114 design.

FIGS. 60A, 60B and 60C show torque plate 114 design fabricated/assembled from hollow steel tubes.

TABLE 2

| | SPEED | | | | | |
|---|---|---|---|---|---|---|
| | 20 MPH | | 50 MPH | | 80 MPH | |
| MOUNT | PLATE | TUBE | PLATE | TUBE | PLATE | TUBE |
| STRUT WEIGHT (LBS) | 325 | 318 | 570 | 546 | 868 | 832 |
| BEAM, MR & MISC. WGHT (LBS) | 324 | 324 | 502 | 502 | 927 | 927 |
| MAX. TORQUE APPLIED (IN-LBS) | 150,591 | 150,067 | 967,773 | 970,171 | 2,519,197 | 2,520,842 |
| MAX. SHEAR AT PIPE/NODE (LBS) | 2,074 | 1,722 | 7,825 | 9,974 | 20,674 | 24,399 |
| MOUNT DIMENSIONS (IN) | | | | | | |
| A (OR SECTION 1) | 12 | HSS 9 × 3 × 5/16 | 20 | HSS 14 × 6 × 5/16 | 28 | HSS 18 × 6 × 5/16 |
| B | 5 | N/A | 11 | N/A | 17 | N/A |
| C | 10 | N/A | 16 | N/A | 22 | N/A |
| D (OR SECTION 2) | 6 | HSS 5 × 3 × 5/16 | 10 | HSS 8 × 3 × 5/16 | 14 | HSS 12 × 4 × 5/16 |
| E | 8 | N/A | 12 | N/A | 16 | N/A |
| F | 17.217 | 16.705 | 12.232 | 12 | 9.014 | 9.524 |
| G | 1.66 | 1.66 | 2.88 | 2.88 | 3.5 | 3.5 |
| H | 1.28 | 1.28 | 1.77 | 1.77 | 2.3 | 2.3 |
| I | 1.5 | 1.5 | 1.75 | 1.75 | 2.25 | 2.25 |
| MOUNT WGHT (LBS) | 452 | 444 | 730 | 682 | 998 | 845 |
| STEEL PIPE WGHT (LBS) | 2 | 7 | 12 | 39 | 21 | 64 |
| ALUM. NODE WGHT (LBS) | 8 | 8 | 9 | 9 | 16 | 16 |
| MAX. SLOPE ERROR | 2.959 | 2.968 | 4.112 | 3.718 | 5.792 | 5.077 |

TABLE 2-continued

| | SPEED | | | | | |
|---|---|---|---|---|---|---|
| | 20 MPH | | 50 MPH | | 80 MPH | |
| MOUNT | PLATE | TUBE | PLATE | TUBE | PLATE | TUBE |
| AVERAGE SLOPE ERROR | 2.3 | 2.307 | 2.918 | 2.674 | 3.728 | 3.295 |

In regard to Table 2, as wind loads vary along the width of the frame 44 they create a torque that must be resisted at the frame's end. For frames that are rotated with conventional technologies this torque accumulates as the frame 44 gets closer to the drive system. For example, if wind loads on a single frame create 200,000 lb-in of torque, the frame 44 nearest the driving mechanism where there are five frames per side would be loaded with 1,000,000 lb-in of torque. Frames that have fewer frames per drive or use a rolling rib 42 system, etc. can have an applied torque as small as 125,000 lb-in. Larger frames located in hurricane prone regions can see torques up to 6,250,000 lb-in. To resist this torque steel plates or tubes are mounted on the end of each frame 44 and are supported by a pylon 198 at a single point. These mounts also play a significant role in limiting the deflections which contribute to the frame's optical efficiency. The plates can be cut out from a single piece of steel or created by welding together smaller pieces. The tubes are selected from standard steel shapes, typically HSS. Attaching the torque plate 114 to the frame 44 is done by inserting and bolting the aluminum node into a steel pipe which has been welded to the torque mount. Large shear forces are present at this connection point which cause bending moments that the steel pipe and aluminum node need to be designed to resist. The tables above summarizes the applied forces and designs for a 12 meter frame 44 which is closest to the drive mechanism 136 and is connected to four additional frames subjected to wind loads of 20, 50, and 80 mph. These wind loads were applied to the frame 44 in all orientations, with larger wind loads applied in the stow position. The results show the significant difference that a 30 mph change in wind speed has on the applied torque of the frame 44. Consequently, the shear force at the node connection and the size of the node and steel pipe increase as the wind speed increases. Using a tube for the mount has significant advantages over a plate for the frame loads at 50 and 80 mph. The tubes are lighter than the plates for frames with the same wind speeds and the optical efficiency is greater. The weight of the steel pipes used to attach the node 10 to the mount is greater because the pipe must pass through the tube for connection purposes, but this small amount of added weight is offset by the large reduction in the mount weight. These benefits diminish with the decrease in wind speed. For the frame 44 subject to 20 mph wind speeds, there is a negligible difference in aluminum and mount weight and the optical efficiency is slightly worse on the frame 44 using a tube mount as opposed to a plate mount. A tradeoff to reduced steel weight and improved optical efficiency is that the overall frame length must be reduced to accommodate the tube—vs—plate thickness; holding the collector tube lengths constant, this causes the linear length of mirrors to be reduced.

FIGS. 62a, 62b, 63a, 63b, 64a, 64b and 64c are designed to explain six different philosophies to rotate the solar frames to follow the sun (only four frames are shown in each so that the graphics are viewable on the printed page):

1. Conventional Drive 136 with Torque plates 114 at each end of each frame 44, where one drive unit 136 drives 1, 2, 3, 4, 5 or even 6 or more frames on either side of the drive; the frames nearest the drive are subject to the most torque, as they must rotate themselves and the other frames attached to them, etc. See FIG. 62A.

These conventional units induce a LOT of torque in the frames nearest the drive, decreasing to the torque required to rotate a single frame for the frame that is furthest from the drive. If the torque is listed as "T" (usually about 150,000 in-lbs), and there are 5 frames on either side of the drive unit 136, then the units nearest the drive unit 136 will have their own torque+ the "applied torque" of 4T (600,000 in-lbs). This large amount of torque causes the frames to deform and causes increased slope error (focal accuracy measure: large values of slope error result in reductions in optical efficiency).

The Torque Plates 114 at either end of each frame 44 are subject to VERY large loads and are thus relatively heavy and expensive—vs—what would be required were their only requirement be to "hang" the frames and let them rotate.

2. Rolling rib 142 centrally located on each frame 44, with the rotational motive force from a "Torque tube 140" which individually engages with each rolling rib 142. The centralized rolling rib 142 may have additional foundation 138 requirements, particularly if the rib 142 is designed to minimize deflection from wind and weight in addition to just applying the torque to each frame 44, centrally and singly. See FIG. 62B.

Figure 14B:
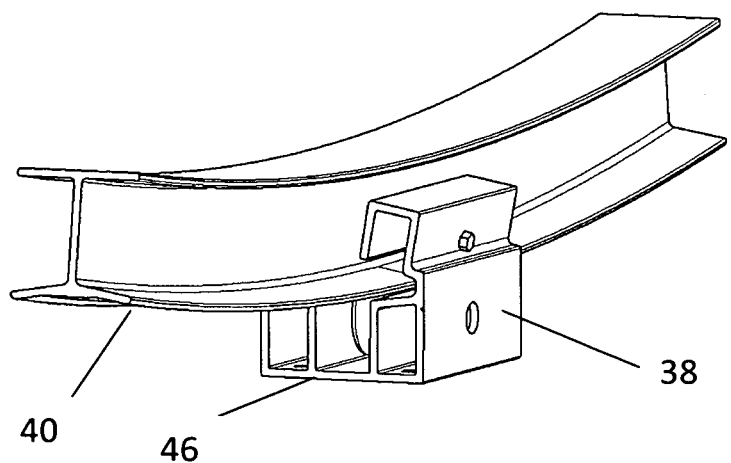
FIG. 14B is a rolling rib roller assembly—ISO view.
Figure 14A:
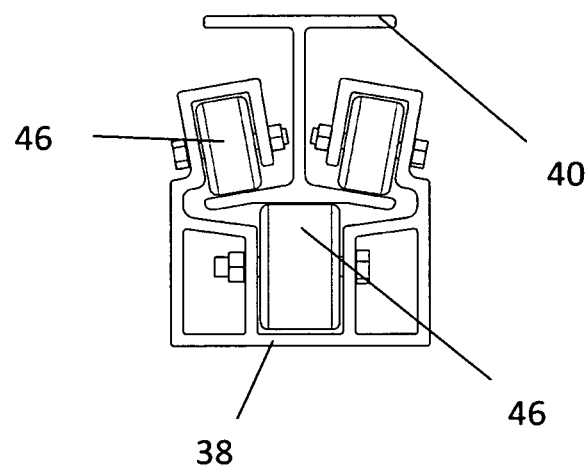
FIG. 14A is a rolling rib roller assembly—Front view.
Figure 15A:
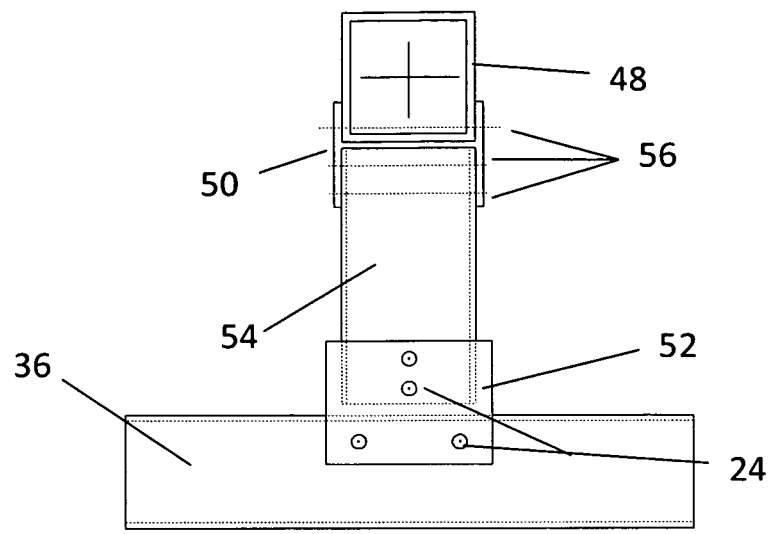
FIG. 15A is an outside mirror rail and upright connection—End view.
Figure 15B:
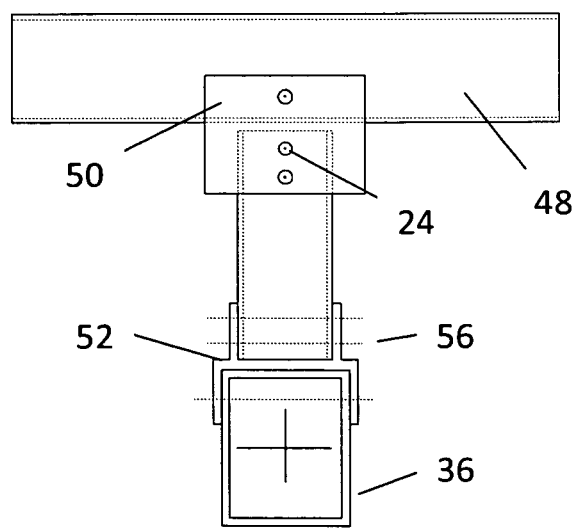
FIG. 15B is an outside mirror rail and upright connection—Side view.
Figure 16B:
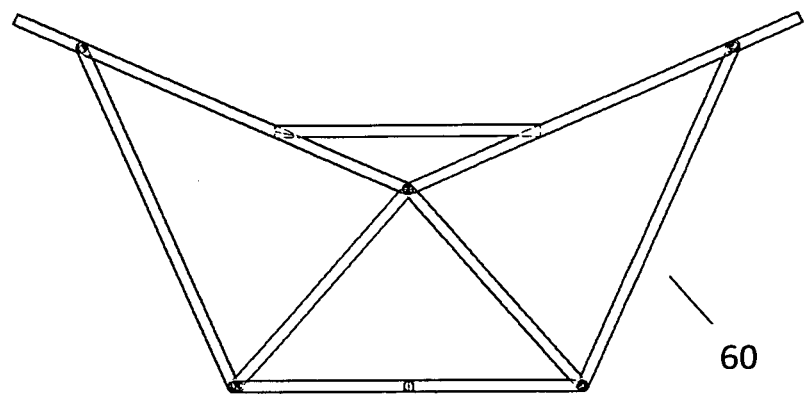
FIG. 16B shows Series 3 frame—ISO view.
Figure 16A:
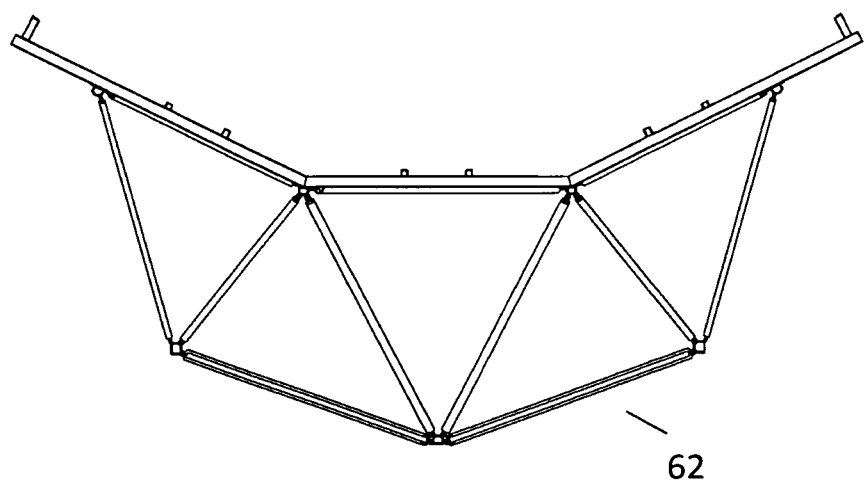
FIG. 16A shows Series 5 frame—Front view.
Figure 17:
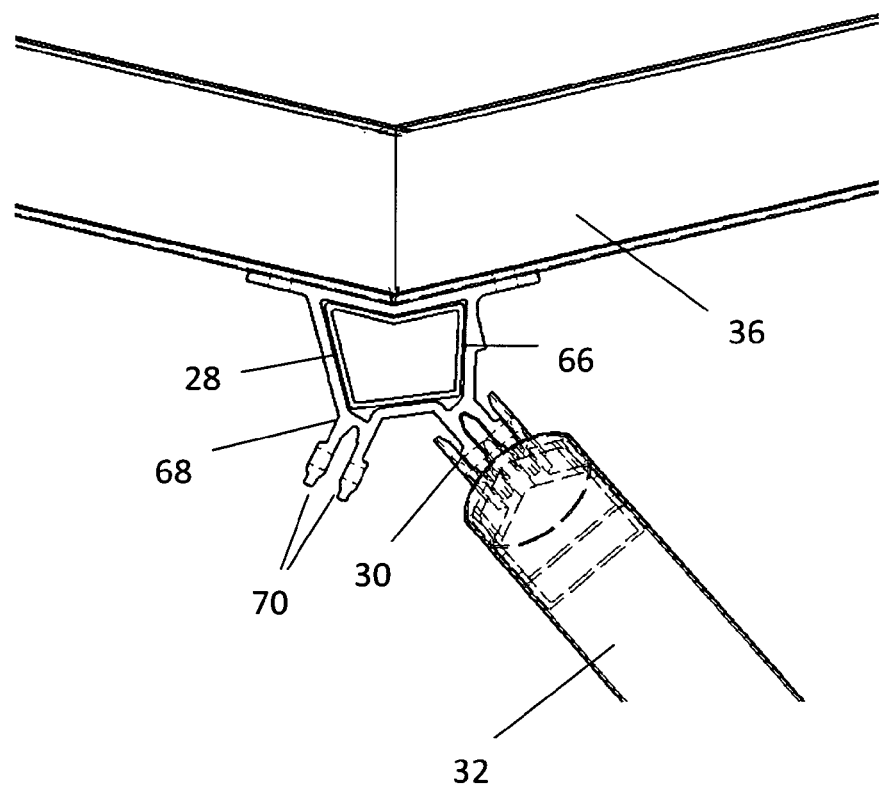
FIG. 17 shows Series 5 multifinned sleeve and strut end piece design (nomenclature for patent application).

3. When a torque tube 140 is used to drive the rolling rib 142 in the center of the frame 44, each frame 44 receives the same torque, and it is applied in the center of the frame 44, minimizing the deformation and optimizing the slope error. In addition, if there are foundations 138 under the center of the frame 44, the rolling rib 142 can be utilized as disclosed in WES's $2^{nd}$ patent application, U.S. patent application Ser. No. 12/587,043, which will enable the rollers 46, as shown in FIGS. 14A and 14B, to also reduce the deformation from the wind/weight deflecting the center of the frame 44. See FIG. 63A.

4. Frame 44 with a rolling rib 142 at each end of each frame 44, with individual drive units 136 at each pylon driving a rolling rib 142 on each of the 2 adjacent frames. See FIG. 63B.

In FIG. 63B when there is a driven rolling rib 142 on each end of each frame 44, there is no need for additional foundations 138 in the center of the frame 44—the pylon foundations 138 do "double duty" and can be used to stabilize a drive unit 136 designed to drive the frame 44. Because the frame 44 is driven from both ends, there is, in effect, only ½ the length of the frame 44 subject to the rotational torque deformation effects, leading to deformations from this similar to FIG. 62B above.

5. Frame 44 with a rolling rib 142 at each end of each frame 44, with a Torque tube 140 drive providing motive force to each rolling rib 142 unit. See FIG. 64A.

FIG. 64A is very similar to FIG. 63B, but with fewer drive units 136, as the drives can utilize a Torque tube 140 to provide the motive force to the rolling ribs 142; this leads to less electrical and controls installation and fewer drive units 136 per field.

6. Frame 44 with a rolling rib 142 at only one end of each frame 44, with individual drive units 136 at every other pylon driving a rolling rib 142 on each of the 2 adjacent frames. See FIG. 64B.

In the case shown in FIG. 64B, the drive units 136 can share the pylon 198 foundations 138, but each frame 44 is subject to the full torque (T) across its full length, leading to larger rotational deformations than in 2, 3, 4 or 5 (although there are of course ½ the number for drives and rolling ribs 142 per field as in FIG. 63B).

7. Frame 44 with a rolling rib 142 at only one end of each frame 44, with a Torque Tube providing motive force to the rolling ribs 142 at every other pylon location, rolling rib 142 on each of the 2 adjacent frames. See FIG. 64C.

FIG. 64C is a very similar concept as FIG. 64B, but with drives utilizing torque tubes to provide the motive force to the rolling ribs 142, resulting in even fewer drive units 136.

Table 3 details analytical results from various frame 44 analyses, supporting some of the 7 cases noted above, showing the different drive, foundation 138 and rolling rib 142 options:

Frame 44 geometries were established and analysis models were run. The results from these analytic calculations allow us to model an "idealized" frame 44 (e.g. the members are, for example, simple tubular struts 32 and chords 28 and relatively simple box beams 36). Conversion of the "idealized" members to actuals may add some weight to the frame 44.

The output from the frame 44 analytic work enables us to compare the expected results of the frame 44 performance in terms of slope error (the difference between perfect alignment between the reflected solar rays onto the collector tube). The output from the frame 44 analytic work also enables one to understand the exact design requirements for each strut 32, chord 28 and beam 36, by looking at multiple load cases as defined by ASCE-7, with the frame 44 oriented in various positions, with the wind blowing both on the surface of the mirror and at the back of the mirror, for this analysis, 35 MPH wind speeds are used to calculate optical efficiency (slope error) in any orientation; 50 MPH wind speeds in any orientation and 90 MHP wind speeds in the "stowage" position (rotated such that the system points the mirrors 45 degrees below the horizon line (135 degrees from pointing straight up) with pairs of mirror rows pointed at each other to "buffer") the mirrors are used to determine the maximum compressive and tensile forces and bending moments that each chord 28, strut 32 and beam 36 will be subject to: this is used to design the members. While the specific frame 44 geometry, wind speed, frame 44 orientation/rotation, etc. discussed above are the basis of the table above the text, the concepts disclosed will apply to other criteria if wind speed, frame 44 rotation, frame 44 design, rotational motive force application, etc. are considered.

In WES's $2^{nd}$ patent application Ser. No. 12/587,043, there is disclosed the concept of the rolling rib 142, detailing the curved rib and support rollers 46 constraining the rib's "vertical" deflection. There is also disclosed that the rolling rib 142 could well provide an improved method to rotate the frame 44 assemblies (a curved rack and pinion gear were shown in FIG. 22 of the 2nd patent application (Ser. No. 12/587,043) and discussions of how this drive mechanism can separate the torque effects such that each frame 44 is only subject to the torque from its own mirrors is discussed in paragraph 0088 of patent application Ser. No. 12/587,043).

The present invention reveals a much more detailed analysis of exactly how the frame 44 system performs, and why, in terms of optical accuracy (as measured by slope error RMS—the key criteria customers provide to define the optical accuracy). While WES's $2^{nd}$ patent application detailed the support that the rolling rib 142 and associated roller assemblies provided to the system, and discussed the concept of driving the frame's rotation via the rolling rib 142, the current invention expands and reveals the output of the analytical work

TABLE 3

| | FRAME SPECIFICS | | FRAME WEIGHT | | | SLOPE ERROR FROM MODEL (RMS) | | | | | |
|---|---|---|---|---|---|---|---|---|---|---|---|
| | | | WGHT OF IDEALIZED | EST. WGHT OF TOTAL | | AT PERIPHERY | | NOT AT PERIPHERY | | CALCULATED FIELD | |
| | FRAME TYPE | # OF | STRUTS, | FRAME (NO | | OF FIELD | | OF FIELD | | AVERAGE | |
| MODEL ID | (STD OR ROLLING RIB) | FRAMES EACH SIDE OF DRIVE | CHORDS, BEAMS ETC. (LBS) | TORQUE PLATES) (LBS) | PLATE WEIGHT (LBS) | WORST LOAD CASE | AVG. LOAD CASE | WORST LOAD CASE | AVG. LOAD CASE | WORST LOAD CASE | AVG. LOAD CASE |
| 7T7B | STD | 1 | 1071 | 1369 | 572 | 2.97 | 2.11 | 2.681 | 1.843 | 2.75 | 1.91 |
| | | 2 | | | | 3.21 | 2.35 | 2.769 | 1.994 | 2.88 | 2.084 |
| | | 3 | | | | 3.51 | 2.66 | 2.944 | 2.171 | 3.09 | 2.292 |
| | | 4 | | | | 4.15 | 2.99 | 3.186 | 2.375 | 3.43 | 2.528 |
| | | 5 | | | | 4.8 | 3.34 | 3.601 | 2.597 | 3.9 | 2.783 |
| 7T7B | CENTER RR | NA | 945 | 1236 | 435 | 3.171 | 1.890 | 2.671 | 1.696 | 2.796 | 1.744 |
| | CENTER RR | | 947 | 1238 | 435 | 3.087 | 1.907 | 2.690 | 1.710 | 2.789 | 1.759 |
| | ONE SIDE RR | | 951 | 1260 | 435 | 3.135 | 2.230 | 2.686 | 1.694 | 2.798 | 1.828 |
| | TWO SIDE RR | | 996 | 1331 | 435 | 2.921 | 1.942 | 2.645 | 1.739 | 2.714 | 1.790 |

ALL FRAMES WERE WES SERIES 5 12 METER - MIRROR TYPE RP3
METHODS FOR CALCULATING SLOPE ERROR HAVE CHANGED SINCE PROVISIONAL PATENT WAS FILED. RESULTS REMAIN SIMILAR IN RELATION TO EACH OTHER, BUT ARE MUCH SMALLER IN MAGNITUDE (BETTER OVERALL PERFORMANCE)

explaining which effects (minimizing deflection or minimizing applied torque to the frames) have the greatest impact on the optical accuracy.

The slope error is more closely tied to the mirror deflections and the torque effects of the entire frame 44; it is believed that the collector tubes "follow" the frame 44 in vertical deflection, minimizing any positive effects from limiting vertical deflection.

When looking at the 7t7b Series 5 12 meter standard design, with 1, 2, 3, 4 and 5 frames on either side of the drive, it is evident that the average slope error degrades from 1.910 for the case of only one frame 44 on either side of the drive to 2.783 for the case with 5 frames on either side of the drive. This clearly demonstrates that the applied torque of one frame 44 being turned by the drive and that frame 44 in turn driving a $2^{nd}$ (or even more) other frame(s) is what has the largest effect on the slope error.

When looking at the worst case for the 7t7b Series 5 12 meter standard frame @ the periphery of the field, the effect of this applied torque on the slope error is accentuated: 2.969 for a single frame on either side of the drive to 4.801 with 5 frames on either side of the drive (the frame nearest the drive thus subject to the torque that the wind and weight cause for itself PLUS the applied additive torque from the other 4 frames).

The one-sided rolling rib 142 and two-sided rolling rib 142 results further show that the rib location at the center does reduce the slope error to 1.744—vs.—having a rolling rib 142 at either end of the frame 44 (two-sided rolling rib 142 of 1.790); the minor difference of 2.6% may be attributed to the support that the center rolling rib 142 adds to the deflection resistance. The difference from the 1.790 and 1.828 is attributed to the difference between the rolling rib 142 turning an entire 12 meter frame 44—vs.—a two-sided rolling rib 142 with each rolling rib 142 only turning ½ of the frame 44.

Figure 66:
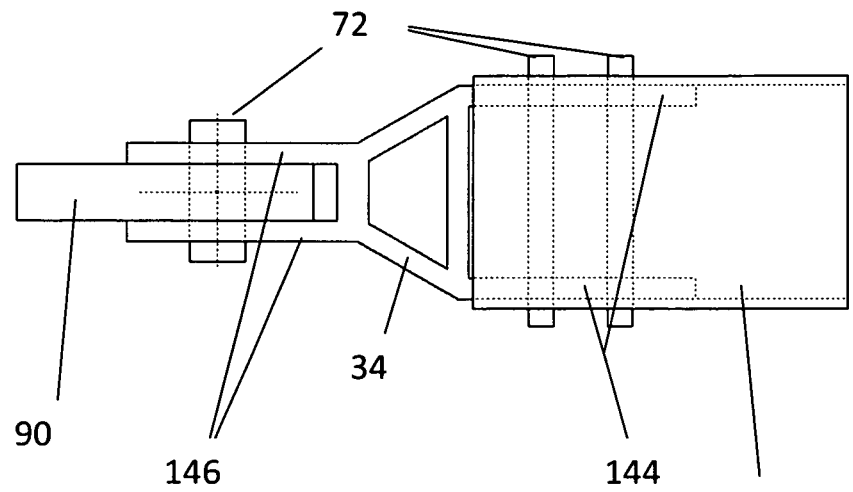
FIG. 66A shows a beam end connector—Side view.
FIG. 66B shows a beam end connector—Rotated side & end view.
Figure 66:
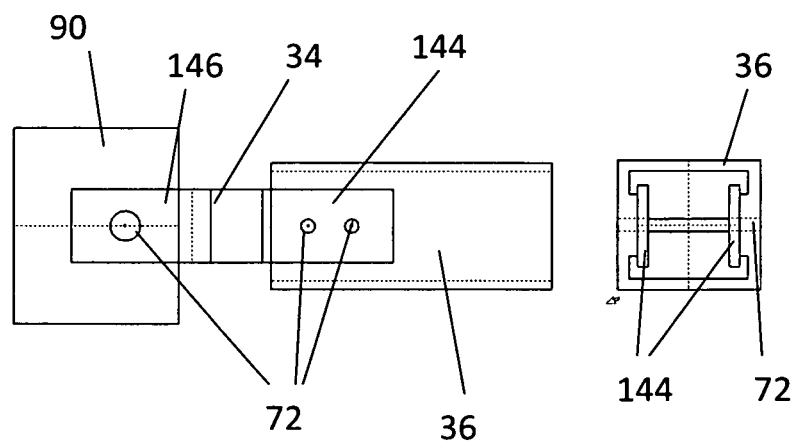
Figure 67:
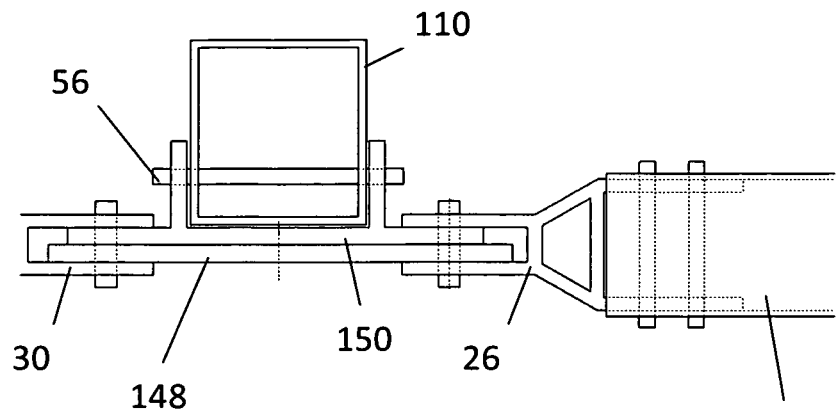
FIG. 67A shows an angled beam outside connection—End view.
FIG. 67B shows an angled beam outside connection—Side view.
FIG. 67C shows an angled beam outside connection, with Strut—Top view.
FIG. 67D shows an angled beam outside connection bracket—Top view.
Figure 67:
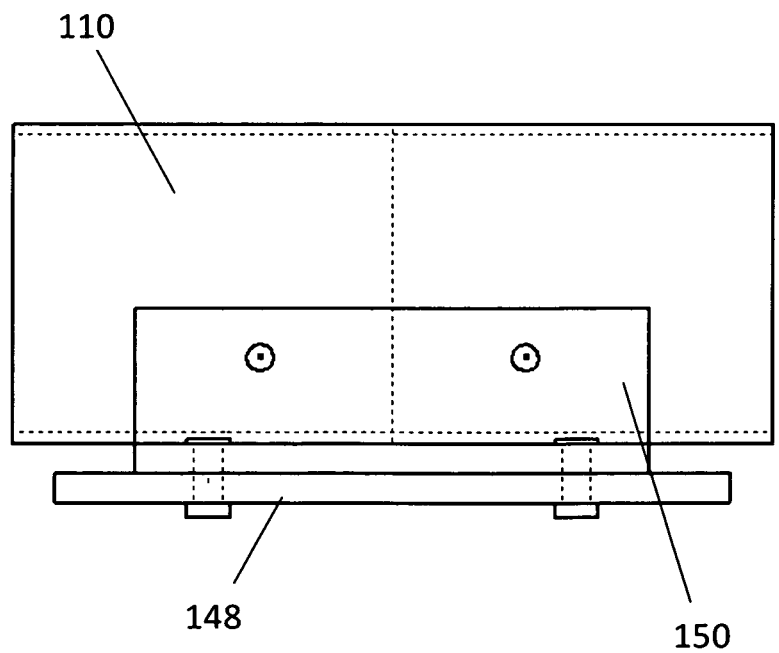
Figure 67:
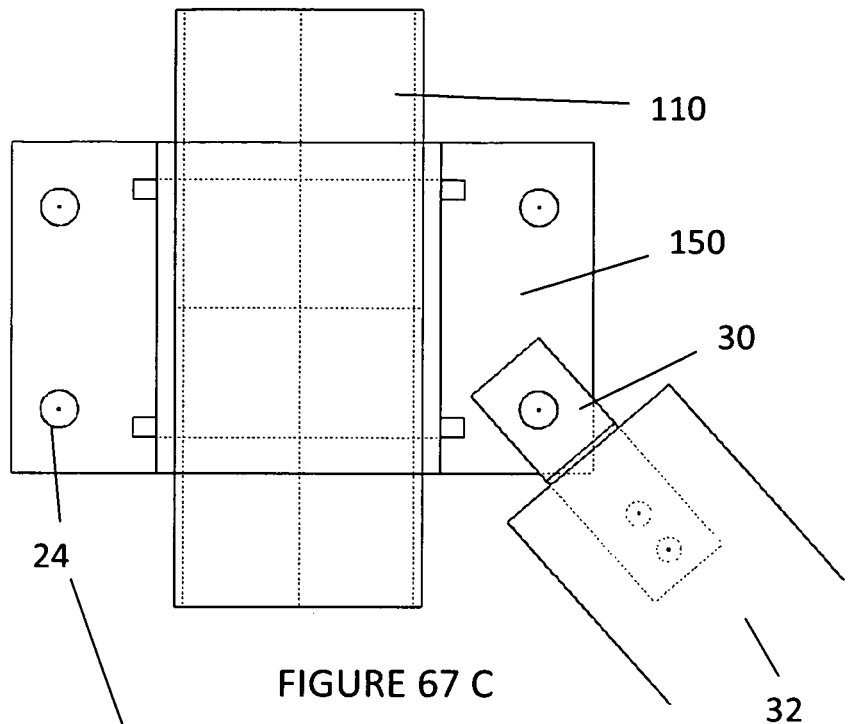
Figure 67:
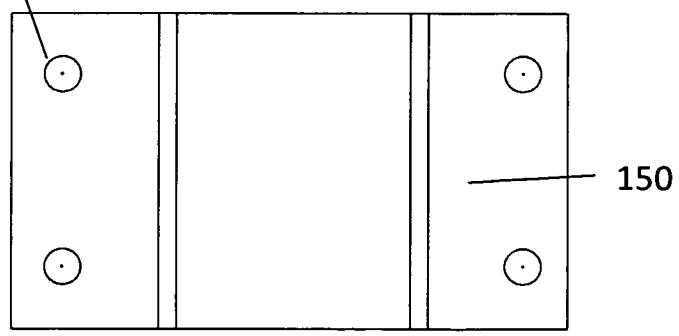

The connection of FIGS. 66a and 66b shows the beam 36, via the beam end piece 34, attached to the fin 90 of a node 10, such as Node C 122 or Node D 124 of the solar frame 44. The beam end piece strut legs 144 are attached to the beam 36 with fasteners 72. The beam end piece node fins 146 are attached to the fin 90 of the node 10. Each of these components must carry the axial and shear forces from the frame 44, the mirror dead loads and wind loads (on the face or back of the mirror), which cause this connection to have shear as well as axial forces (most struts 32 in the space frame design have primarily axial forces, except for their own weight, which causes minimal shear and bending moments).

The connection of FIGS. 67a, 67b, 67c and 67d shows the diagonal beam 110 where the bottom of the beam 110 attaches with a pin 56 to the top fin of Nodes A and B via bracketry. It also shows how an angled strut 32 via its strut end piece 30 attaches to the top fin of the node 148/beam 110 bracket 150. The fin 90, bracket 150 and beam 36 must carry the axial and shear forces from the frame 44 and any moments, from the mirror dead loads and wind loads (on the face or back of the mirror), which cause this connection to have shear as well as axial forces and moments (most struts 32 in the space frame 44 design have primarily axial forces, except for their own weight, which causes minimal shear and bending moments).

Figure 68:
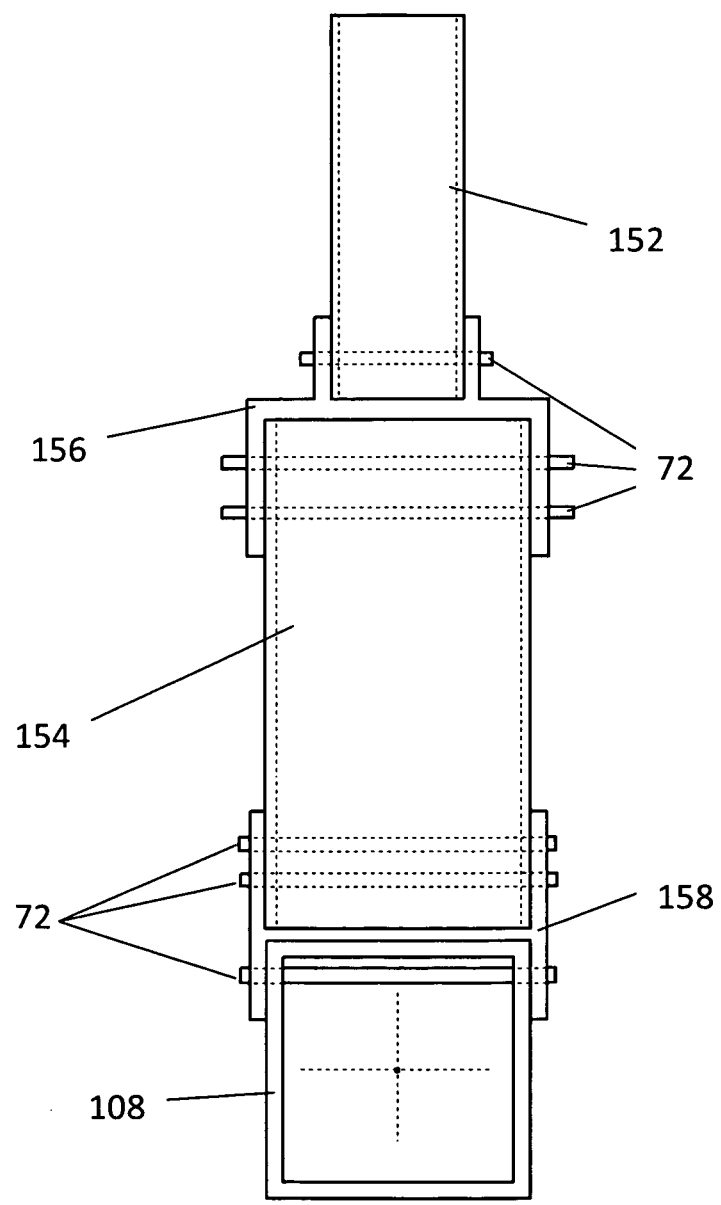
FIG. 68A shows collector tube upright connections—End view.
FIG. 68B shows collector tube upright connections—Side view.
FIG. 68C shows collector tube upright connections—Top end view.
Figure 68:
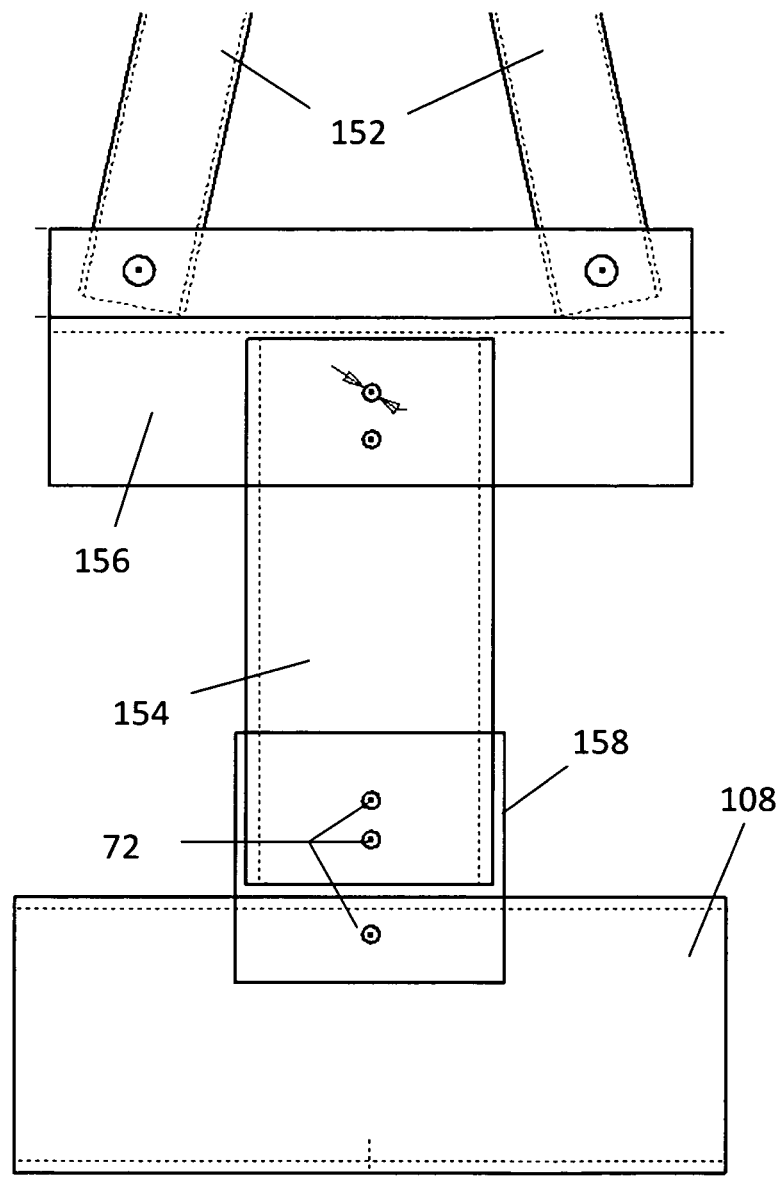
Figure 68:
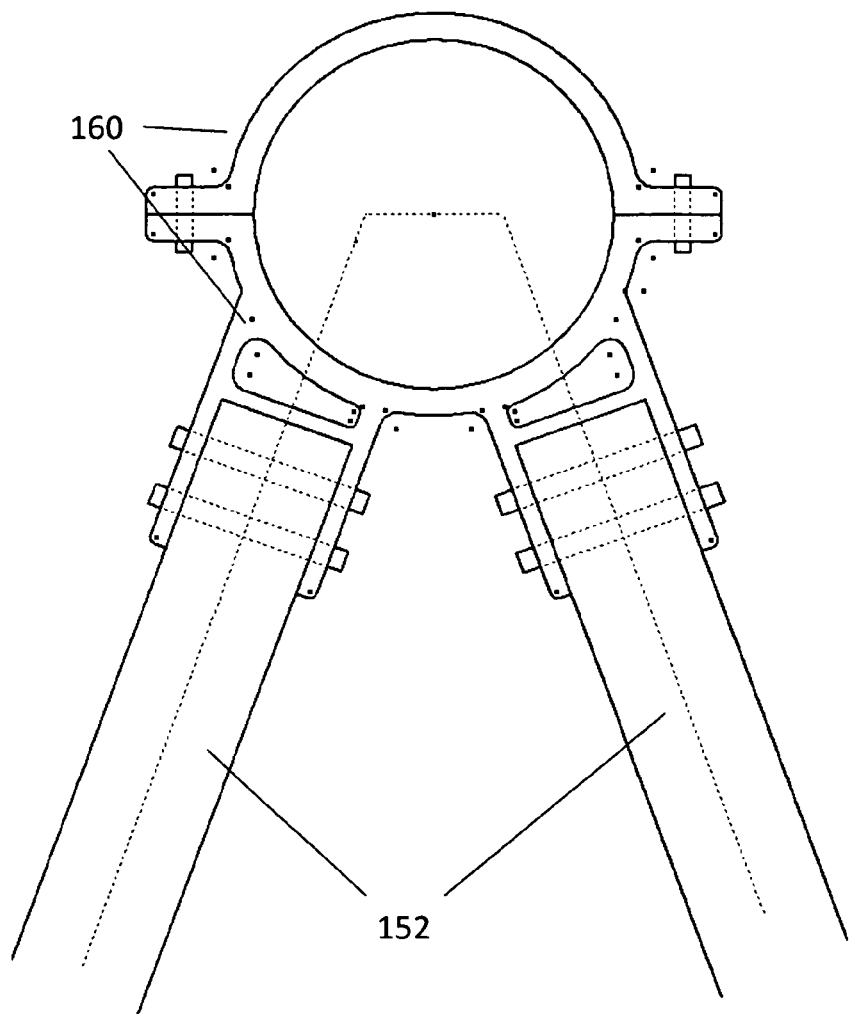

Collector tube upright 152 is connected to a collector tube base 154 through a top bracket 156 attached by fastener 72. The collector tube base 154 is also connected to horizontal beam 108 with a bottom bracket 158 through fastener 72, as shown in FIGS. 68A-C. The collector tube bracket 160 is attached to collector tube upright 152, as shown in FIG. 68C.

Figure 69:
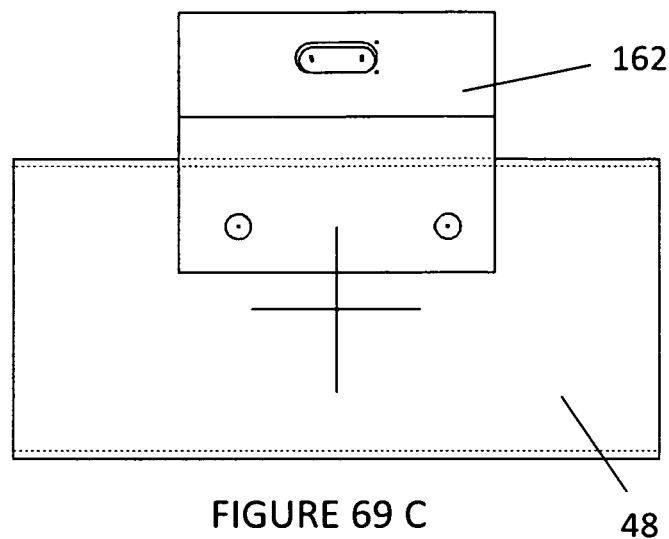
FIG. 69A shows a mirror rail to mirror bracket—End view.
FIG. 69B shows a mirror rail to mirror bracket—End View.
FIG. 69C shows a mirror rail to mirror bracket—Side view.
FIG. 69D shows a mirror rail to mirror bracket—Top view.
Figure 69:
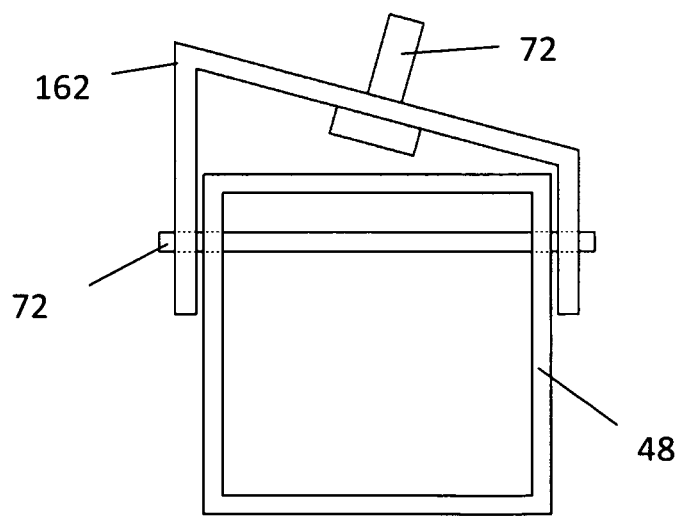
Figure 69:
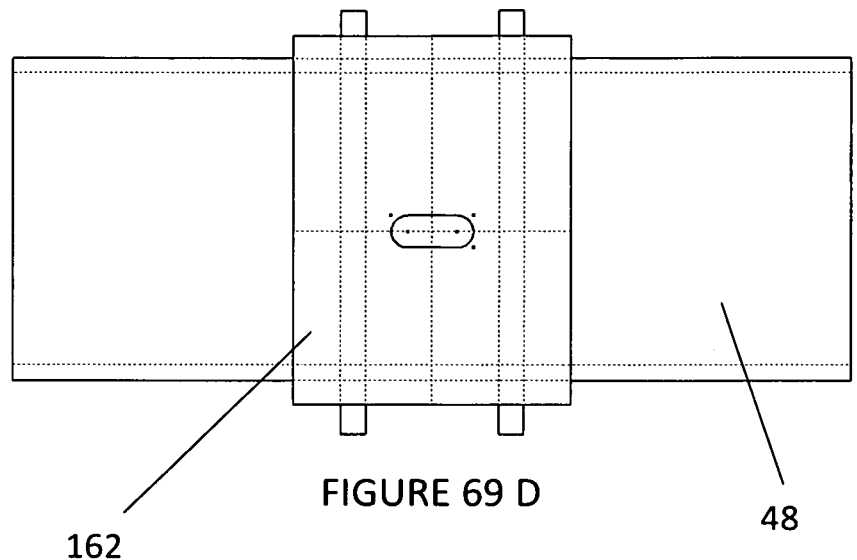
Figure 69:
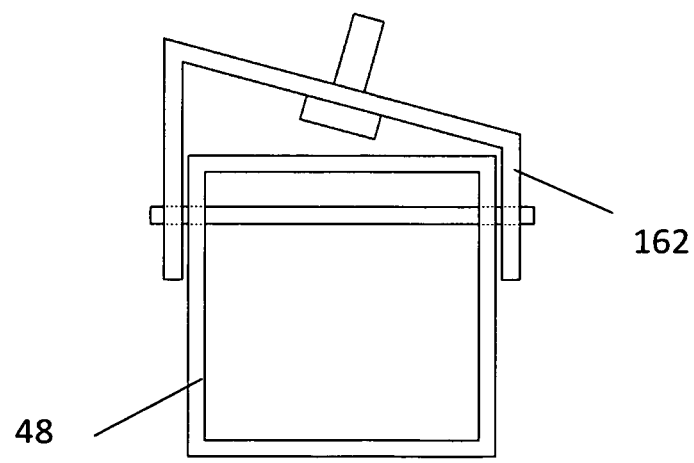

The mirror rail 48 is connected to mirror bracket 162 with fasteners 72, as shown in FIGS. 69A, 69B and 69C.

Figure 70:
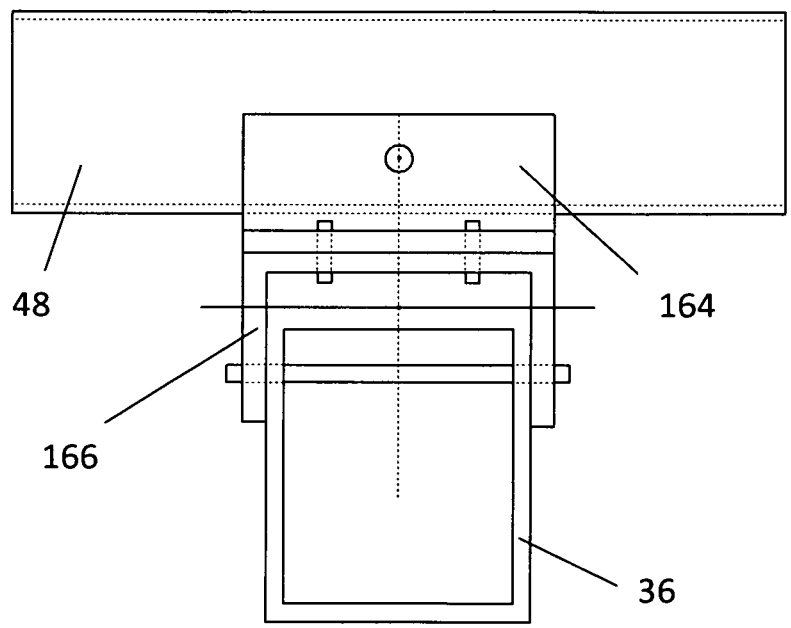
FIG. 70A shows a mirror rail to beam connection—Side view.
FIG. 70B shows a mirror rail to beam connection—End view.
FIG. 70C shows a mirror rail to beam connection—Top view.
FIG. 70D shows a mirror rail to beam connection—Two piece mirror rail connection.
Figure 70:
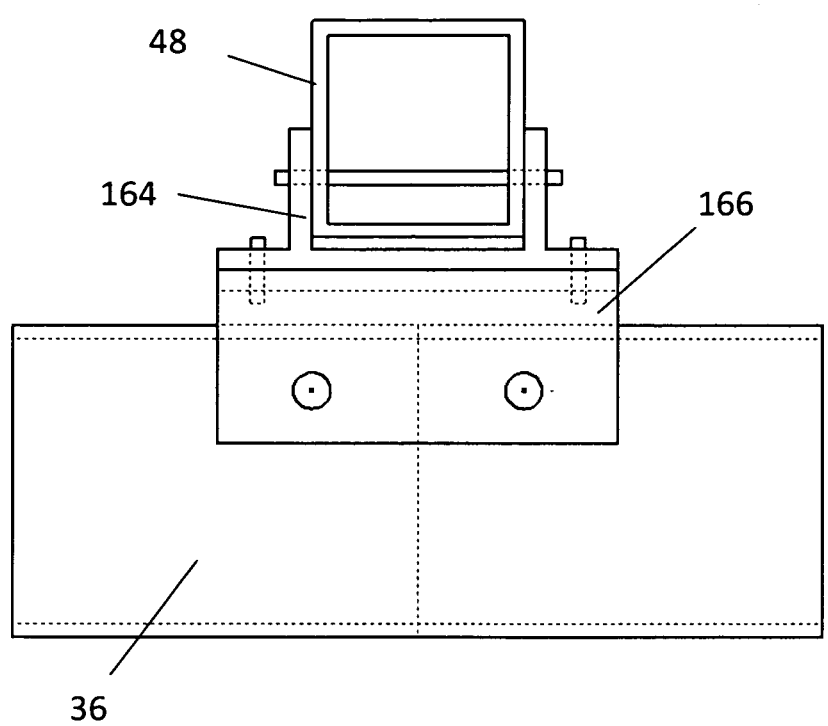
Figure 70:
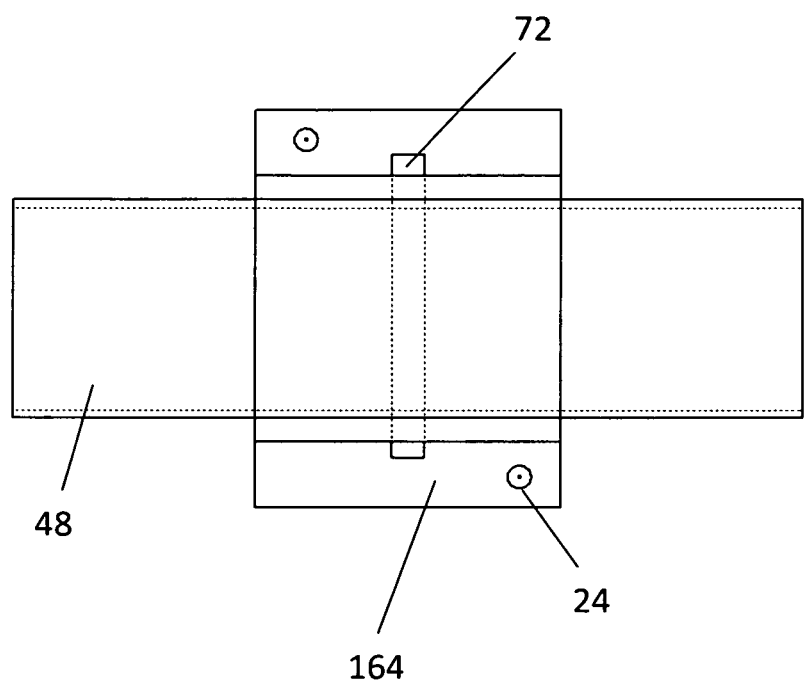
Figure 70:
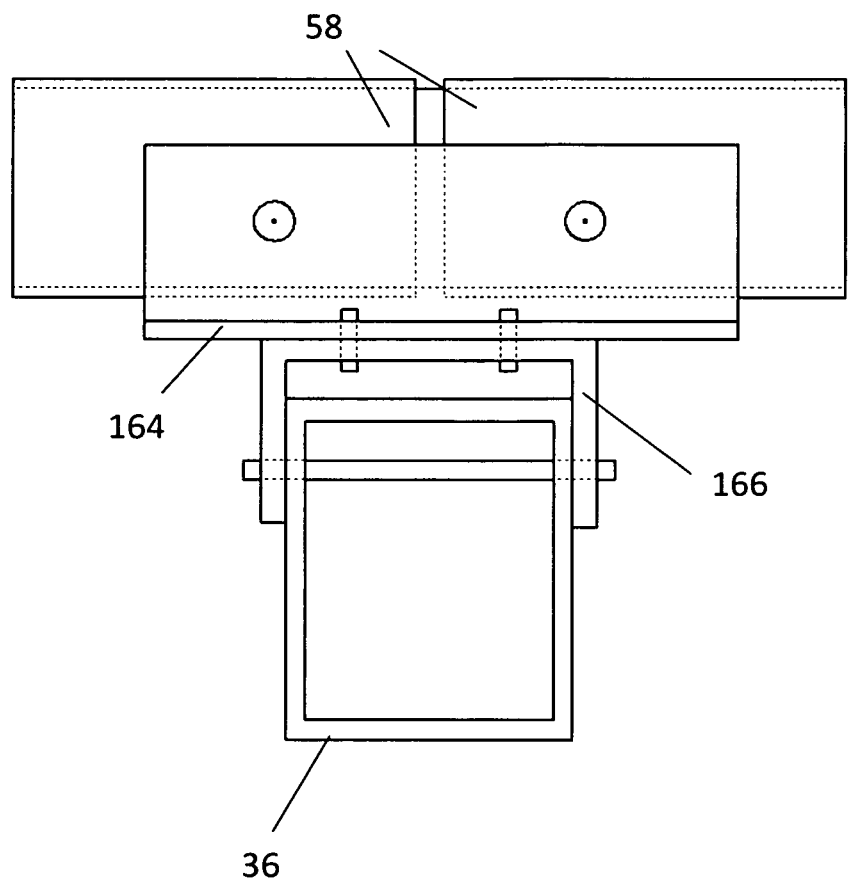

The mirror rail 48 is connected to upper bracket 164, which is connected to lower bracket 166, which is in turn connected to beam 36 connection, as shown in FIGS. 70A-70D. FIG. 70D shows a two piece rail mirror 58 to beam 36 connection.

Pin 56 and Clip Designs

The fasteners 72 used to join the various chords 28, chord end pieces 26, struts 32, strut end pieces 30, beams 36, beam end pieces 34, nodes, etc. can be pins 56, rivets, bolts, huck fasteners (Alcoa) or other means. FIGS. 71A, 71B, 72A, 72B and 73A, 73B and 73C show threaded pins 168, where the pins can have a very slight clearance (on the order of 0.001-0.002" clearance to the mating holes) or be an interference fit.

During the insertion of the pins 168 for factory or field assembly of the various parts, tight fits are desirable. However, this can cause difficulty in assembly and possible galling, either of which can cause slower than desired assembly or damage to parts, which may be a current or future problem. The use of pins 168 with a slight clearance or the use of lubricant threads 170 can help to alleviate this.

Figure 71:
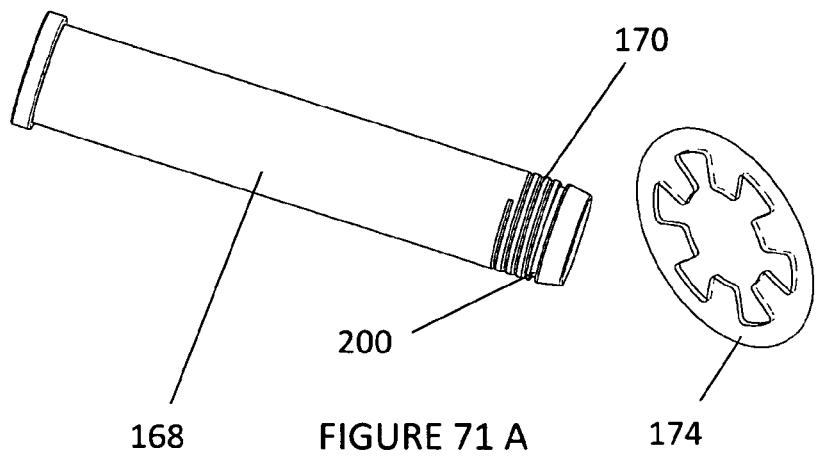
FIG. 71A shows pin & clip design concepts—End thread pin (multiple revolutions) & Close clip.
FIG. 71B shows pin & clip design concepts—Full fine thread pin (multiple revolutions) & Open clip.
Figure 71:
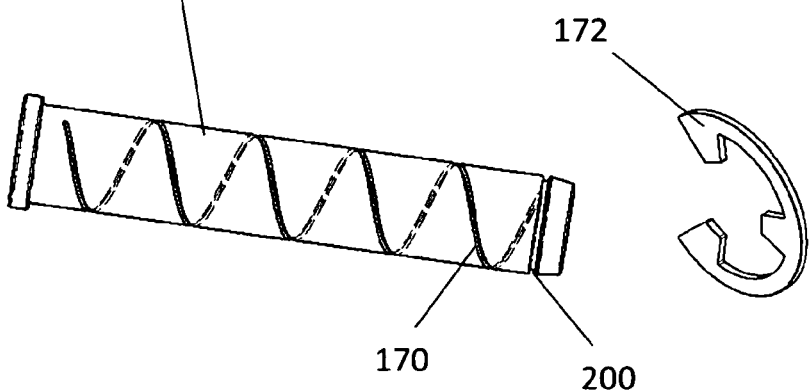
Figure 72:
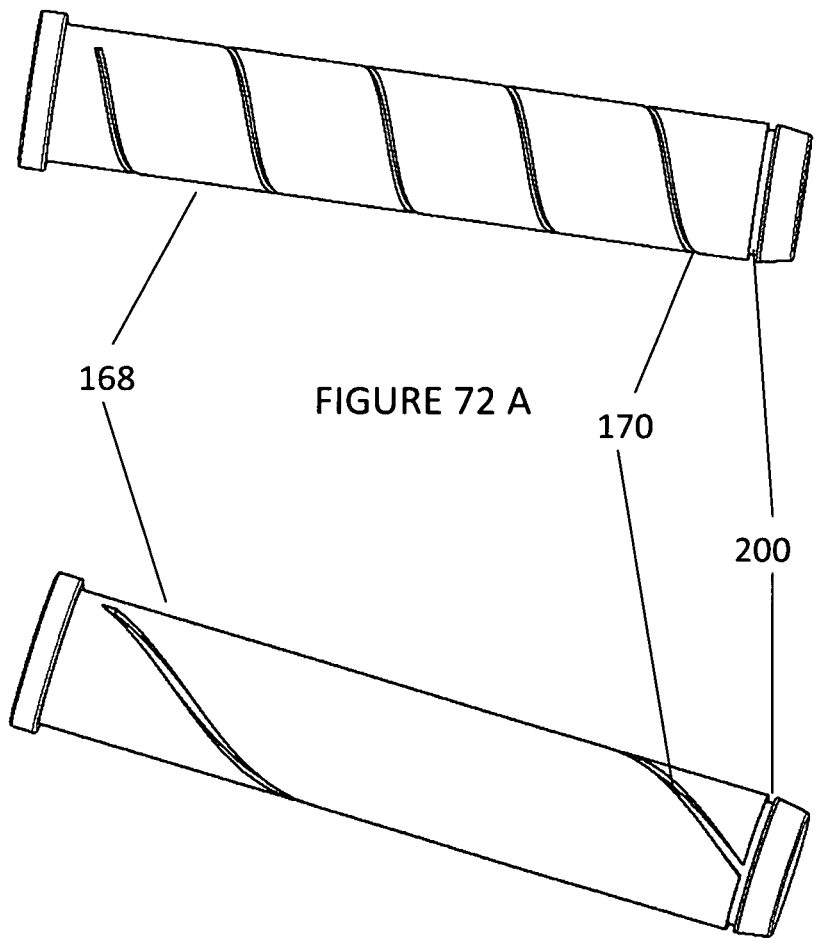
FIG. 72A shows pin design concept—Full coarse thread pin (multiple revolutions).
FIG. 72B shows pin design concept—Full coarse thread pin (single revolution).
Figure 73:
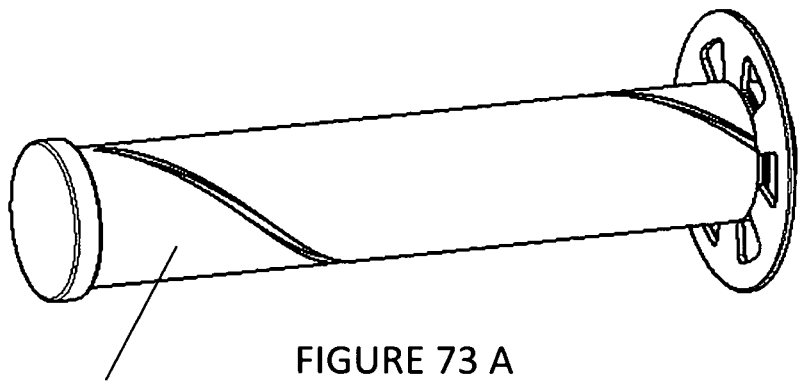
FIG. 73A shows pin (single revolution) & clip design concept—Shown with clip in place.
FIG. 73B shows pin (multiple revolutions) & clip design concepts—Shown with clip in place.
FIG. 73C shows pin (end thread—multiple revolution) & clip design concepts—Shown with clip in place.
Figure 73:
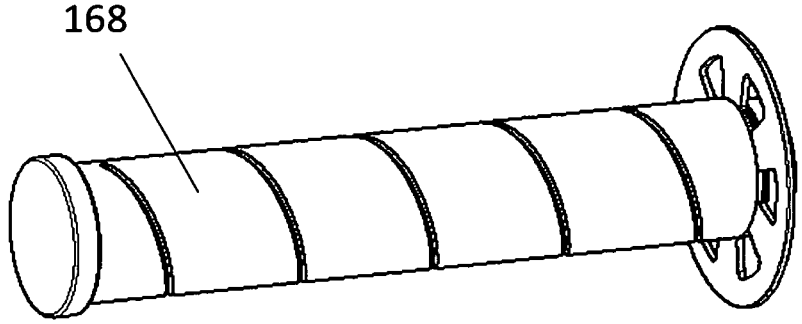
Figure 73:
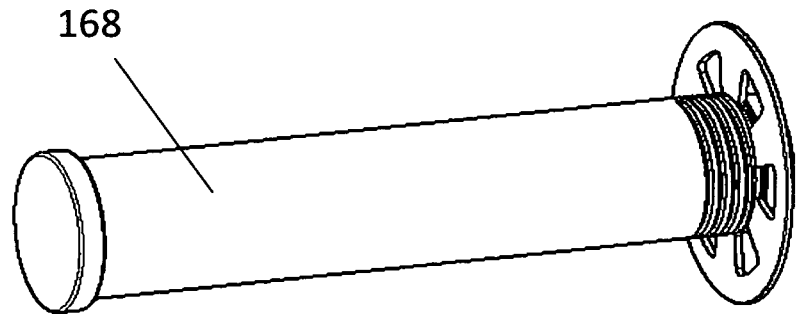

The threads 170 or groove 200 are used for end retention (e.g. where clips, nuts, lock nuts are used (cotter pins or other end retention devices are also possible). Threads 170 enable the closely fit pin to carry some minor amount of lubricant to assist in the installation. Without these threads 170, any applied lubricant (wax, oil, boron, etc.) is in effect "squeegee'd" off during the insertion process in the first tight hole (either due to an interference fit design or tolerance issues "crowding" the holes such that one edge may be tight to the fastener 72. The lubricant can be a wax, oil or other lubricant, and can be applied either prior to the field assembly or during the field assembly. In either case, if applied prior, at the time of fastener fabrication for example, the application can be done by dipping the pin in the oil, wax or other lubricant, or by dripping, spraying, wiping, drum feeding or by other means of transferring lubricant onto the pin 168. By having the threaded portion of the pin shaft, minor amounts of lubricant can be "carried" in the thread 170, ensuring that there is some lubricant available for subsequent hole insertion (these pins go through 2, 3 or more fabricated surfaces). Because many of the components are thin walled, having this lubricant available eases insertion and dramatically reduces the likelihood of galling during insertion, which can lead to installation difficulties, part deformation or even failure (the deformation can induce local stresses and buckling, which may not even be known until the product is in use, leading to a potential future failure of unknown cause). A self-locking retaining ring/clip 174, as shown in FIG. 71A, or an E-style side mount retaining ring/clip 172, as shown in FIG. 71B, may be used with the pin 168 to fix the pin 168 in place by engagement into retaining ring groove 200, as shown in FIGS. 72A and 72B.

Figure 74:
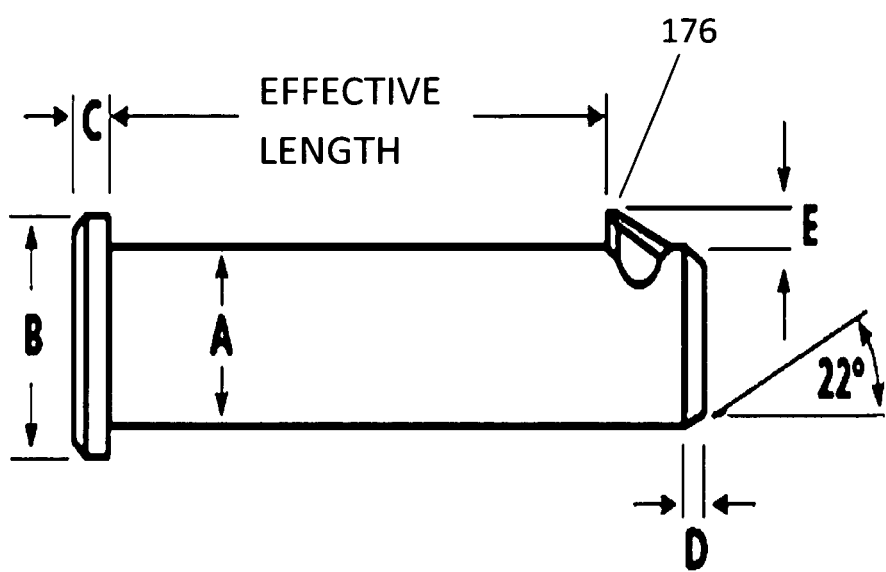
FIG. 74 shows SLIC Pin™—Self locking pin.

There are many other types of fasteners 72, pins 168, etc. that can be used to join these types of assemblies, including Alcoa/Huck fasteners and products like the SLIC Pins (see following info):

The Self Locking Implanted Cotter Pin 176, shown in FIG. 74, is like having a pin and cotter all in one.

Strong spring-loaded plunger features easy insertion ramp and the vertical face at rear prevents backing out. This design is ideal for blind holes or where cotter pin access is limited.

The SLIC Pin™ eliminates cotters, bolts and nuts and does not require tools for use—thereby greatly speeding assembly times. It is well suited for automated assembly and is easier, safer and faster.

Hybrid Solid Node with Hollow Fin(s):

The "Hybrid Solid Node with Hollow Fin(s) 12" will be called the "hybrid node" to simplify this write-up (alternatively called the "solid node hollow fin" in some figures). The hybrid node 86 utilizes a solid central portion 132 with at least one hollow fin 12. The hybrid node 86 builds upon designs disclosed in WES's 1-4$^{th}$ patent applications, most notably the strut end piece 30 to single fin 90 design shown in the first patent application (FIG. 84), the guided insertion single fin (FIG. 27A) and "knuckle" hollow fin 12 (FIG. 85) shown in the third patent application and, of course, the solid node 92 described in the 4$^{th}$ patent application.

Figure 27A:
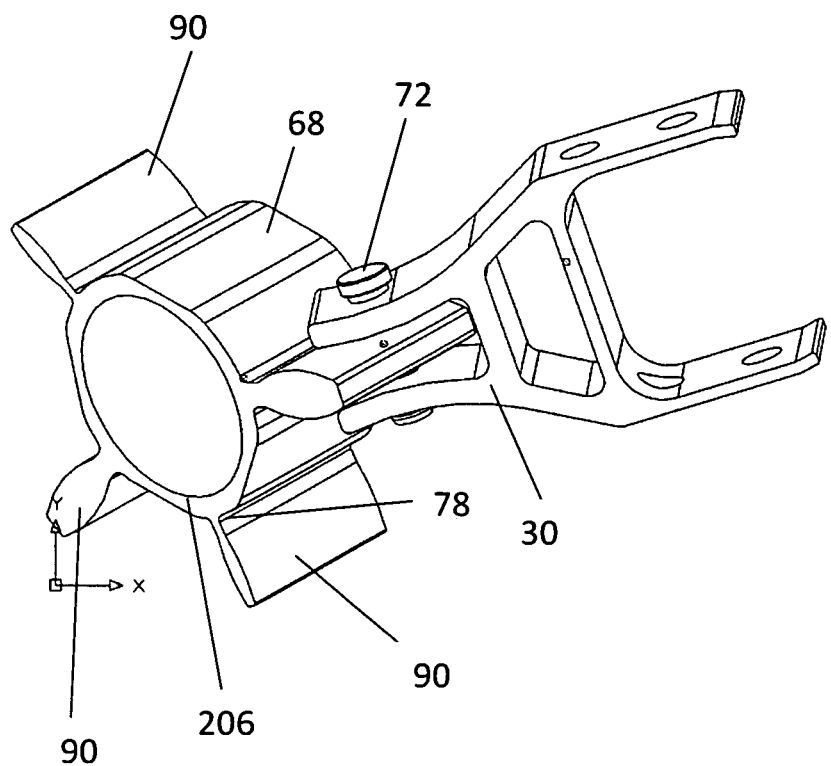
FIG. 27A shows a single fin node and SEP (strut end piece).
Figure 27B:
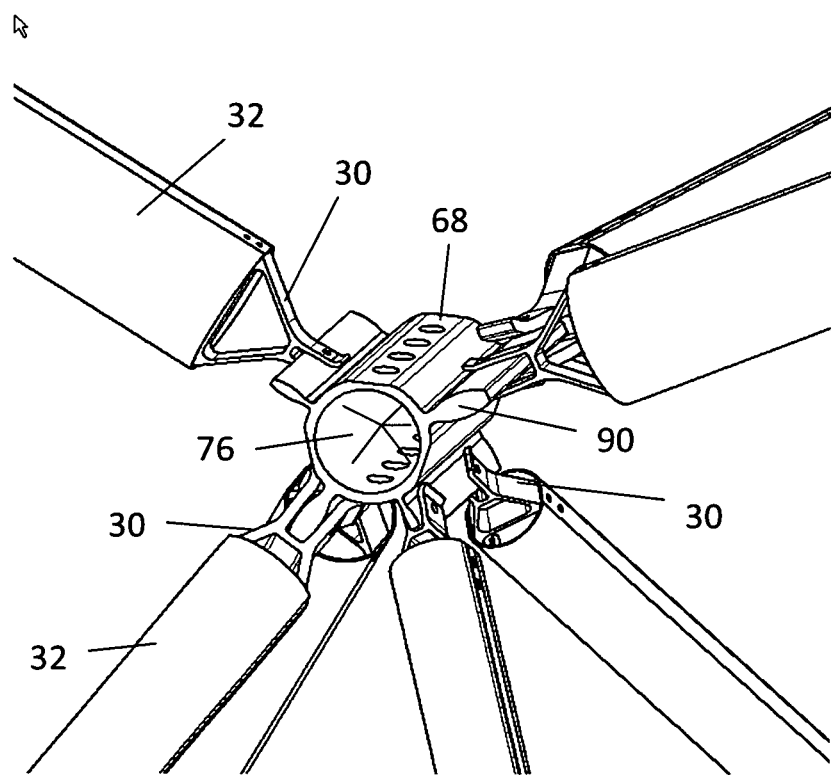
FIG. 27B shows a single fin node with multiple SEP and struts.
Figure 84:
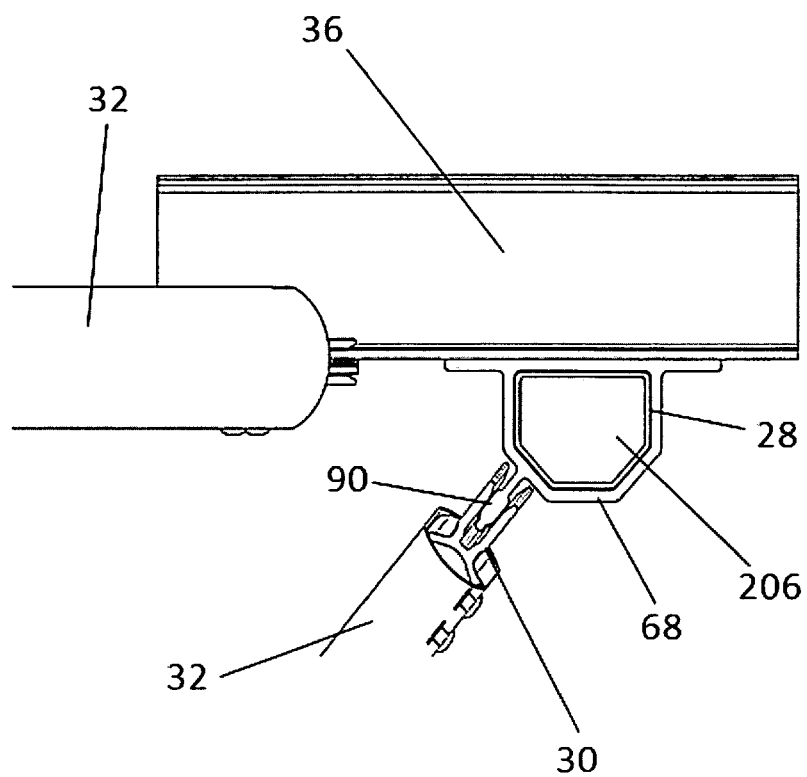
FIG. 84 shows a single fin node assembly from patent application #1.
Figure 85:
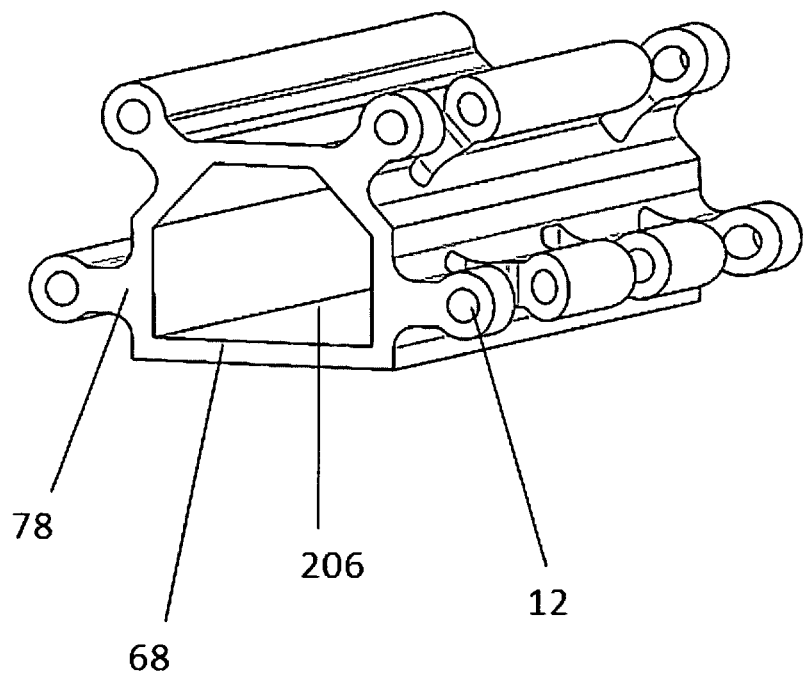
FIG. 85 shows a "knuckle" hollow fin node from patent application #3.
Figure 86:
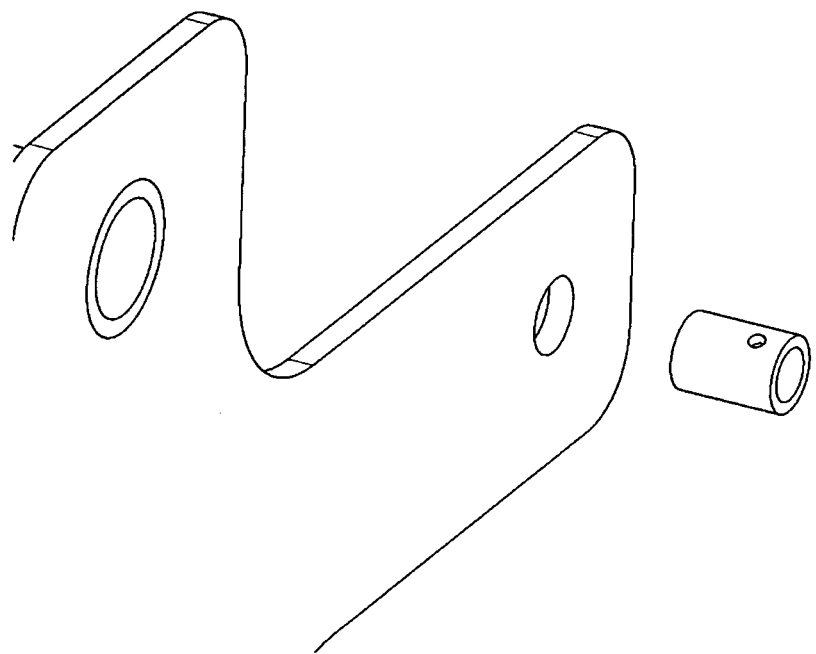
FIG. 86 shows a portion of a torque plate with a tube.
Figure 87:
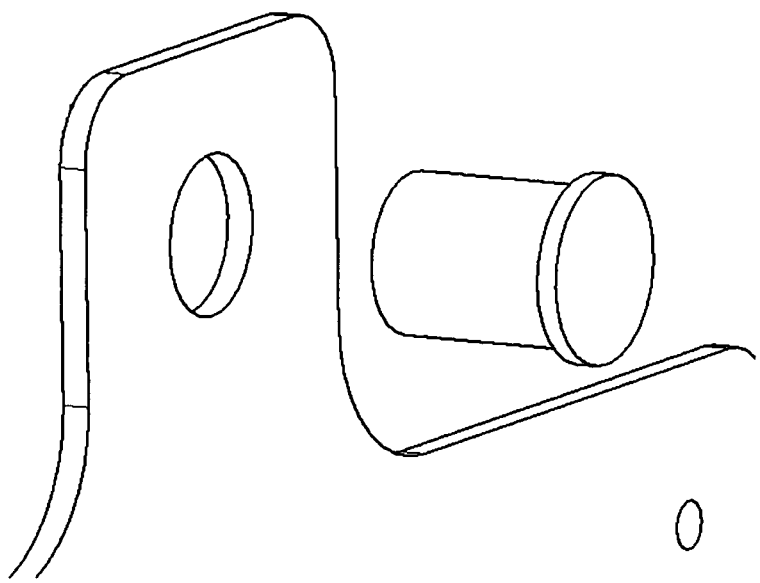

Supporting figures for the hybrid node 86 include FIGS. 75, 76, 77, 78 & 79 showing a more conventional solid node 92, while FIGS. 80, 81, 82 and 83 show a hybrid node 86 design and Table 4 shows comparative results. FIG. 84 shows a strut end piece 30 to node single fin 90 from the 1$^{st}$ patent application. FIG. 27A shows a guided insertion style hollow node with solid fins 90 from the 3$^{rd}$ patent application and FIG. 85 shows a "knuckle" hollow fin 12 design also from the 3$^{rd}$ patent application.

As disclosed in prior patent applications, one key attribute of the solid node is that the solid central portion 132 undergoes very little deformation during axial loading of the fins 90 (four fins are pictures in FIGS. 75-83). In prior designs with a hollow node 68 (FIGS. 84, 27A and 85, for example) as axial loads are placed onto the node fins, the central hollow portion (channel 206) of the node can be deformed (visualize a soda can where the wall of the can is pushed in or pulled outward). For the solid node designs, this solid central portion 132, and while there is of course deformation from the axial loads on the node fins, the deformation is much less than on the hollow node designs (reference the 4$^{th}$ patent application).

Figure 75:
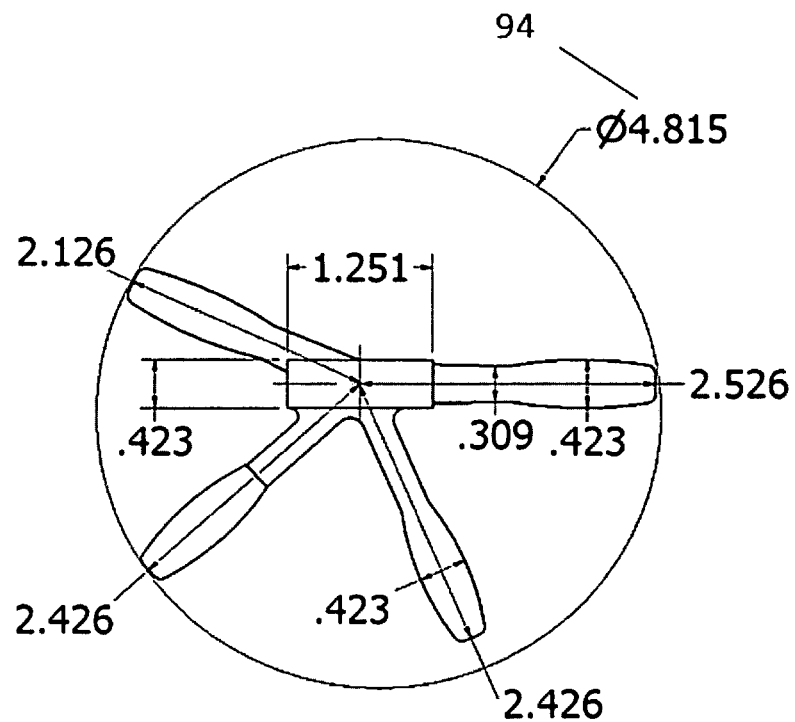
FIG. 75 shows a solid node with solid fin print—Front view.
Figure 76:
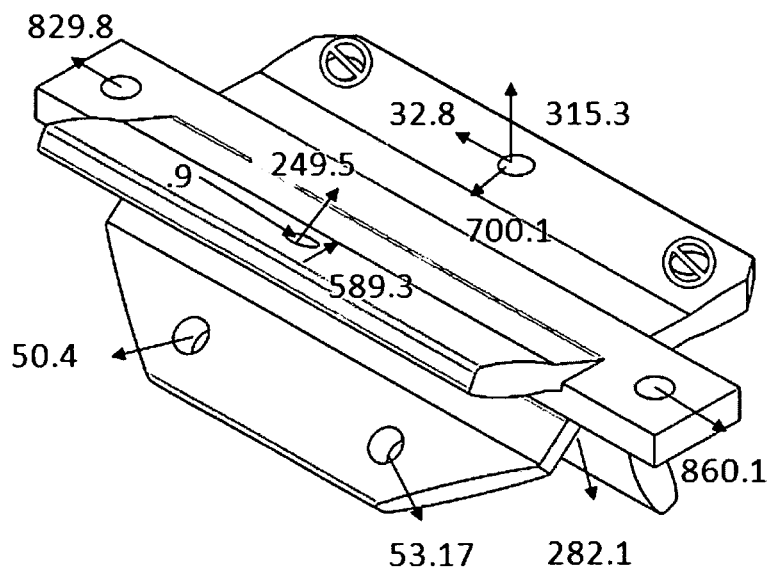
FIG. 76 shows a solid node with solid fin with loads—ISO view.
Figure 77:
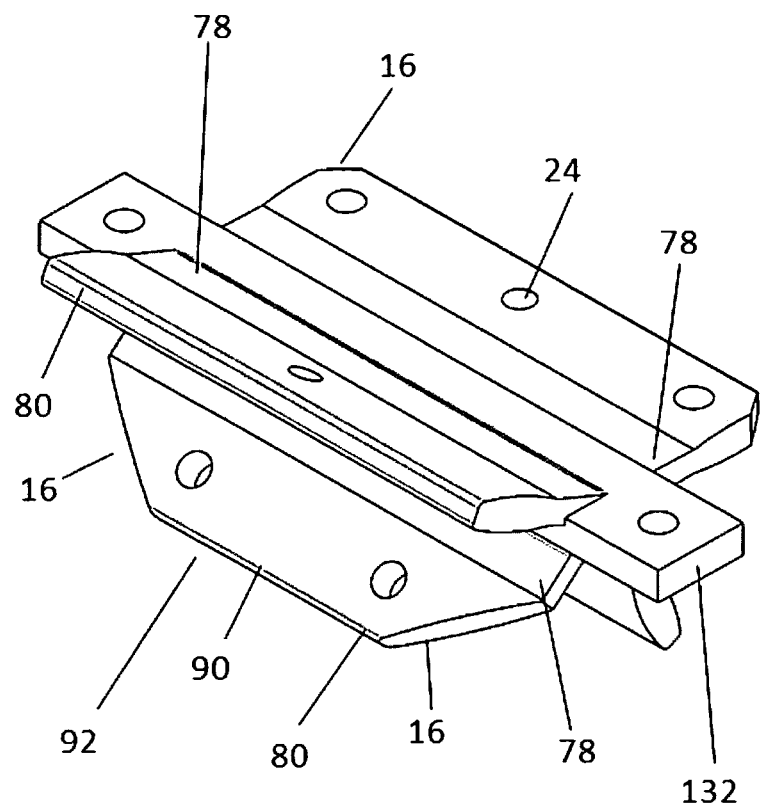
FIG. 77 shows a solid node with solid fin—ISO view.

FIG. 75 shows the cross sectional profile of a conventional solid node 92 while FIG. 77 shows this node in isometric view. Axial and shear loading is depicted in FIG. 76, shown on the solid node 92 (identical loadings are applied to the hybrid node 86); please note that the nodes depicted in this portion of the patent application are utilized with both chords 28 and struts 32, which generally undergo axial loading, and with beams 36, which undergo a combination of axial loads and wind/mirror weight loadings which translate into loads at a right angle to the axial loads which then result in side (—vs—axial) loading of the node fins. Note that the chord loads of 829.8 lbs and 860.1 lbs and the strut load of 50.4 lbs are true "axial loads" while the combined loads of 0.9/249.5/589.3 lbs and 32.8/315.3/700.1 lbs on the two top fins represent the more complex, not-just-axial loads from the beam connections. Please note that this node design is used in other applications, and that the partially hidden fin has an axial tensile load of 282.17 lbs applied to it (nor are the two holes on the top/beam fins depicted with a circle/line through circle).

Figure 78:
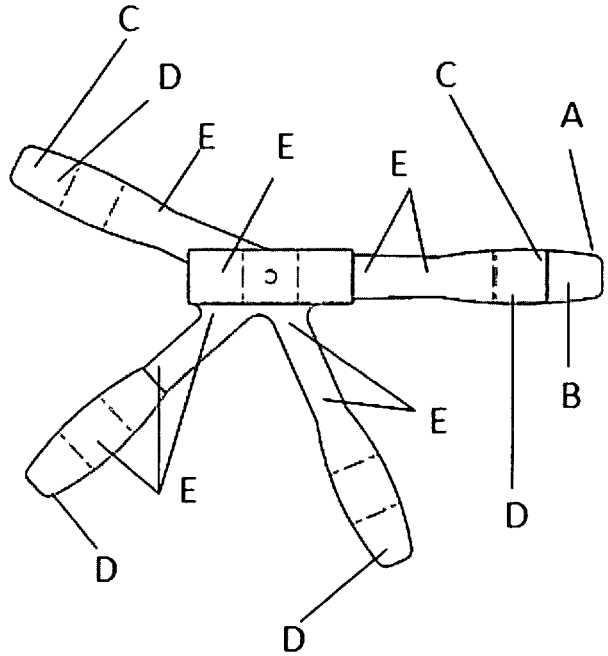
FIG. 78 shows a solid node with solid fin—FEA (deformation).
Figure 79:
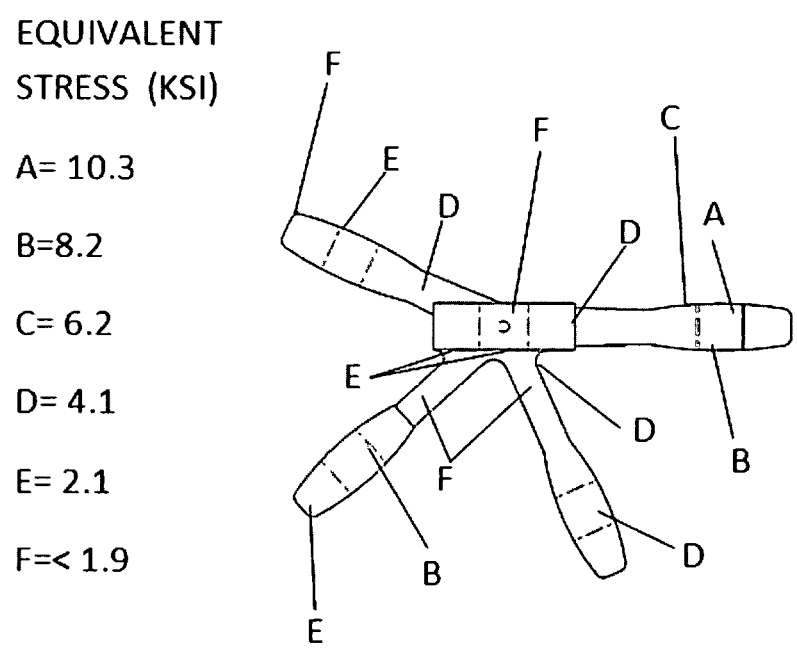
FIG. 79 shows a solid node with solid fin—FEA (equivalent stress).

The resulting deformation is depicted in FIG. 78 and the resulting equivalent stress is shown in FIG. 79.

A similar node design with identical loadings, but utilizing the hybrid node 86 concept, is shown for this configuration of solid node but utilizing hollow—vs—solid fins. FIGS. 80-83 depict the profile cross sectional view, isometric views and resulting deformation and equivalent stress results respectively.

Table 4 shows how the conventional solid node 92 and hybrid nodes 86 compare in this application. The hybrid node is ever so slightly greater in circle size (5.08→vs—5.04") and weighs 4.355 lbs/ft—vs—the solid node weight of 3.798 lbs/ft (14.7% heavier). The maximum deformation of the hybrid node is only 0.004"—vs—the solid node deformation of 0.010" (due to the side loading of the beam connections as discussed earlier) and the maximum equivalent stress is very similar (10.31 ksi for the solid node—vs—10.94 ksi for the hybrid node).

The hybrid node 86 design more ideally handles the "side" loads (depicted as 249.5 lbs and 315.3 lbs in FIG. 76). The solid node 92 relies on the narrowest dimension (fin base 78) where the guided insertion fin 90 meets the node solid central portion 132 (shown as 0.309" in FIG. 75), while in FIG. 80 the hybrid node utilizes a hollow fin mating with the solid central portion of the node with a 1.0" dimension, providing greatly improved resistance to side loading. Note that the fins of the hybrid node are depicted using parallel outside surfaces (for example, near the 0.212" dimension) while the fin tips 80 provide the "guided insertion" functionality discussed in the 3$^{rd}$ patent application. These outside walls (first leg 178, second leg 180 and third leg (top) 182) could easily be slightly bowed to provide a similar overall "guided insertion" design feature, but for simplicities sake, this was not shown on the profile cross sectional design for the hybrid node because it would complicate the design with additional dimensions required.

Figure 80:
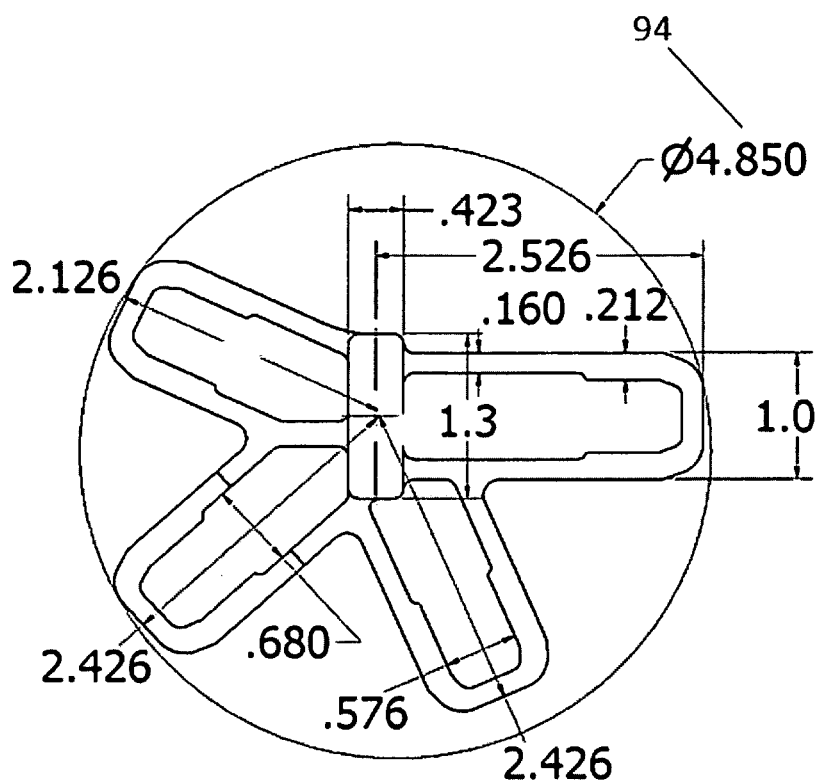
FIG. 80 shows a solid node with hollow fin print—Front view.
Figure 81:
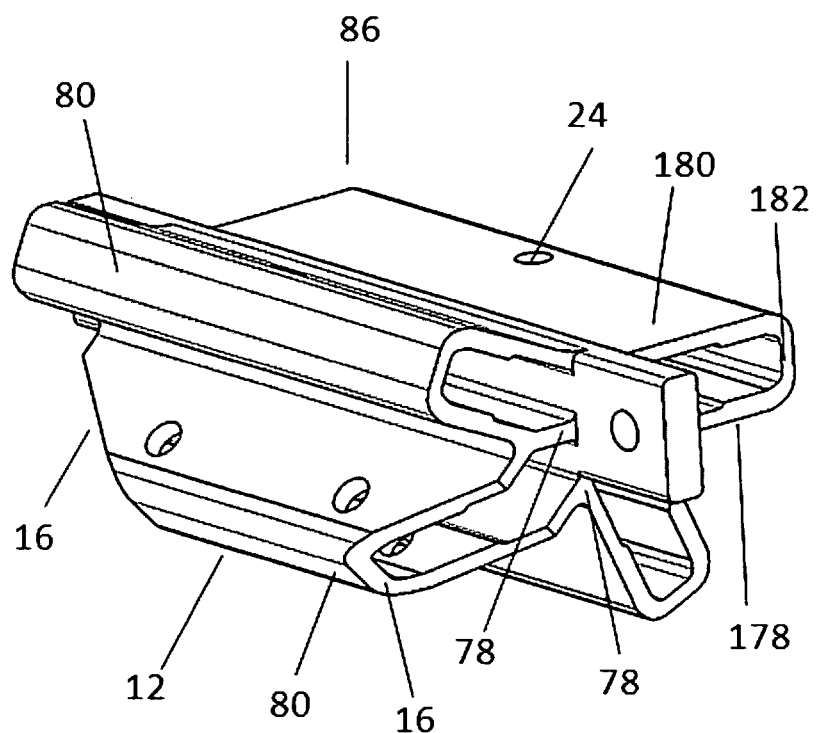
FIG. 81 shows a solid node with hollow fin—ISO view.

As shown in FIGS. 80 and 81, the cross sectional profile design for the hybrid 86 design utilized two different means to connect the hollow fins to the solid central portion 132. Looking at the cross section, the fins 90 can be described as being in the 3:00, 5:00, 7:00 and 10:00 positions. For the 3:00 position, the outside surfaces (178 and 180) of the hollow fin connect directly to the side of the solid central portion. The 5:00 fin shows the upper right outside surface connecting to the bottom outside surface of the 3:00 fin, with the lower left outside surface of the 5:00 fin connection more directly to the bottom of the solid central portion of the node. The 7:00 fin connects similarly to the 10:00 fin's bottom outside surface (and then through a short section of material to the solid central portion of the node) and to the solid central portion of the node. The 10:00 fin connects similarly to the 7:00 fin's top outside surface (and then through a short section of material to the solid central portion of the node) with the top outside surface of the 10:00 fin connecting more directly to the solid central portion of the node.

When designing the extrusion profile and cross sectional dimensions, it is necessary to take into account the Aluminum Design Manual (2010) (ADM) technical rules regarding part design (safety factors, etc.) which for a part such as those shown include possible failure modes of tension through net section area, block shear failure, and bearing stress failures as well as hole-to-edge distance requirements. Loading calculations for mating parts are performed utilizing the appropriate fasteners, and the final design is often a tradeoff between material choices for the extrusions and the fasteners, fastener (and thus hole) diameters and profile cross sections (width and thicknesses). In addition to these requirements of the ADM, profile designs, material choice and geometry/loading cases are evaluated using Finite Element Analysis to predict the resulting area deflections and equivalent stresses throughout the part. When reviewing the hybrid node 86 design, for example, the loading can be seen in FIG. 76 (the same loading vectors are used for the solid fin 90 and hybrid node designs) with FIG. 82 showing the deformation and FIG. 83 showing the equivalent stress.

Figure 82:
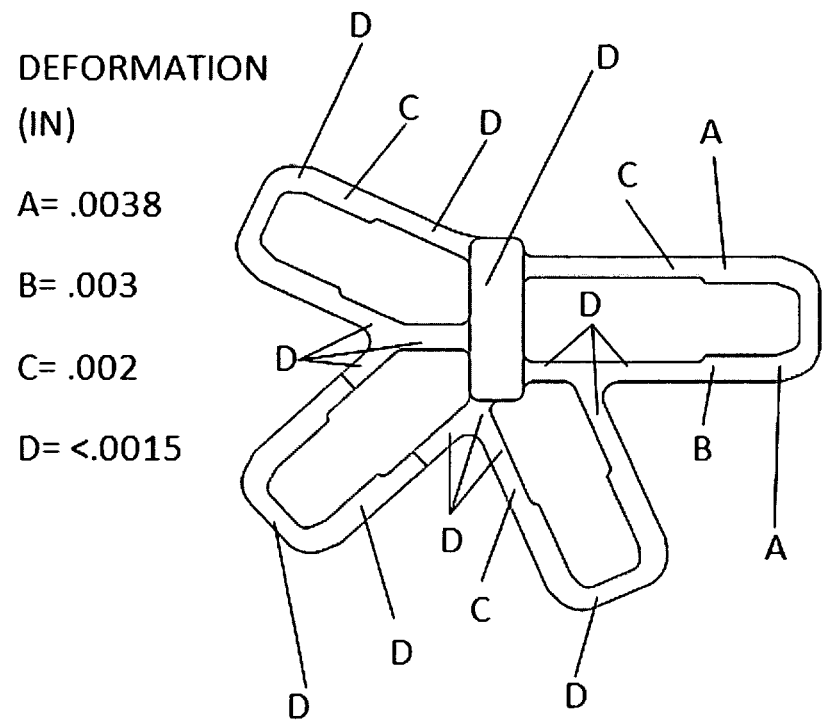
FIG. 82 shows a solid node with hollow fin—FEA (deformation).
Figure 83:
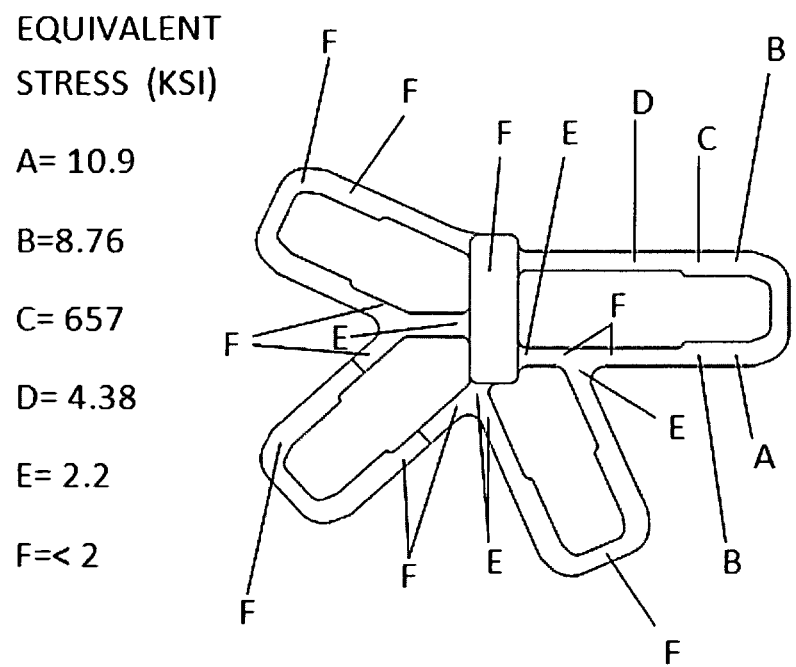
FIG. 83 shows a solid node with hollow fin—FEA (equivalent stress).

It is evident from the resulting deformation and equivalent stress FIGS. 82 and 83) that the cross sectional profile design handles the loading cases whether the connection of the outside surface (178 and 180) of the hollow fin is directly to the solid central portion 132 of the node or whether it is via the outside surface of another fin and then to the node.

In summary, the hybrid node 86 allows for greatly improved deformation results from side loading with only a minor increase in part weight.

TABLE 4

| DESCRIPTION | CIRCLE SIZE (94) | LBS PER FT | MAX DEF (IN) | MAX. EQUIV STRESS |
|---|---|---|---|---|
| SOLID NODE SOLID FIN (214) | 4.815 | 3.798 | 0.010 | 10.31 |
| SOLID NODE HOLLOW FIN (212) | 4.85 | 4.355 | 0.004 | 10.94 |

Table 4 above shows the circle size, lbs/ft and resulting maximum deflection and equivalent stress for solid node/solid fin 92 and solid node/hollow fin (hybrid) 86 designs as shown in FIGS. 75 through 83. These design concepts could be utilized for other loading and geometry cases besides the specific cases shown, and the resulting conceptual designs of the solid node/solid fin and solid node/hollow fin extrusions could thus handle increased loads of 750 lbs normal to the profile's "fins" 90 and 1300 lbs along the axis of the fins with 2,000 lbs axial force along the chord 28 axis, with corresponding changes to extrusion circle size 94 of less than 12", less than 12 lbs/ft extrusion weight and maximum deflections of less than 0.100" and maximum equivalent stress of less than 21 ksi.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A node for a solar frame comprising:
an elongate portion having ends and having a fastener hole at each end and to which structural elements are attached with fasteners to the elongate portion at either end and which extend from either end in alignment with the elongate portion's central axis; and
a plurality of fins, each fin to which a strut end piece of a strut is attached having a rectangular shape with a variable thickness extending radially outward from the elongate portion, the fin supporting at least 200 lbs. of load, the elongate portion and the fins having a circle diameter of less than 12 inches and having an extrusion weight of less than 12 lbs./ft., each fin having a maximum deflection of less than 0.100" and maximum equivalent stress of less than 21 ksi for loads of 750 lbs. normal to the fin and 1300 lbs. along the fin's axis, all force vectors through the fins from the strut end pieces attached to the fins converge at a common point within the elongate portion, the ends of the elongate portion extending beyond the fin's ends.

2. The node as described in claim 1 wherein the elongate portion is solid.

3. The node as described in claim 2 wherein the elongate portion has a rectangular cross section.

4. A node for a solar frame comprising:
a solid elongate portion having ends and having fastener holes at either end to which a structural element is attached with fasteners to the elongate portion at either end and which extend from either end in alignment with the elongate portion's central axis, the ends of the elongate portion extending beyond the fin's ends; and
a plurality of fins, each fin extending outward from the elongate portion, each fin to which a strut end piece of a strut is attached, the elongate portion and the fins having a circle diameter of less than 12 inches, each fin supporting at least 200 lbs. of load, the elongate portion and the fins having an extrusion weight of less than 12 lbs./ft., each fin having a maximum deflection of less than 0.100" and maximum equivalent stress of less than 21 ksi for loads of 750 lbs. normal to the fin and 1300 lbs. along the fin's axis.

5. The node of claim 4 wherein all force vectors through the fins from the strut end pieces attached to the fins converge at a common point within the elongate portion.

* * * * *